US011003313B2

(12) United States Patent
Lawrence et al.

(10) Patent No.: US 11,003,313 B2
(45) Date of Patent: May 11, 2021

(54) METHODS AND SYSTEMS FOR RECORDING STATISTICS ASSOCIATED WITH A SPORTING EVENT

(71) Applicant: Ollie Sports LLC

(72) Inventors: Tyson Lawrence, Lehi, UT (US); Scott Ashton, Salt Lake City, UT (US)

(73) Assignee: OLLIE SPORTS LLC, Salt Lake City, UT (US)

( * ) Notice: Subject to any disclaimer, the term of this patent is extended or adjusted under 35 U.S.C. 154(b) by 0 days.

(21) Appl. No.: 16/391,677

(22) Filed: Apr. 23, 2019

(65) Prior Publication Data

US 2019/0324626 A1 Oct. 24, 2019

Related U.S. Application Data

(60) Provisional application No. 62/661,592, filed on Apr. 23, 2018.

(51) Int. Cl.
| | | |
|---|---|---|
| *G06F 3/0481* | (2013.01) | |
| *A63B 71/06* | (2006.01) | |
| *G06F 3/0482* | (2013.01) | |
| *G06F 3/0484* | (2013.01) | |
| *G06F 3/0488* | (2013.01) | |

(52) U.S. Cl.
CPC ...... *G06F 3/04817* (2013.01); *A63B 71/0669* (2013.01); *G06F 3/0482* (2013.01); *G06F 3/04845* (2013.01); *G06F 3/04847* (2013.01); *G06F 3/04883* (2013.01)

(58) Field of Classification Search
CPC ............... G06F 3/04817; G06F 3/0482; G06F 3/04845; G06F 3/04847; G06F 3/04883; A63B 71/0669
See application file for complete search history.

(56) References Cited

U.S. PATENT DOCUMENTS

2003/0045357 A1 3/2003 Bishop
2013/0041590 A1* 2/2013 Burich ............... G06F 19/3481
702/19
(Continued)

FOREIGN PATENT DOCUMENTS

EP 3106973 12/2016
WO 2013017957 2/2013

OTHER PUBLICATIONS

Keith, EasyStats, https://apps.apple.com/us/app/easy-stats-soccer/id1128245744 as accessed on Jul. 12, 2019.
(Continued)

*Primary Examiner* — Roland J Casillas
(74) *Attorney, Agent, or Firm* — ALG Intellectual Property, LLC

(57) ABSTRACT

An exemplary method includes a sporting event statistics recording system that provides a graphical user interface for display, the graphical user interface including an icon representative of a participant in the sporting event, detects a first user input associated with the icon, determines that the first user input is associated with a first action performed during the sporting event, records a first statistic for the sporting event based on the participant represented by the icon and the first action associated with the first user input associated with the icon, detects a second user input associated with the icon, determines that the second user input is associated with a second action performed during the sporting event, and records a second statistic for the sporting event based on the participant represented by the icon and the second action associated with the second user input associated with the icon.

20 Claims, 52 Drawing Sheets

(56) References Cited

U.S. PATENT DOCUMENTS

| | | | |
|---|---|---|---|
| 2014/0179384 A1* | 6/2014 | Minkovitch | A63F 13/08 463/4 |
| 2014/0288683 A1* | 9/2014 | Sullivan | A63F 11/0051 700/92 |
| 2019/0197316 A1* | 6/2019 | Bornfreedom | H04N 21/44008 |

OTHER PUBLICATIONS

My Insights, goFooty: Soccer Statistics, https://apps.apple.com/us/app/gofooty-soccer-statistics/id1223051059 as accessed on Jul. 12, 2019.

Partial European Search Report received in European Application No. EP 19170597.9, dated Sep. 18, 2019.

European Search Report received in International Application No. 19170597.9, dated Jan. 22, 2020.

Blanchard, Chloe et al., "Contextual Design: The Key to User-Centered Apps," XP-002796655; https://clearbridgemobile.com/contextual-design-the-key-to-user-centered-apps/.

Fortier, Andra et al., "An Object-Oriented Approach for Context-Aware Applications," Sep. 4, 2006, Advances in Small Talk; LNCS; Springer Berlin; pp. 23-46, XP019079080, ISBN: 978-3-540-71835-2.

Kubo, Yuki et al., "Exploring Context-Aware User Interfaces for Smartphone-Smartwatch Cross-Device Interaction,". UbiComp2017. Proceedings of the ACM on Interactive, Mobile, Wearable and Ubiquitous Technologies (IMWUT), vol. 1 Issue 3, Sep. 2017, Article No. 69; https://doi.org/10.1145/3130934.

* cited by examiner

METHODS AND SYSTEMS FOR RECORDING STATISTICS ASSOCIATED WITH A SPORTING EVENT

RELATED APPLICATIONS

The present application claims priority under 35 U.S.C. § 119(e) to U.S. Provisional Patent Application No. 62/661,592, filed Apr. 23, 2018. The contents of the provisional patent application are hereby incorporated by reference in their entirety.

BACKGROUND INFORMATION

Statistics are increasingly being used in sports to evaluate individual and/or team performance, to determine strengths/weaknesses of players, and/or to develop strategies for facing opposing players/teams. Typically, recording statistics associated with a sporting event (e.g., a soccer match, a football game, a basketball game, etc.) includes either manually recording statistics by hand (e.g., by using a pen and paper to record statistics during a sporting event) or sending a video recording of the sporting event to a third party that analyzes the video recording of the sporting event and generates statistical data. However, manually recording statistics associated with a sporting event is often cumbersome, inaccurate, limited in scope, and difficult to implement when there is a fast pace of play during the sporting event. For example, conventional statistics recording software tools support recording of only a limited set of statistics (e.g., basic statistics for a single participant in a sporting event), are useful for only one type of sporting event, are cumbersome to use, and/or do not support recording of a robust set of statistics at a fast pace as required by certain sporting events. Although utilizing a third party to generate statistical data based on a video recording of the sporting event typically results in a more accurate data set, such services are costly, typically do not provide statistics for individual players, and usually require one or more days before the statistics are available for consumption.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
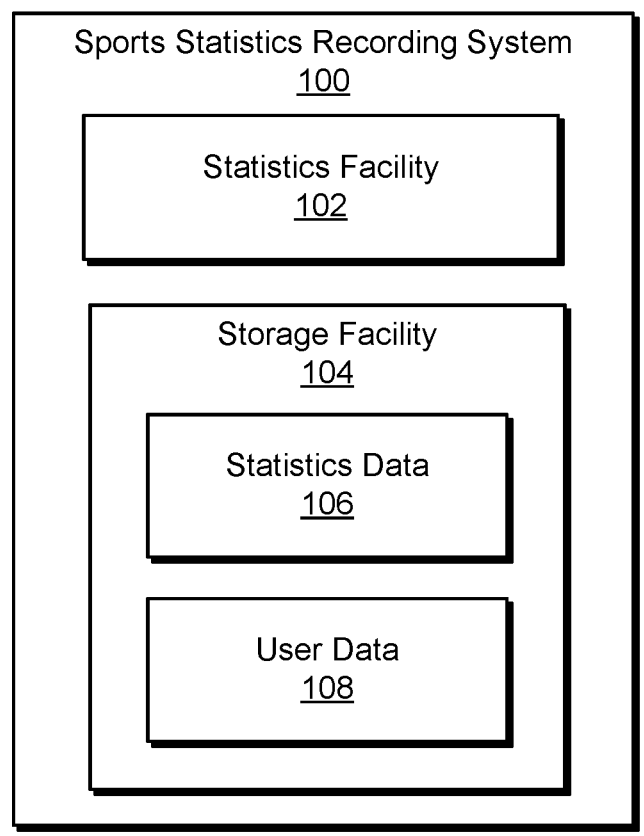
FIG. 1 illustrates an exemplary sports statistics recording system according to principles described herein.

Methods and systems for recording statistics associated with a sporting event are described herein. The methods and systems described herein may be particularly beneficial for recording individual and/or team statistics associated with a sporting event in a convenient and intuitive way, even when there is a fast pace of play during the sporting event.

As used herein, a "sporting event" may include any type of sports activity for which it may be desirable to record statistics. For example, a sporting event may refer to a soccer match, a football game, a baseball game, a tennis match, a hockey game, a basketball game, or any other individual or team-based sport. In certain examples, the sporting event may be a live sporting event and methods and systems described herein may facilitate recording statistics in real time during the live sporting event. Alternatively, the methods and systems described herein may facilitate recording statistics during playback of a video (e.g., a playback of a live video or a recording) of the sporting event.

The systems and methods described herein may facilitate recording any suitable type of statistic. In certain examples, the statistics recorded may be different depending on the type of sporting event. For example, statistics recorded for a soccer match may be different from statistics recorded for a basketball game. Exemplary types of statistics that may be recorded are described herein.

As will be described in more detail below, methods and systems described herein may facilitate recording statistics associated with a sporting event by providing one or more improved graphical user interfaces that allow a user of a mobile computing device (e.g., a smart phone, a laptop computer, a tablet computer, etc.) to enter different user inputs during the sporting event to indicate various occurrences (e.g., plays, penalties, etc.) during the sporting event. To illustrate, a sporting event statistics recording system such as is described herein may provide, during a sporting event, a graphical user interface for display on a display screen of a mobile computing device. The graphical user interface may include an icon representative of a participant (e.g., a player) in the sporting event. The sporting event statistics recording system may define multiple different types of user inputs that may be provided by a user of the mobile computing device in relation to the icon. The sporting event statistics recording system may further define associations between the different types of user inputs and different sporting event occurrences that are represented by the different types of user inputs. Accordingly, during a sporting event, the sporting event statistics recording system may detect different types of user input that are provided by a user in relation to the icon and record statistics representing corresponding sporting event occurrences that have occurred during the sporting event.

As an example, for a soccer match, the icon may be displayed on a touchscreen display of a mobile computing device and may represent a player participating in the soccer match, and the sporting event statistics recording system may be configured to detect a touchscreen tap type of gesture on the icon, a touchscreen swipe type of gesture originating on the icon and moving in a particular direction across a touchscreen display, and in some examples a touchscreen press-and-hold type of gesture on the icon. The sporting event statistics recording system may be configured to record certain statistics in response to detecting these types of inputs in relation to the icon. For example, the sporting event statistics recording system may record a ball possession event in response to a tap type of gesture on the icon (e.g., the player represented by the icon gained possession of the ball), a specific action performed by the player during live play in response to a swipe type of gesture that originates on the icon and moves away from the icon in a particular direction (e.g., the player attempted a shot on goal for a swipe to the left, missed an opportunity for an upward swipe, executed a successful one-on-one move for a downward swipe, or crossed the ball across the face of the goal for a swipe to the right), or a specific action performed by the player that causes a stop in play or causes play to resume (e.g., the player committed a foul, was called offsides, or played the ball back in with a throw-in, a corner kick, or free kick).

Accordingly, during a sporting event, the sporting event statistics recording system may detect a first user input associated with the icon and determine that the first user input is associated with a first action (e.g. a pass of a ball) performed during the sporting event. The sporting event statistics recording system may record a first statistic for the sporting event based on the participant represented by the icon and the first action associated with the user input associated with the icon. The sporting event statistics recording system may detect, during the sporting event, a second user input associated with the icon. The second user input may be a different type of input from the first user input. The sporting event statistics recording system may determine in any suitable manner that the second user input is associated with a second action performed during the sporting event. The sporting event statistics recording system may then record a second statistic for the sporting event based on the participant represented by the icon and the second action associated with the second user input associated with the icon.

The user inputs detected by the sporting event statistics recording system may correspond to any suitable user input that may be provided by a user to a mobile computing device. For example, the user inputs may correspond to touch inputs provided on a touch screen of the mobile computing device.

As mentioned, in certain examples, the sporting event statistics recording system may detect the first user input by detecting a tap input provided by a user of the mobile computing device on the icon. For example, the user may tap the icon displayed on the display screen of the mobile computing device to indicate that the participant has received or passed a ball.

As also mentioned, in certain examples, the sporting event statistics recording system may detect the second user input by detecting a swipe input in which the user of the mobile computing device swipes from the icon representative of the participant during the sporting event in one of a plurality of predefined directions on the display screen of the mobile computing device. Each direction included in the plurality of predefined directions may correspond to a different action option that may be selected to indicate an action performed by the participant during the sporting event. For example, the user may swipe from the icon to the right side of the display screen to indicate that the participant performed a first type of play, the user may swipe from the icon to the top side of the display screen to indicate that the participant performed a second type of play, the user may swipe from the icon to left side of the display screen to indicate that the participant performed a third type play, and the user may swipe from the icon to the bottom side of the screen to indicate that the participant performed a fourth type of play. Exemplary types of plays that may indicated by a given swipe user input are described in more detail herein.

In certain examples, the sporting event statistics recording system may detect a third user input associated with the icon. The third user input may be a different type of input from the first user input and the second user input. For example, the third user input may correspond to a touch and hold user input in which the user of the mobile computing device touches and holds the touch input on the icon for a predetermined amount of time. Based on the third user input, the sporting event statistics recording system may provide an additional graphical user interface for display on the display screen of the mobile computing device. The additional graphical user interface may include a plurality of icons, each icon included in the plurality of icons representative of further actions that may be selected to indicate an action associated with the participant during the sporting event. Specific examples of icons that may be provided for display in the additional graphical user interface are described herein.

In certain examples, the sporting event statistics recording system may detect a fourth user input in which a user of the mobile computing device selects one of the plurality of icons represented in the additional graphical user interface. The fourth user input may correspond to any suitable user input that may be used to select one of the icons represented in the additional graphical user interface. Based on the fourth user input, the sporting event statistics recording system may record a third statistic associated with the selected one of the plurality of icons.

In certain examples, in response to the selection of the one of the plurality of icons in the additional graphical user interface, the sporting event statistics recording system may provide the first graphical user interface for display again on the display screen of the mobile computing device.

In certain examples, to facilitate entering statistics, the sporting event statistics recording system may provide one or more graphical user interfaces for display on a display screen of the mobile computing device based on a sporting event context in which an action is performed during the sporting event. As used herein, a "sporting event context" refers to a specific circumstance or set of circumstances in which an action is performed during a sporting event. The specific circumstance or set of circumstances associated with a sporting event context may give rise to different statistics that may be recorded by sporting event statistics recording system. For example, a first set of statistics may be associated with a first sporting event context, a second set of statistics may be associated with a second sporting event context, and a third set of statistics may be associated with a third sporting event context. To illustrate, when the sporting event is a soccer match, a first sporting event context may include circumstances associated with a shot on goal. The set of statistics associated with such a shot on goal sporting event context may include, for example, where the shot went in relation to the goal posts, whether the shot was blocked and if so by who/what, whether the shot went out of play or back into play, whether the shot resulted in a goal, etc. On the other hand, a second sporting event context may include circumstances associated with a side line out of bounds play. The set of statistics associated with such a side line out of bounds sporting event context may include, for example, who kicked the ball out of bounds, where the ball was kicked out of bounds, who threw the ball back into play, etc. Sporting event statistics recording system may be configured to record statistics associated with any suitable number of sporting event contexts as may serve a particular implementation.

In certain examples, sporting event contexts may be defined by and/or identified based on a set of rules associated with a sporting event. For example, when the sporting event is a soccer match, a first sporting event context may be defined by rules associated with an end line out of bounds play, a second sporting event context may be defined by rules associated with a handball infraction, a third sporting event context may be defined by rules associated with a penalty kick, etc.

Because different sporting event contexts may give rise to different recordable statistics, a sporting event statistics recording system may be configured in certain examples to determine whether an action performed in the sporting event is performed in a first sporting event context or a second sporting event context. When the action is performed in the first sporting event context, sporting event statistics recording system may provide, during the sporting event, a first graphical user interface flow for display on the display screen of the mobile computing device. When the action is performed in the second sporting event context, sporting event statistics recording system may provide, during the sporting event, a second graphical user interface flow for display on the display screen of the mobile computing device.

As used herein "a graphical user interface flow" refers to a series of graphical user interfaces that may be sequentially provided for display on a display screen to facilitate recording statistics associated with a particular sporting event context. For example, the first graphical user interface flow may include a first series of graphical user interfaces and the second graphical user interface flow may include a second series of graphical user interfaces. Each graphical user interface included in the first series of graphical user interfaces may be configured to facilitate a user of the mobile computing device entering information associated with a different statistic associated with the first action when the first action is performed in the first sporting event context. Similarly, each graphical user interface included in the second series of graphical user interfaces may be configured to facilitate the user of the mobile computing device entering information associated with a different statistic associated with the first action when the first action is performed in the second sporting event context. Exemplary graphical user interface flows are described herein.

The methods and systems described herein may allow spectators, parents, and/or coaching personnel to conveniently, intuitively, and quickly indicate actions that occur during a sporting event and review recorded statistics in real time, at predetermined times during the sporting event, and/or at any suitable time after the sporting event. The methods and systems described herein may facilitate recording of a robust set of statistics, by way of intuitive graphical user interfaces and user interface input mechanisms, in ways that support real time recording of robust statistics for a sporting event that requires fast statistics recording to keep up with a fast pace of play, in ways that minimizes introduction of statistical errors, and/or in ways that do not require a user to experience an overly challenging learning curve or to be overly burdened while recording statistics. The methods and systems described herein may provide additional or alternative benefits as may serve a particular implementation. Various embodiments will now be described in more detail with reference to the figures. The disclosed methods and systems may provide one or more of the benefits mentioned above and/or various additional and/or alternative benefits that will be made apparent herein.

FIG. 1 illustrates a sporting event statistics recording system 100 ("system 100") that may facilitate recording statistics in accordance with methods and systems described herein. As shown, system 100 may include, without limitation, a statistics facility 102 and a storage facility 104 selectively and communicatively coupled to one another.

The facilities may be communicatively coupled one to another by any suitable communication technologies.

While facilities 102 and 104 are shown to be separate facilities in FIG. 1, any of those facilities may be combined into a single facility or split into additional facilities as may serve a particular implementation. Additionally or alternatively, one or more of the facilities 102 and 104 may be omitted from and external to system 100 in other implementations. Facilities 102 and 104 of system 100 may include or be otherwise implemented by one or more computing devices configured to perform one or more of the operations described herein. In such implementations, system 100 may be referred to as a computer-implemented system 100. Facilities 102 and 104 will now be described in more detail.

Storage facility 104 may be configured to store data generated and/or used by statistics facility 102. For example, storage facility 104 may store statistics data 106 representative of statistics generated based on one or more user inputs provided by way of graphical user interfaces according to principles described herein.

Storage facility 104 may store user data 108 associated with one or more end users of a statistics recording service, such as data representing user profiles of the users. The user profiles may include any information associated with the statistics recording service (e.g., players, teams, coaches, schedules, etc.) as well as any other applicable information. Storage facility 104 may store any other suitable information in other implementations.

Statistics facility 102 may provide one or more graphical user interface views to facilitate recording statistics associated with a sporting event. The graphical user interfaces may be provided for display in any suitable form. For example, statistics facility 102 may be configured to provide a website, a client application user interface (e.g., a user interface provided by a client application such as a "mobile app" installed and running on a mobile computing device), and/or any other suitable form of user interface. In certain examples, the graphical user interfaces described herein may be provided as part of a cloud-based application implemented by statistics facility 102.

Figure 2:
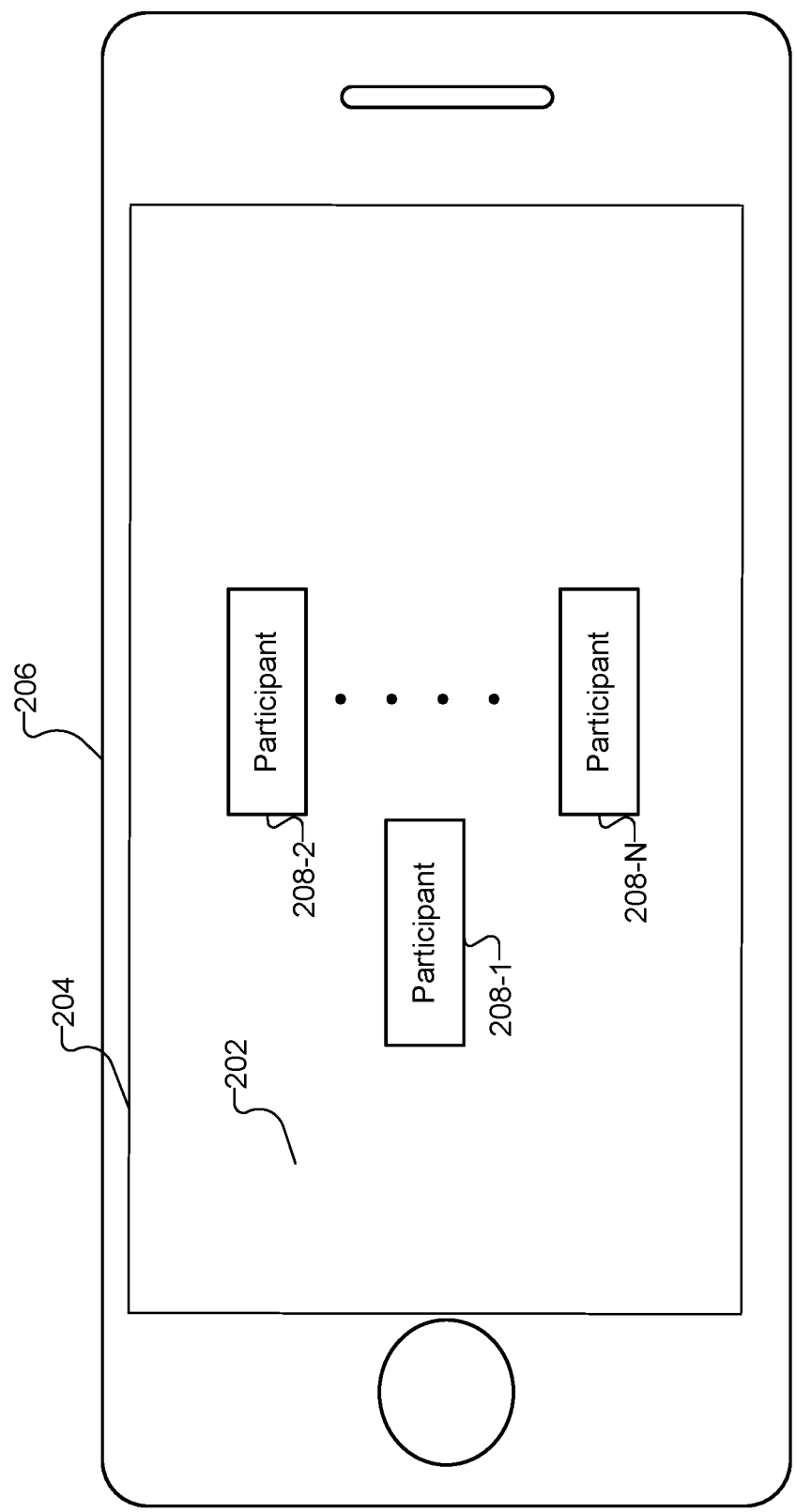
FIGS. 2-49 illustrate exemplary graphical user interfaces that may be provided for display on a display screen of a mobile computing device according to principles described herein.

FIG. 2 shows an exemplary graphical user interface 202 that may be provided by system 100 (e.g., statistics facility 102) for display on a display screen 204 of a mobile computing device 206. As shown in FIG. 2, graphical user interface 202 includes a plurality of icons 208 (e.g., icons 208-1 through 208-N) that represent participants in a sporting event. Any suitable number of icons 208 may be provided for display in graphical user interface 202 as may suit a particular implementation.

Each icon 208 may be configured to receive a plurality of types user inputs to facilitate system 100 recording statistics associated with the sporting event. For example, icon 208 may be configured to receive a first type of user input, a second type of user input, and a third type of user input. Each of the types of user inputs may be different from the others and may be utilized in any suitable manner, such as described herein, to facilitate recording statistics associated with a sporting event. To illustrate, the first type of user input may correspond to a tap user input. During the sporting event, a user of mobile computing device 206 may, for example, tap icon 208-1 to indicate that the participant (e.g., player) represented by icon 208-1 received possession of the ball. Subsequently, the user of the mobile computing device 206 may tap icon 208-2 to indicate that the ball was passed from the participant represented by icon 208-1 to the participant represented by icon 208-2. Based on these touch inputs, system 100 may record one or more statistics associated with the actions performed by the participants during the sporting event. For example, system 100 may record the time of possession by the participant represented by icon 208-1 and/or that the pass to the participant represented by icon 208-2 was successful.

Figure 3:
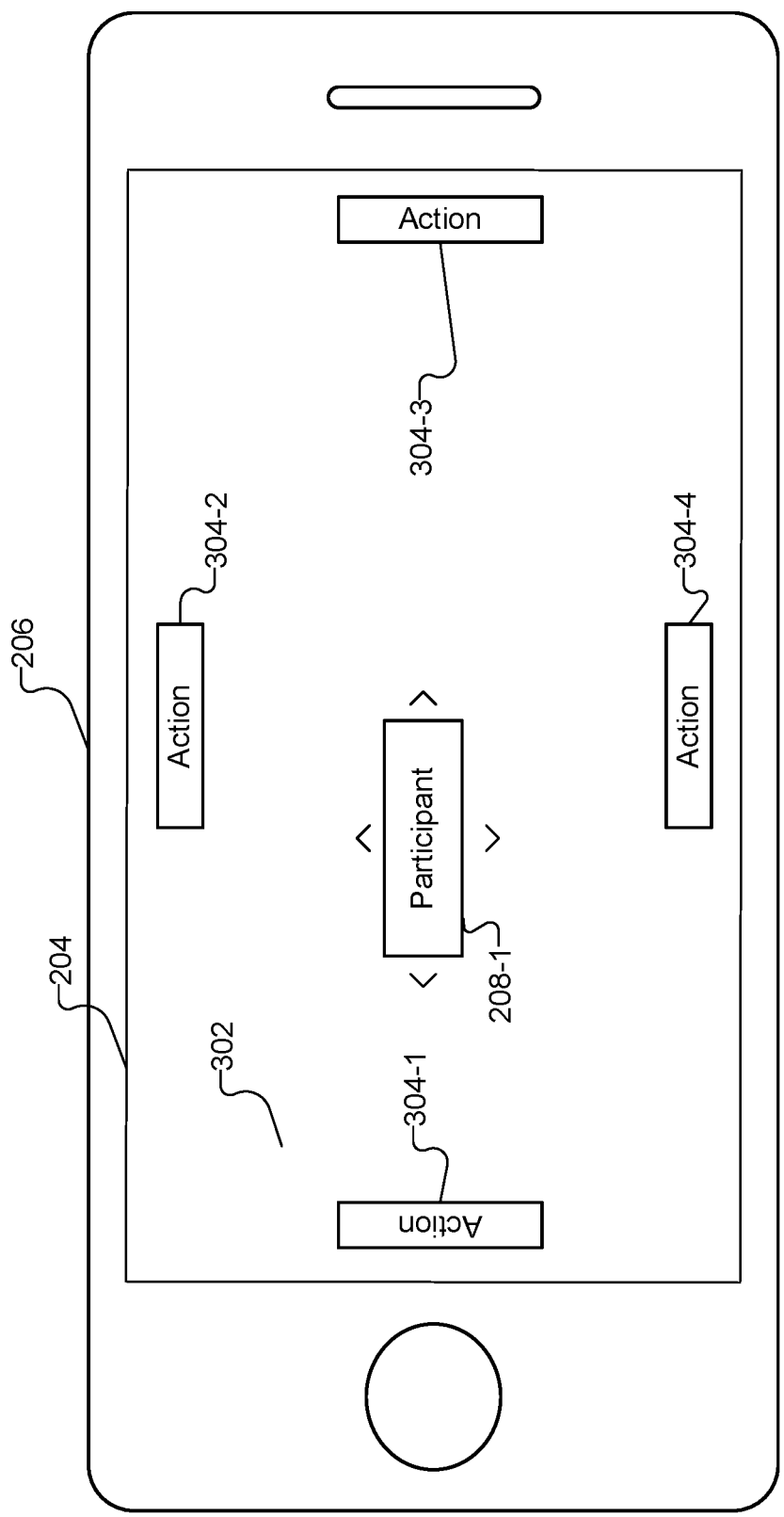

The second type of input may correspond to a swipe input provided with respect to one of icons 208. For example, system 100 may detect a swipe input being provided with respect to icon 208-1. Upon detecting the initiation of the swipe input, system 100 may provide another graphical user interface to facilitate the user identifying an action performed by a participant associated with icon 208-1. To illustrate, FIG. 3 shows an exemplary graphical user interface 302 that may be provided for display on display screen 204 in response to the user initiating a swipe input on icon 208-1. As shown in FIG. 3, actions 304 (e.g., actions 304-1 through 304-4) are provided on the sides of display screen 204. During the sporting event, a user may provide a swipe input in a predefined direction to indicate that the participant represented by icon 208-1 has performed one of actions 304. For example, the user may touch icon 208-1 and swipe upward to indicate that the participant represented by icon 208-1 has performed action 304-2. Alternatively, the user may touch icon 208-2 and swipe to the right to indicate that the participant represented by icon 208-1 has performed action 304-3. Similar swipe inputs may be provided to indicate the other actions 304 shown in FIG. 3. Actions 304 may represent any suitable play that may be performed by a participant during the sporting event. For example, action 304-1 may indicate that the participant represented by icon 208-1 lost the ball due to a challenge by an opponent.

After system 100 detects, for example, a swipe input to the right in FIG. 3, system 100 may provide graphical user interface 202 for display again on display screen 204.

The third type of user input may correspond to a touch and hold user input in which the user touches and holds one of icons 208. In response to the touch and hold input, system 100 may provide one or more additional graphical user interfaces for display on display screen 204 to facilitate the user providing further information regarding an action performed during the sporting event. Exemplary graphical user interfaces that may be provided for display by system 100 in response to a touch and hold user input are described herein.

Figure 4:
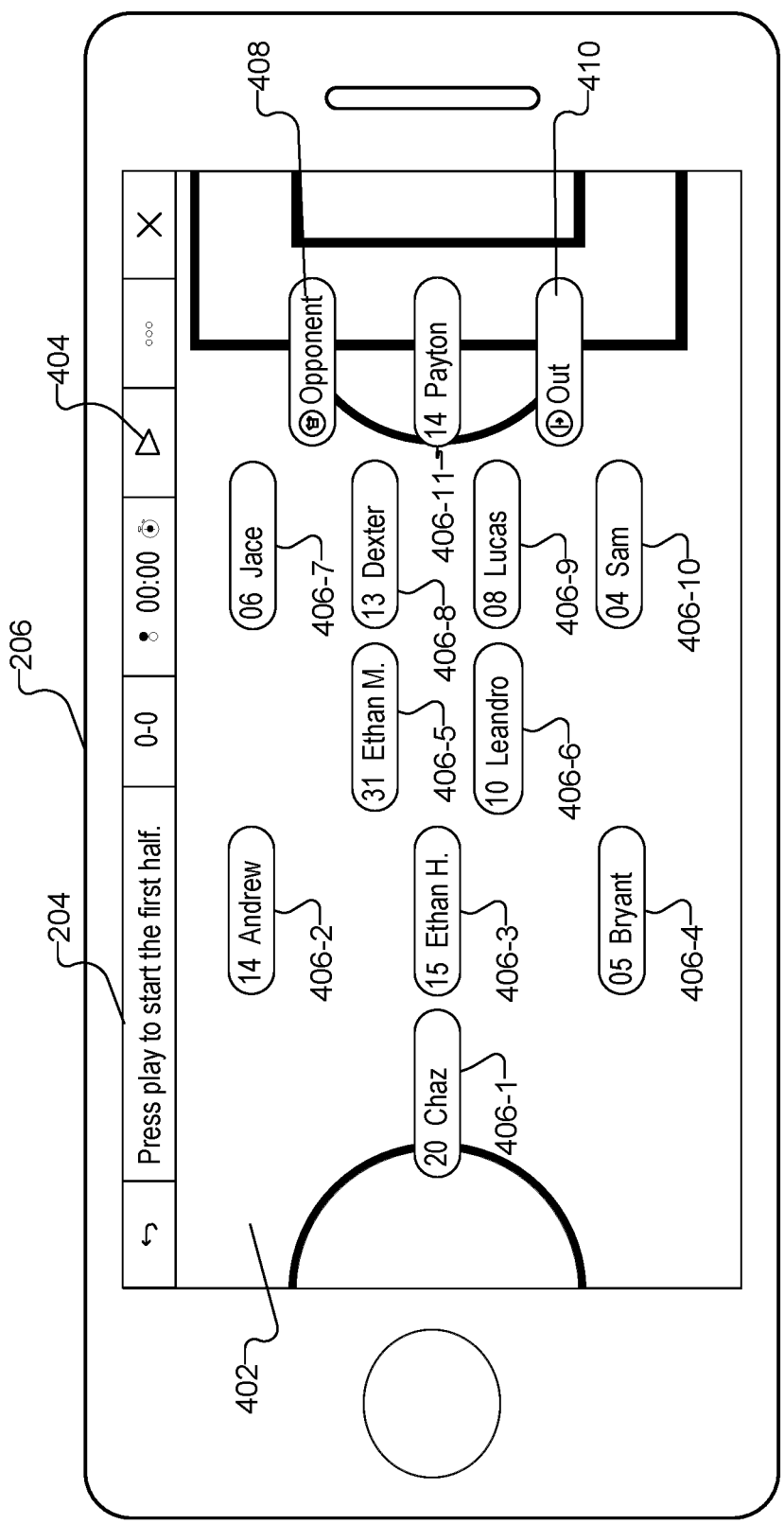

As mentioned above, principles described herein may be applied to record statistics for any type of sporting event. FIGS. 4-49 show exemplary graphical user interfaces that may be provided for display on display screen 204 when the sporting event is a soccer match. FIG. 4 shows a graphical user interface 402 that may be provided for display on display screen 204 prior to the beginning of the soccer match. When the soccer match starts, the user may select play icon 404 to begin recording statistics for the soccer match. As shown in FIG. 4, graphical user interface 402 includes a plurality of icons 406 (e.g., icons 406-1 through 406-11) that represent players for one team and that each indicate the names and numbers of the players on the field and their formation.

Graphical user interface 402 also includes an icon 408 representative of the opposing team. The user of mobile computing device 206 may perform any suitable user input with respect to icon 408 to indicate an action performed by any member of the opposing team. That is, the same actions performed during the sporting event may be recorded based on user inputs provided with respect to icon 408 regardless of which particular player on the opposing team performed the action. For example, if the opposing team has possession, each pass of the ball may be indicated by a tap on icon 408. If the opposing team makes three consecutive passes, system 100 may detect three taps provided on icon 408 by the user to generate passing statistics for the opposing team. Accordingly, in certain examples, system 100 may only record team statistics for the opposing team instead of individual statistics. Alternatively, certain embodiments may include providing icons for each of the opposing players on the other team. In such embodiments, system 100 may also record individual statistics for players on the opposing team based on one or more user inputs provided with respect to the icons representative of the opposing players.

FIG. 4 also includes an icon 410 that represents out of bounds and that may be tapped to indicate that the ball has gone out of play. For example, if Chaz has possession of the ball but then kicks the ball out of bounds, the user may enter any suitable input with respect to icon 410, such as a tap of icon 410, to indicate that the ball is out of play.

Figure 5:
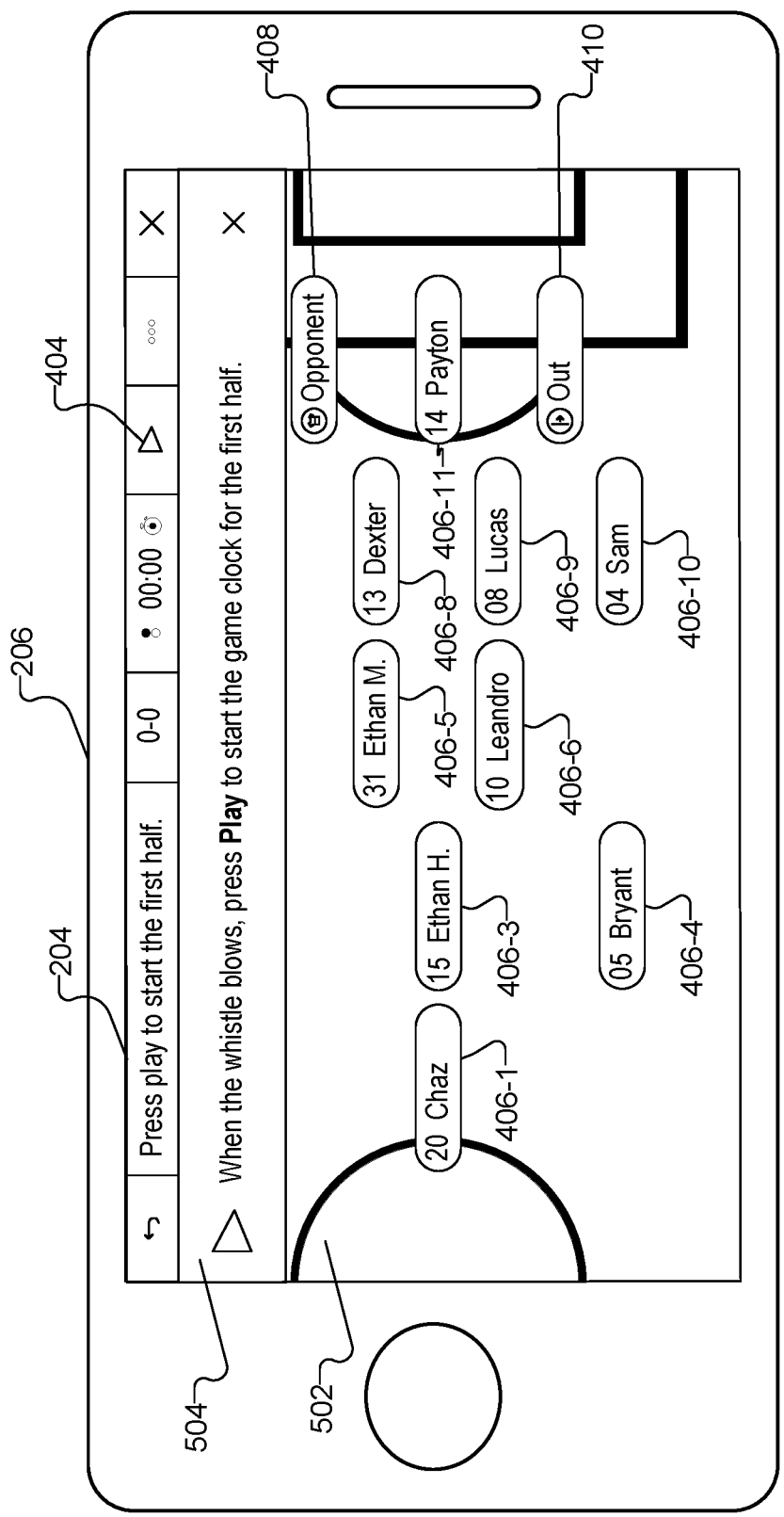

FIG. 5 illustrates a graphical user interface 502 that is similar to graphical user interface 402 but that includes instruction content 504 to inform the user regarding how to begin recording statistics during the soccer match.

Figure 6:
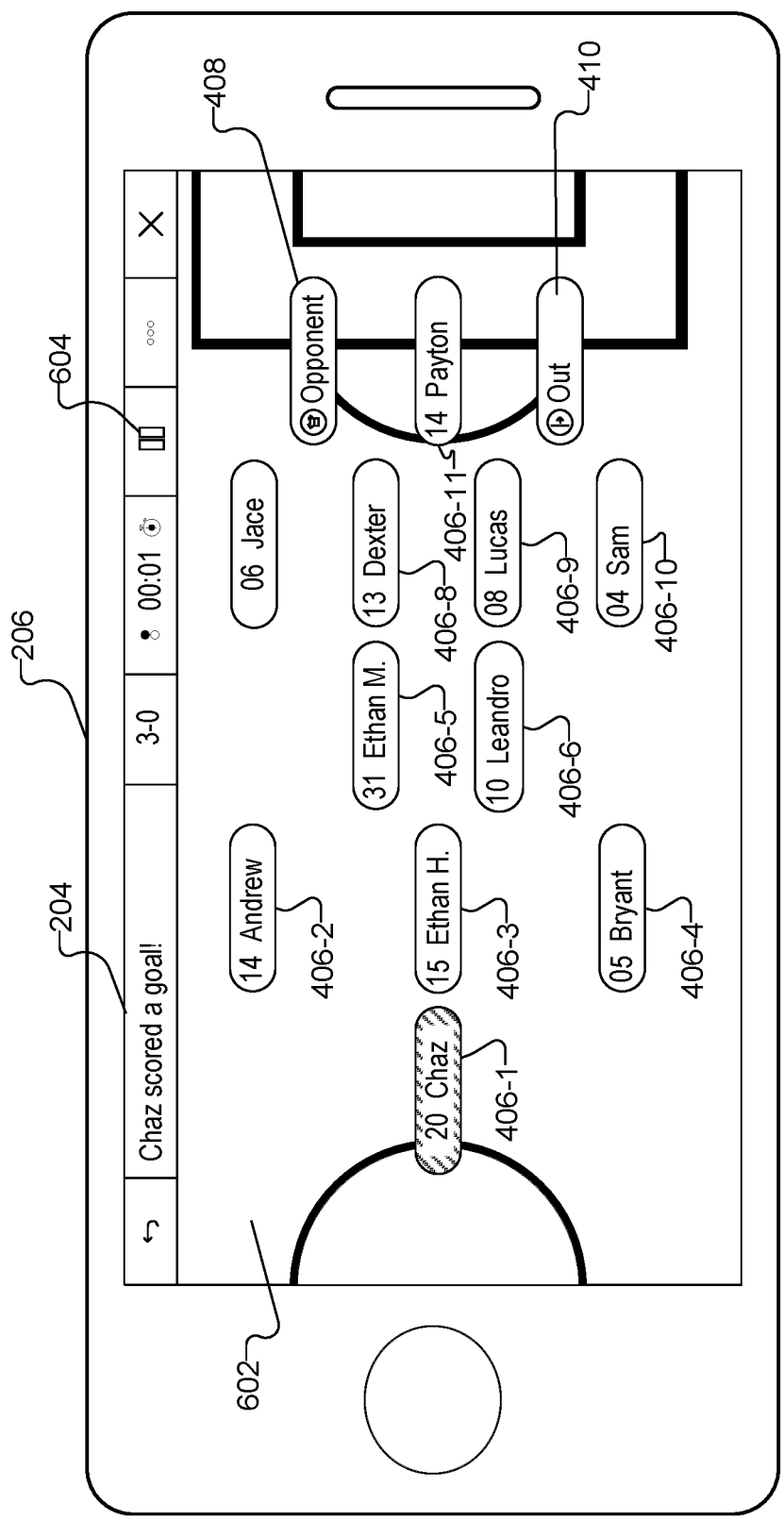

FIG. 6 illustrates a graphical user interface 602 showing how possession may be indicated during the soccer match. As shown in FIG. 6, icon 406-1 is crosshatched indicating that the player named "Chaz" currently has possession of the ball. However, any suitable type of indicator may be used to show which player has possession at a given time. For example, icon 406-1 may be highlighted in any suitable manner in other implementations to indicate possession. FIG. 6 also shows a pause icon 604 that may be used to pause recording of statistics during the sporting event.

Figure 7:
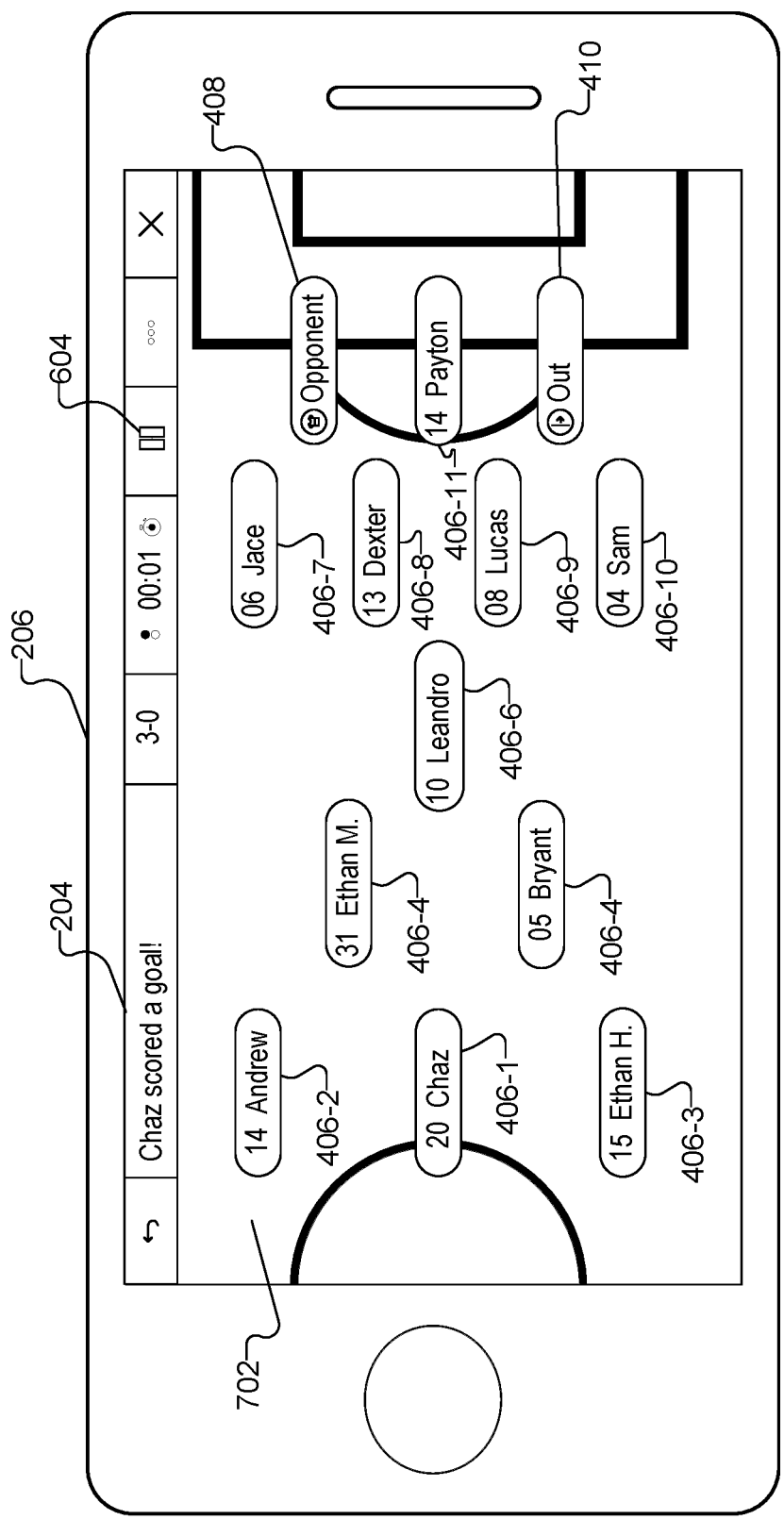

FIGS. 6 and 7 show various different formations that may be implemented during the soccer match. System 100 may provide one of the graphical user interfaces shown in FIGS. 6 and 7 based on an input provided by a user of mobile computing device 206. The user may select a formation in any suitable manner (e.g., through a menu or settings screen) such that the formation represented on display screen 204 matches the formation of the players currently on the field. The exemplary formations depicted in FIGS. 6 and 7 are provided for illustrative purposes only. It is understood that any suitable type of formation may be depicted in certain examples.

Figure 8:
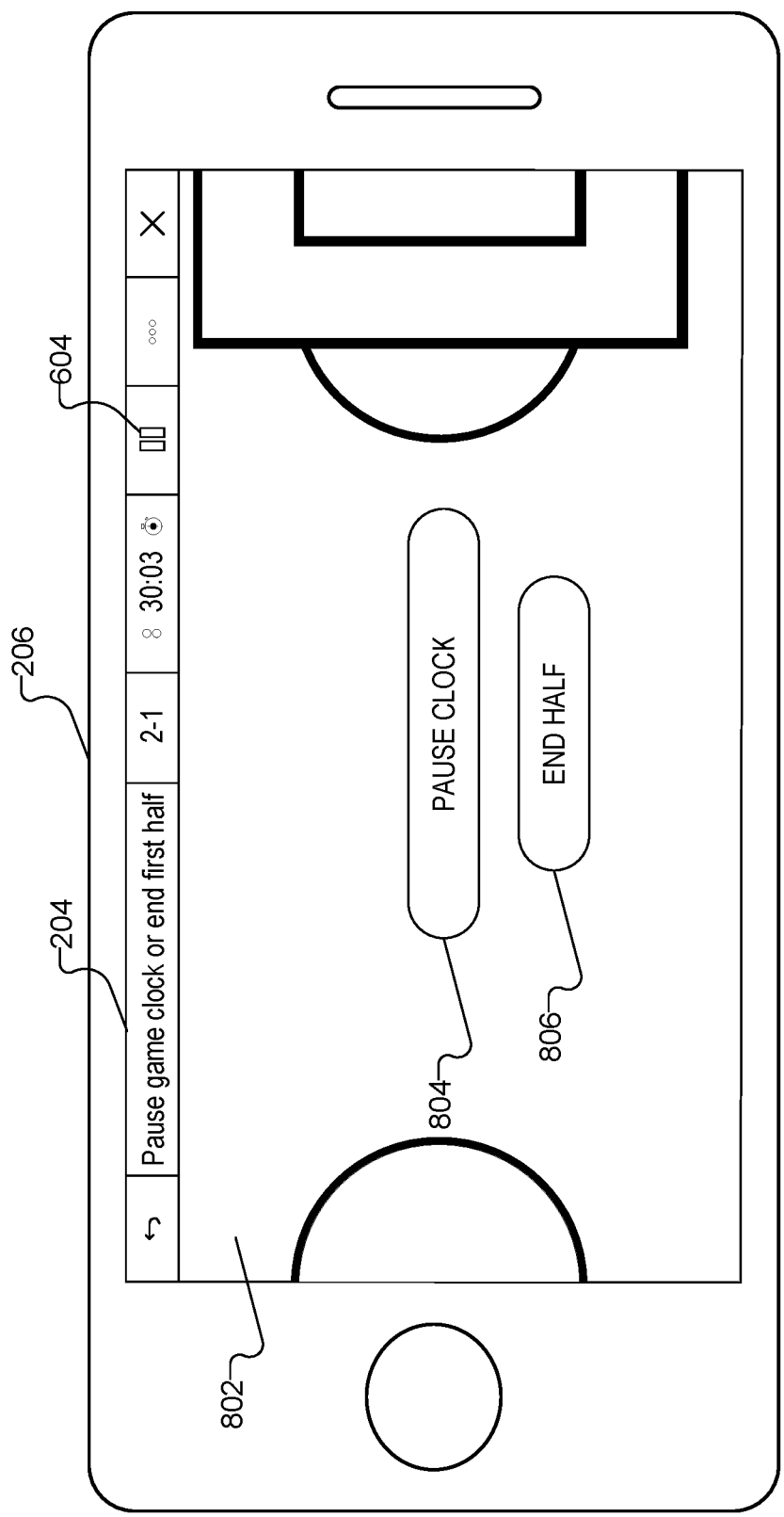

FIG. 8 illustrates a graphical user interface 802 that may be provided for display on display screen 204 at the end of the first half. System 100 may provide graphical user interface 802 for display on display screen 204 when a time limit associated with the first half is exceeded. The user may then either pause the game clock by selecting icon 804 or indicate that the first half has ended by selecting icon 806.

Figure 9:
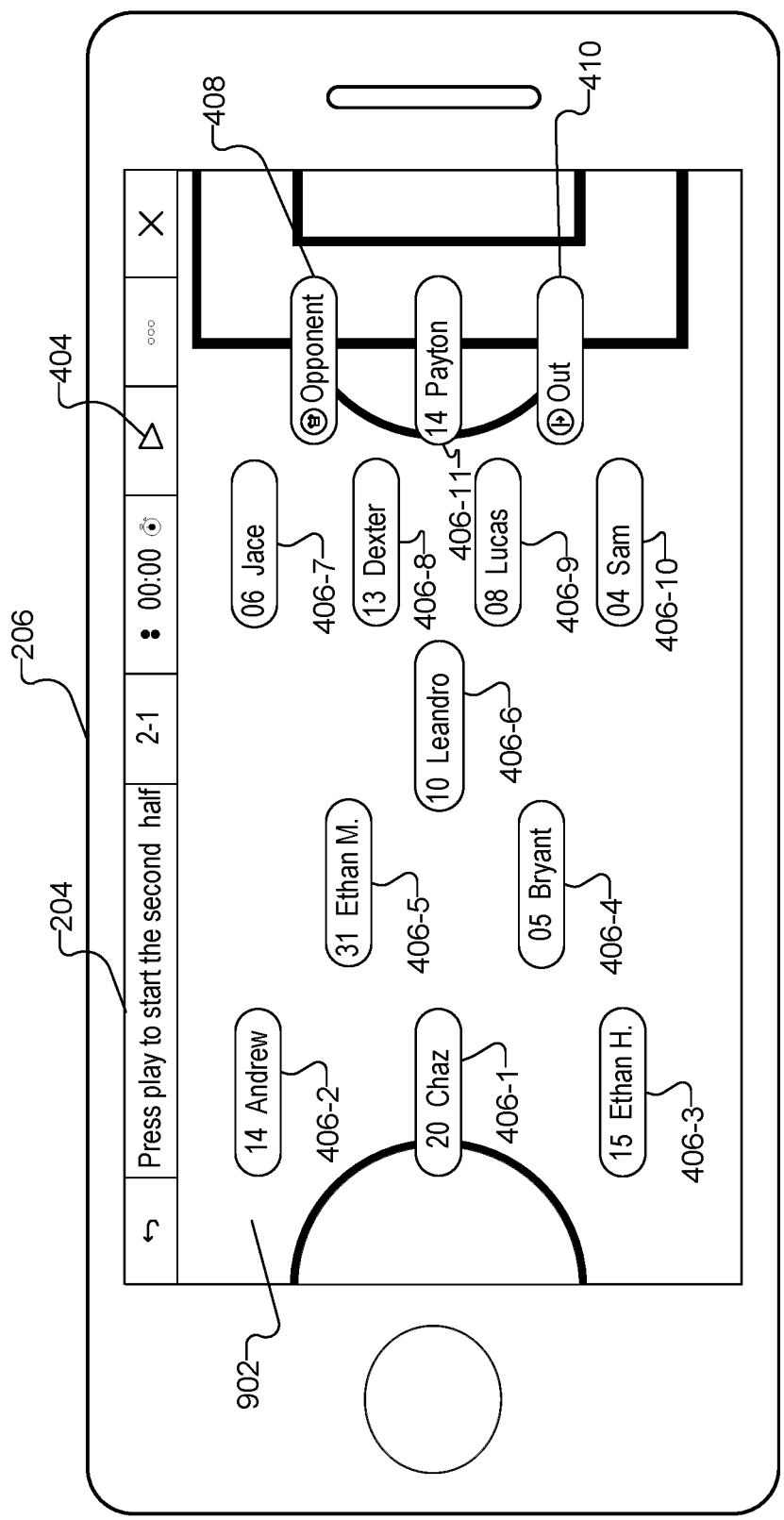

FIG. 9 shows a graphical user interface 902 that may be provided for display by system 100 at the start of the second half of the soccer match. Similar to graphical user interface 402, the user may select play icon 404 to begin recording statistics for the second half of the soccer match.

Figure 10:
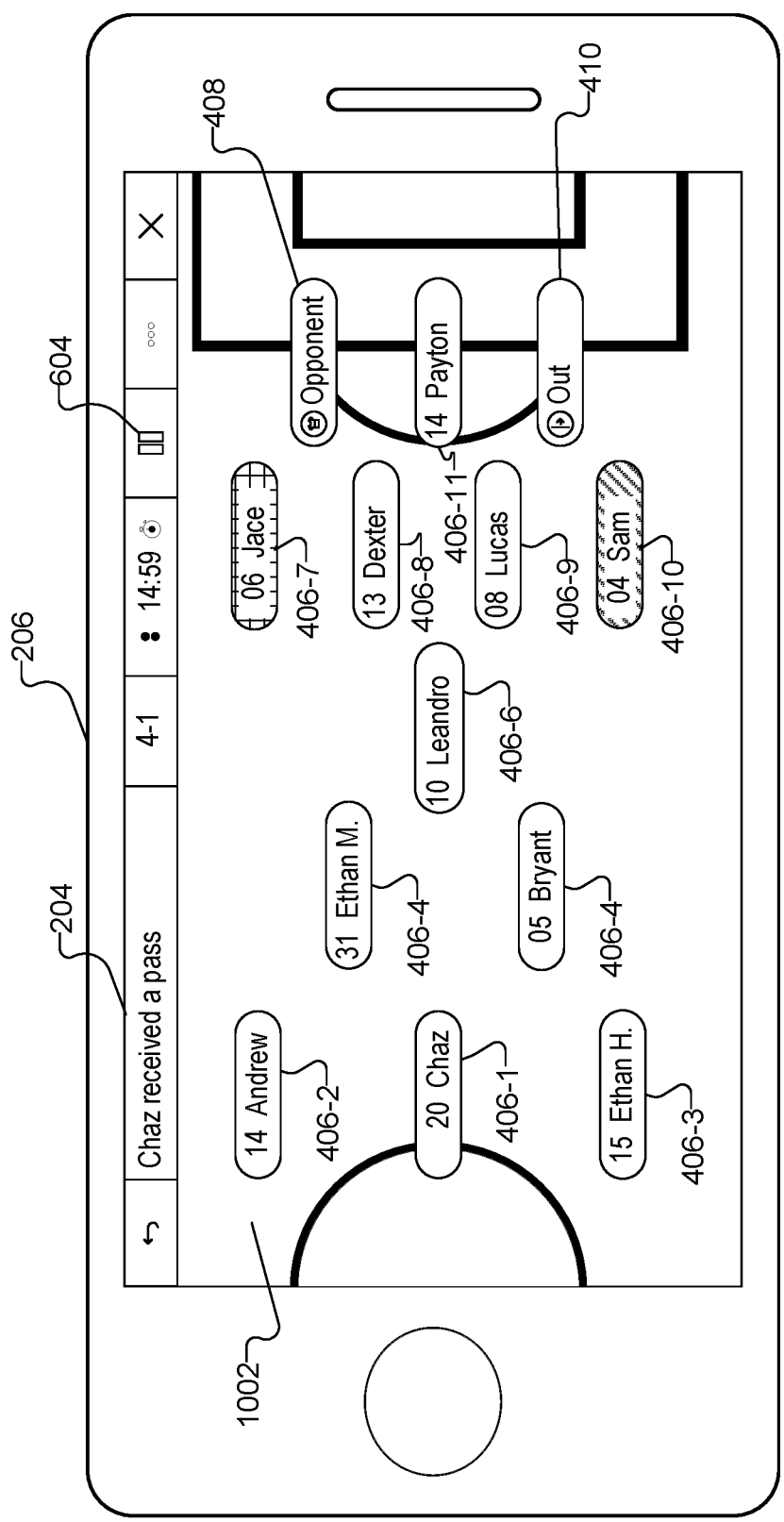

In certain examples, graphical user interfaces such as those described herein may visually indicate a path of progression of a play performed during the soccer match. System 100 may visually depict the path of progression of the play in any suitable manner within a graphical user interface. For example, a first type of icon may be provided for display to indicate the player currently in possession of the ball and a second type of icon may be provided for display to indicate which player(s) previously had possession of the ball. Additionally or alternatively, a first type of highlighting may be provided for display to indicate the player currently in possession of the ball and a second type of highlighting (e.g., a less pronounced highlighting) may be provided for display to indicate which player(s) previously had possession of the ball. Additionally or alternatively, a first type of crosshatching may be provided for display to indicate the player currently in possession of the ball and a second type of crosshatching may be provided for display to indicate which player(s) previously had possession of the ball. To illustrate, FIG. 10 shows a graphical user interface 1002 in which the icon 406-10 representing the player "Sam" is cross-hatched with a first type of crosshatching (e.g., grid crosshatching) with respect to other icons 406. The icon 406-7 representing the player "Jace" is also crosshatched but the crosshatching is different (e.g., diagonal crosshatching) than icon 406-2. The type of crosshatching used on icon 406-10 and icon 406-7 may indicate that Jace currently has possession of the ball and that Sam passed the ball to Jace. This may indicate to the user which player is currently in possession and which player was previously in possession of the ball. Although FIG. 10 only shows two icons 406 visually indicating the path of progression of the play, it is understood that in certain embodiments three or more differently represented (e.g., differently highlighted, differently crosshatched, etc.) icons may be used to show the movement of the ball between players.

Figure 11:
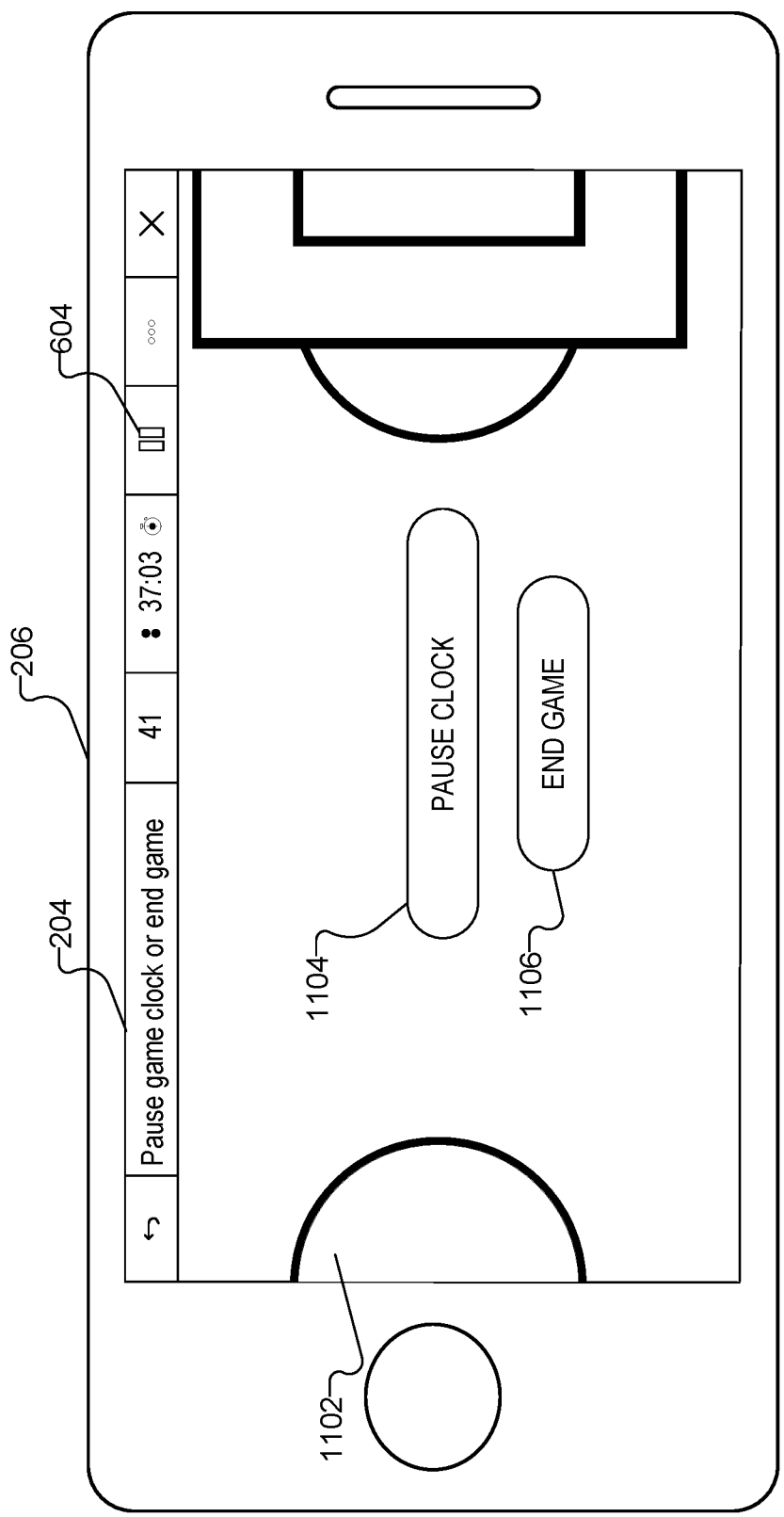

FIG. 11 shows a graphical user interface 1102 that may be provided for display on display screen 204 at the end of the second half. System 100 may provide graphical user interface 1102 for display on display screen 204 when a time limit associated with the second half is exceeded. The user may either pause the game clock by selecting icon 1104 or indicate that the first half has ended by selecting icon 1106.

Figure 12:
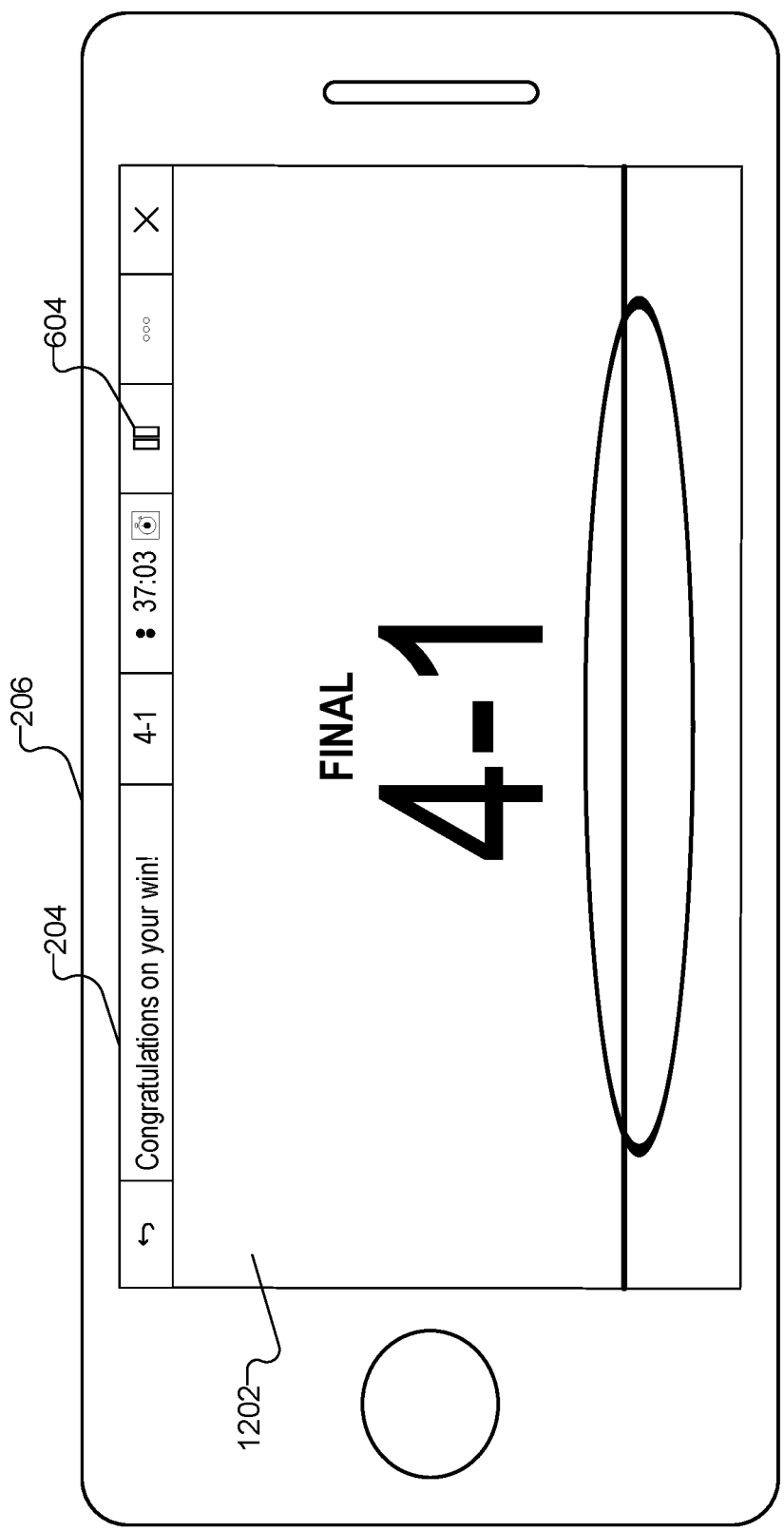

FIG. 12 shows an exemplary graphical user interface 1202 that may be provided for display on display screen 204 at the end of the soccer match. Graphical user interface 1202 may include the final score of the soccer match and/or any other suitable statistics.

Figure 13:
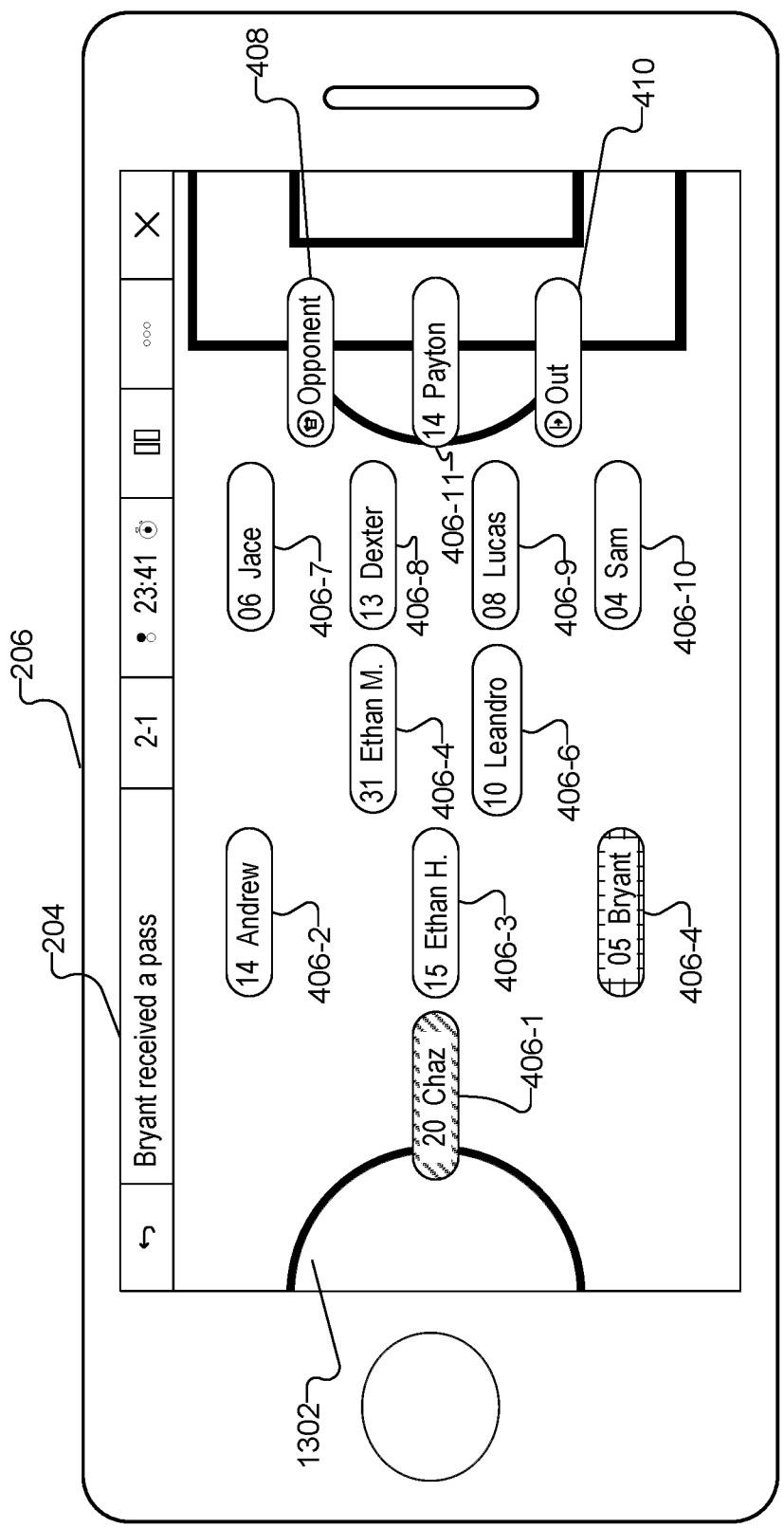

FIG. 13 shows a graphical user interface 1302 that may be provided for display on display screen 204 to indicate that the player named "Chaz" passed the ball to the player named "Bryant." Subsequently, Bryant may pass the ball back to "Chaz." While Chaz is in possession of the ball, the user may provide a swipe input originating on the icon 406-1 representing Chaz to indicate that Chaz performed a particular play with the ball. In response to the swipe input, system 100 may provide another graphical user interface for display on display screen 204 to facilitate the user indicating which one of a plurality of actions was performed by Chaz.

Figure 14:
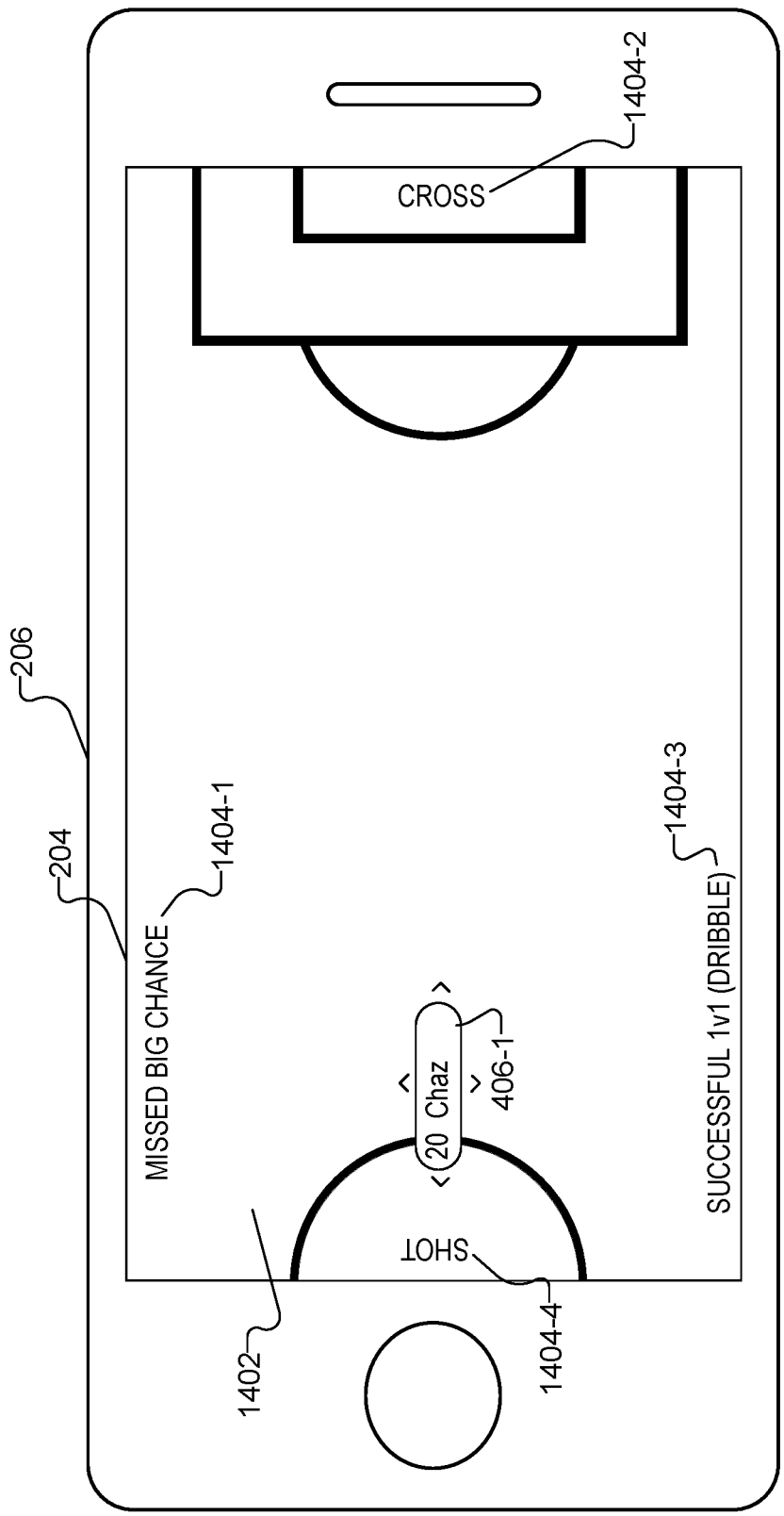

To illustrate, FIG. 14 shows a graphical user interface 1402 that may be provided for display by system 100 when Chaz has possession of the ball and the user initiated a swipe input with respect to icon 406-1. System 100 may determine that the user provided the swipe user input in one of a plurality of directions with respect to icon 406-1 to indicate that Chaz performed one of a plurality of plays 1404 (e.g., plays 1404-1 through 1404-4). For example, system 100 may determine that the user swiped upward from icon 406-1 toward play 1404-1 to indicate that Chaz "Missed a Big Chance." Alternatively, system 100 may determine that the user swiped to the right from icon 406-1 toward play 1404-2 to indicate that Chaz performed a "Cross." Alternatively, system 100 may determine that the user swiped downward from icon 406-1 toward play 1404-3 to indicate that Chaz performed a "Successful 1v1 (dribble)." Alternatively, system 100 may determine that the user swiped to the left from icon 406-1 toward play 1404-4 to indicate that Chaz made a "Shot" towards the goal. System 100 may record an action performed by Chaz during the soccer match based on the direction of the swipe user input. The exemplary plays shown in FIG. 14 are provided for illustrative purposes. It is understood that, in certain implementations less than four plays may each be associated with a particular direction of a swipe user input on display screen 204. Alternatively, more than four plays may each be associated with a particular swipe direction on display screen 204. For example, a diagonal swipe user input from icon 406-1 may indicate a fifth type of play performed by Chaz. In addition, plays other than crosses, shots, etc. may be associated with different swipe user inputs in certain implementations. In certain examples, system 100 may be configured to allow a user (e.g., a coach, parent, etc.) to customize which plays to record and associate with a particular direction of a swipe user input on display screen 204.

In certain implementations, system 100 may display graphical user interface 1402 in response to detecting an initiation of a swipe input, such as by detecting a touch input on icon 406-1 and a movement of the touch in any direction by at least a first predefined threshold distance. This may allow the user to provide a relatively smaller swipe input to launch graphical user interface 1402 in order to be able to view the actions that are associated with particular swipe directions, which may be helpful for a user who has not yet memorized the actions associated with the swipe directions. With graphical user interface 1402 displayed, the user may provide a relatively larger swipe input in an available direction to select the corresponding action. System 100 may detect the relatively larger swipe gesture (e.g., a swipe that is at least a second predefined threshold distance) in a particular direction and record the corresponding action as a statistic.

In some implementations, while graphical user interface 1302 in FIG. 13 is displayed, a user may quickly provide a relatively larger swipe in a direction away from icon 406-1, and system 100 may detect the swipe and record the corresponding action as a statistic without displaying graphical user interface 1402, which may be helpful for a user who has memorized the actions associated with the swipe directions and does not want to look at graphical user interface 1402. This may also help conserve computing resources by not loading a different graphical user interface into display memory for each swipe input when the different graphical user interface may not be helpful to a certain user.

Figure 15:
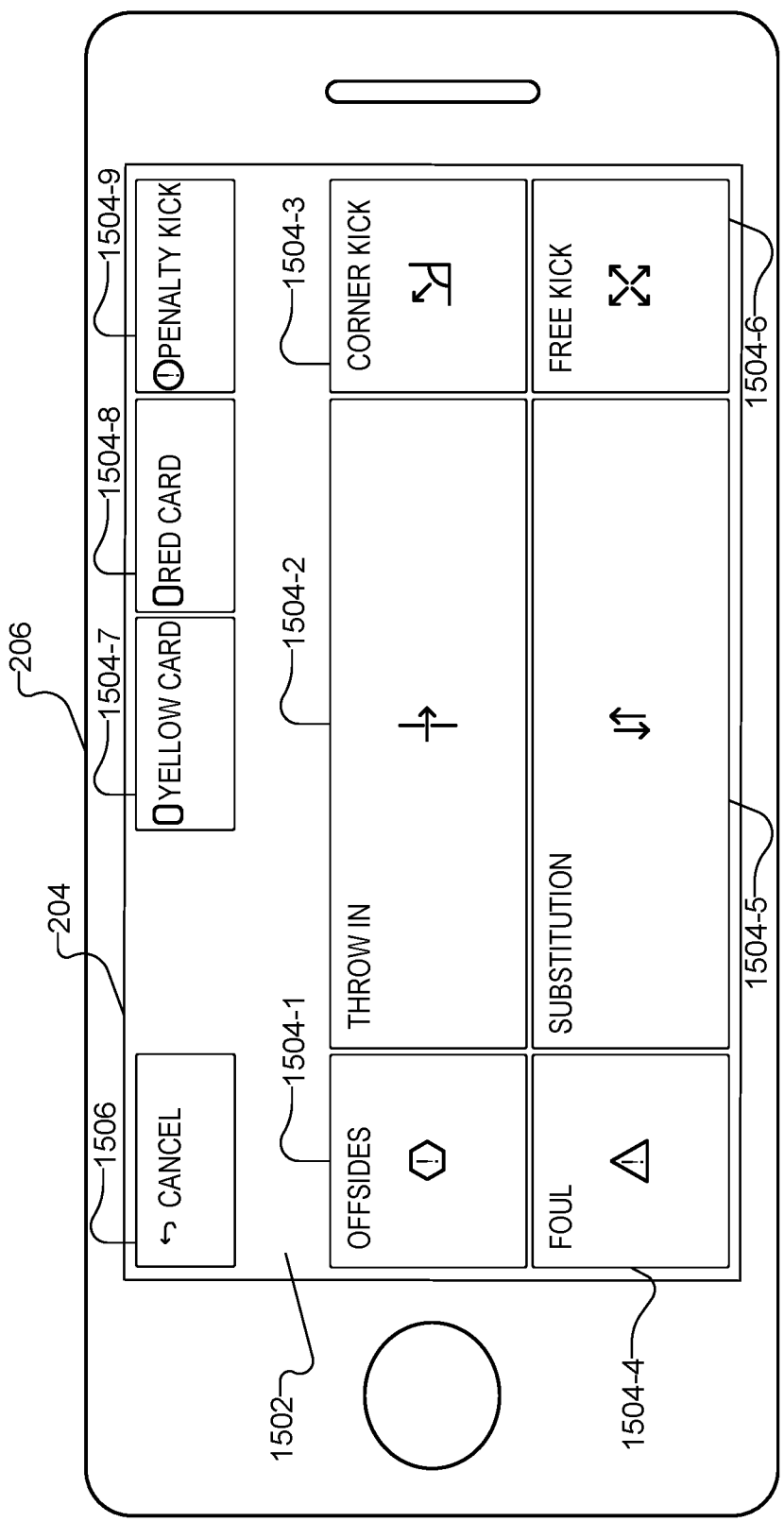

FIG. 15 shows a graphical user interface 1502 that may be provided for display on display screen 204 in certain examples when there has been a stoppage in play. As shown in FIG. 15, graphical user interface 1502 includes a plurality of icons 1504 (e.g., icons 1504-1 through 1504-9) that may be selected in different situations by a user when there has been a stoppage of play. For example, FIG. 15 shows an offsides icon 1504-1, a throw in icon 1504-2, a corner kick icon 1504-3, a foul icon 1504-4, a substitution icon 1504-5, a free kick icon 1504-6, a yellow card icon 1504-7, a red card icon 1504-8, and a penalty kick icon 1504-9. FIG. 15 also shows a cancel icon 1506 that may be selected to return, for example, to graphical user interface 1302 shown in FIG. 13. The exemplary icons 1504 shown in FIG. 15 are merely illustrative of plays/actions that may be performed during a sporting event. It is understood, that additional or alternative icons representative of play/actions may be provided for display in other implementations.

System 100 may provide graphical user interface 1502 for display at any suitable time based on one or more inputs provided by the user. In certain examples, system 100 may provide graphical user interface 1502 for display based on a series of inputs provided by the user. To illustrate an example, suppose Chaz has possession of the ball while system 100 provides graphical user interface 1302 for display on display screen 204. If Chaz kicks the ball out of bounds, the user may, for example, tap icon 410 to indicate that the ball has gone out of play. The user may then touch and hold icon 408 to indicate that the opponent will be performing some action as a result of the ball going out of play. In response to the touch and hold input provided by the user, system 100 may provide graphical user interface 1502 for display on display screen 204. The user may then select one of a plurality of icons 1504 shown in FIG. 15 based on where the ball went out of play. For example, the user may select icon 1504-3 if Chaz kicked the ball out of play over his team's end line.

In certain other examples, system 100 may provide graphical user interface 1502 for display based on a single input provided by the user. To illustrate an example, if Chaz received a yellow card, the user may touch and hold icon 406-1. In response to the touch and hold user input, system 100 may provide graphical user interface 1502 for display on display screen 204. The user may then select icon 1507-7 to indicate that Chaz received a yellow card.

System 100 may detect that the user selected one of icons 1504 and may record a statistic associated with the selection. After system 100 detects the selection, system 100 may provide, for example, graphical user interface 1302 for display again on display screen 204.

Figure 16:
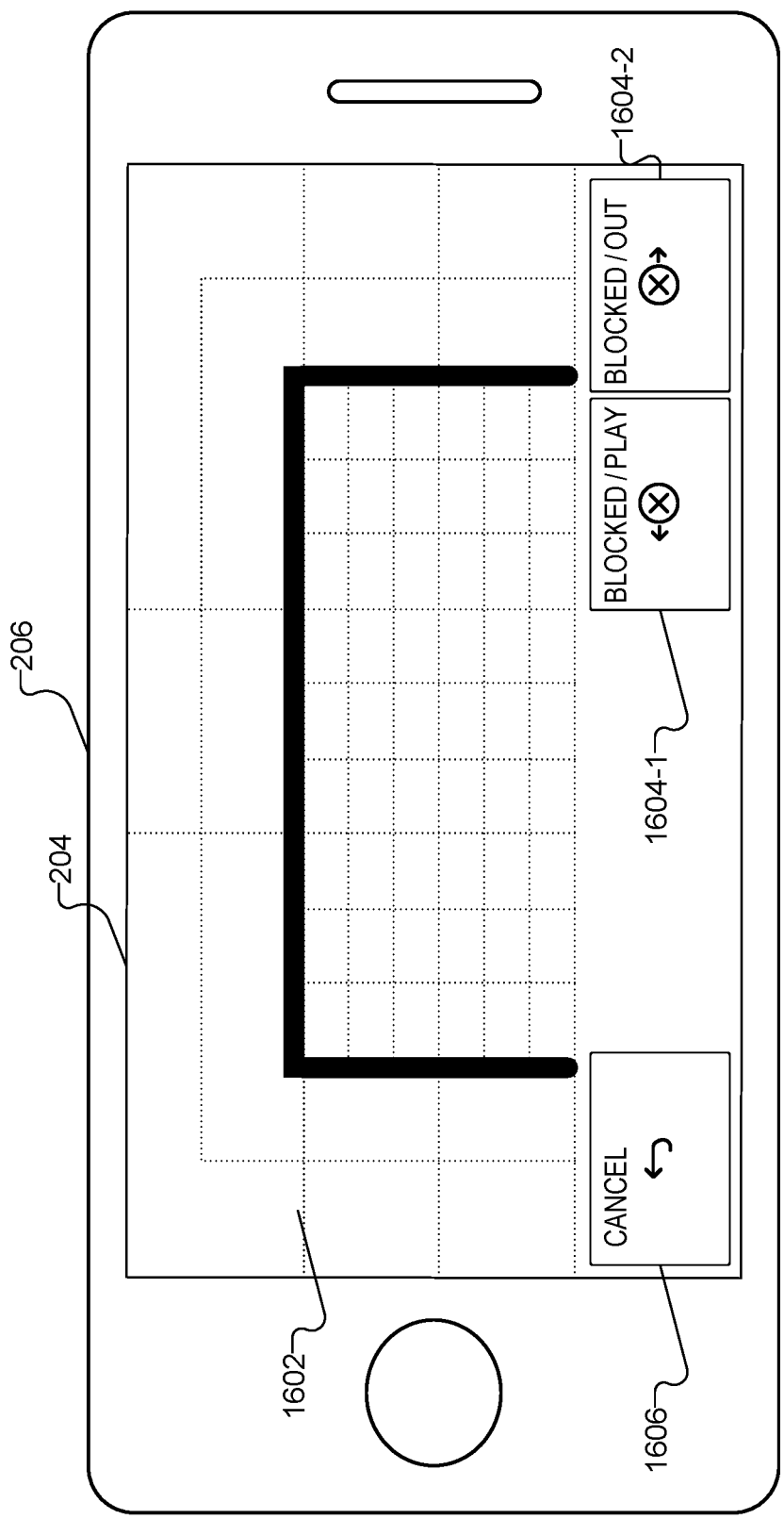

Returning to FIG. 14, if system 100 determines that the user provided a swipe user input to the left from icon 406-1, system 100 may provide one or more graphical user interfaces for display that facilitate the user providing information regarding the shot on goal. To illustrate, FIG. 16 shows a graphical user interface 1602 that may be initially provided for display on display screen 204 based on the swipe user input to the left from icon 406-1. As shown in FIG. 16, graphical user interface 1602 includes a graphical representation of the goal posts and a plurality of icons 1604 (e.g., icons 1604-1 and 1604-2) to facilitate the user indicating whether the shot was blocked. FIG. 16 also shows a cancel icon 1606 that may be used to return, for example, to graphical user interface 1302 shown in FIG. 13.

In the example shown in FIG. 16, the user may select either icon 1604-1 if the ball was blocked back into play or icon 1604-2 if the ball was blocked out of play. If the shot was not blocked, the user may either tap within or outside of the frame of the goal posts to indicate where the shot went.

Figure 17:
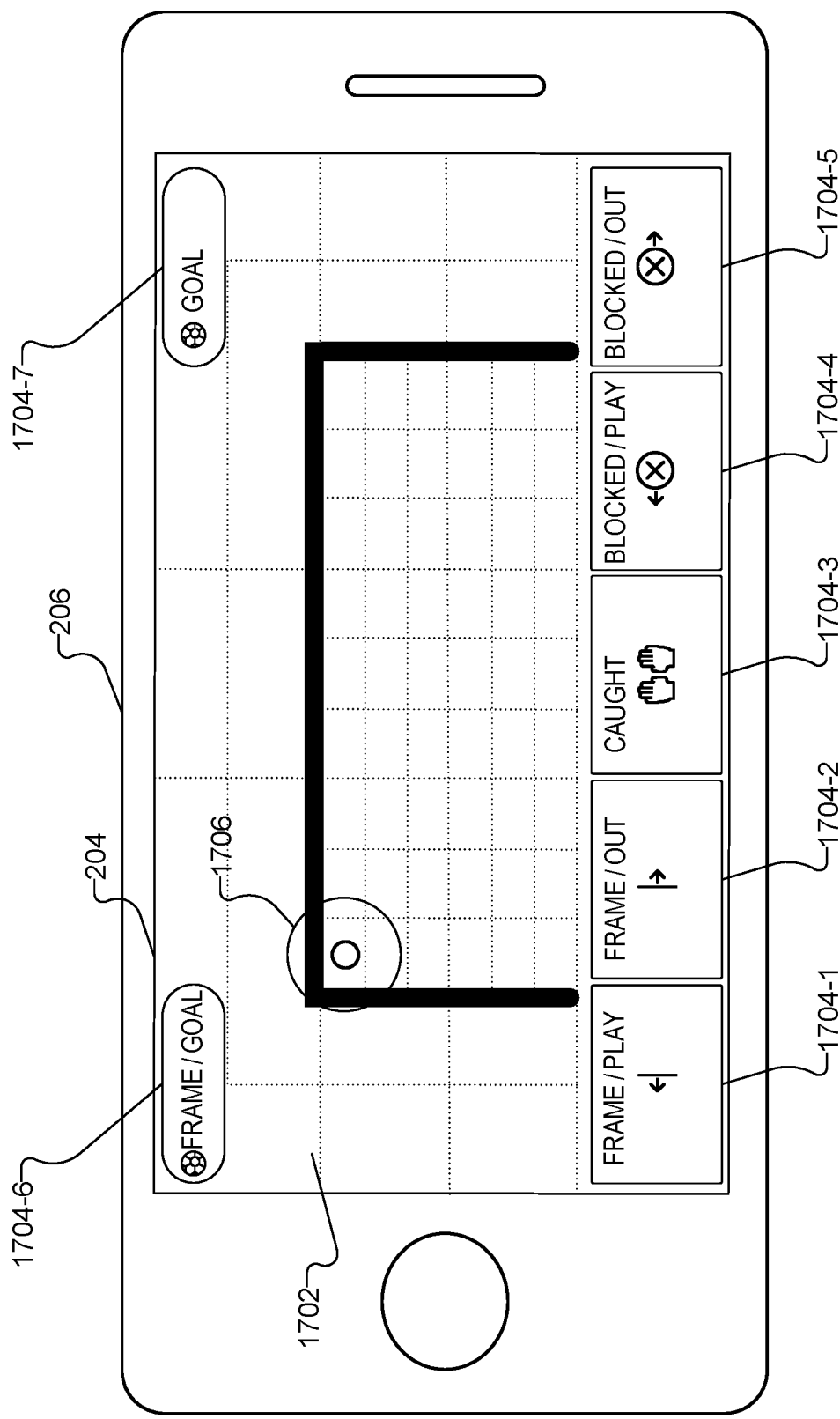

If the user taps within the frame of the goal posts in graphical user interface 1602, system 100 may provide an additional graphical user interface for display to facilitate the user providing further information regarding the shot. To illustrate, FIG. 17 shows a graphical user interface 1702 that may be provided for display when the user taps within the area of the goal posts in graphical user interface 1602. As shown in FIG. 17, a plurality of icons 1704 (e.g., icons 1704-1 through 1704-7) are provided that allow the user to indicate what occurred when the shot was on goal. For example, the user can tap icon 1704-7 to indicate that a goal was scored. Alternatively, the user can select one of the other icons 1704 to provide further information about the shot. For example, the user may select icon 1704-1 to indicate that the shot hit the frame and went back into play. Alternatively, the user may select icon 1704-2 to indicate that the shot hit the frame but went in to score a goal. Additionally or alternatively, the user may touch a region within the goal or outside of the goal to indicate where the shot went in relation to the goal posts. For example, the user may tap the display screen at a location within graphical user interface 1702 to indicate that the shot went to the upper right corner of the goal posts. In certain examples, system 100 may provide an icon for display on the display screen to show the location selected by the user. In the example shown in FIG. 17, an icon 1706 that depicts two concentric circles indicates a shot location selected by the user. System 100 is configured to detect the selection provided by the user with respect to graphical user interface 1702 and record any suitable statistics associated with the indicated action.

Figure 18:
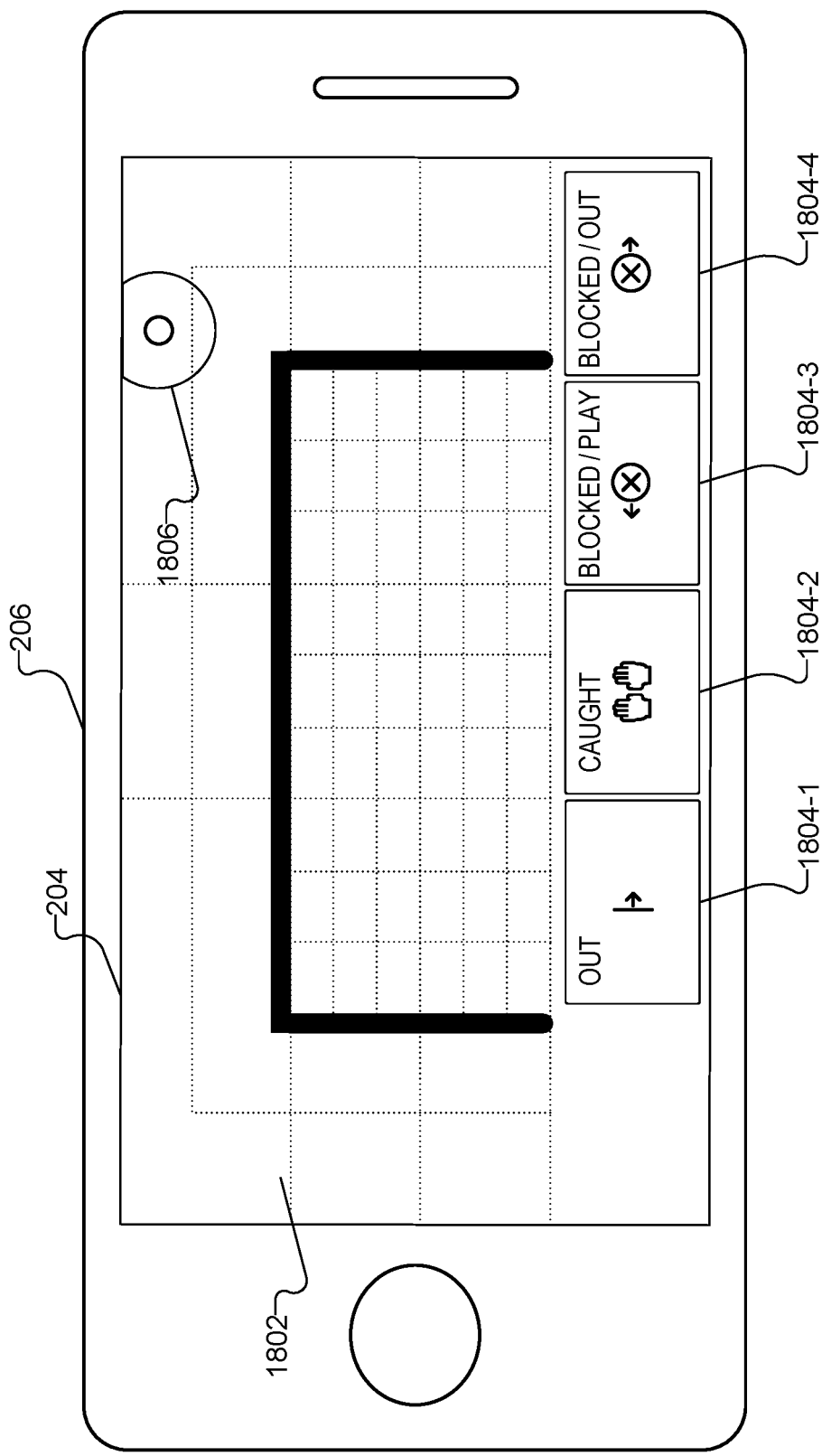

If the user taps outside the frame of the goal posts in graphical user interface 1602, system 100 may provide an alternative graphical user interface for display to facilitate the user providing further information regarding the missed shot. To illustrate, FIG. 18 shows a graphical user interface 1802 that may be provided for display when the user taps outside of the goal post area in FIG. 16. As shown in FIG. 18, a plurality of icons 1804 (e.g., icons 1804-1 through 1804-4) are provided that allow the user to indicate what occurred when the shot was not on goal. For example, the user may select icon 1804-1 to indicate that the shot went out of play. Alternatively, the user may select icon 1804-2 to indicate that the ball was caught by the goalkeeper. As shown in FIG. 18, an icon 1806 depicting concentric circles is shown to indicate a user-selected location indicating where the shot went. System 100 is configured to detect the selection provided by the user with respect to graphical user interface 1802 and record any suitable statistics associated with the indicated action.

Figure 19:
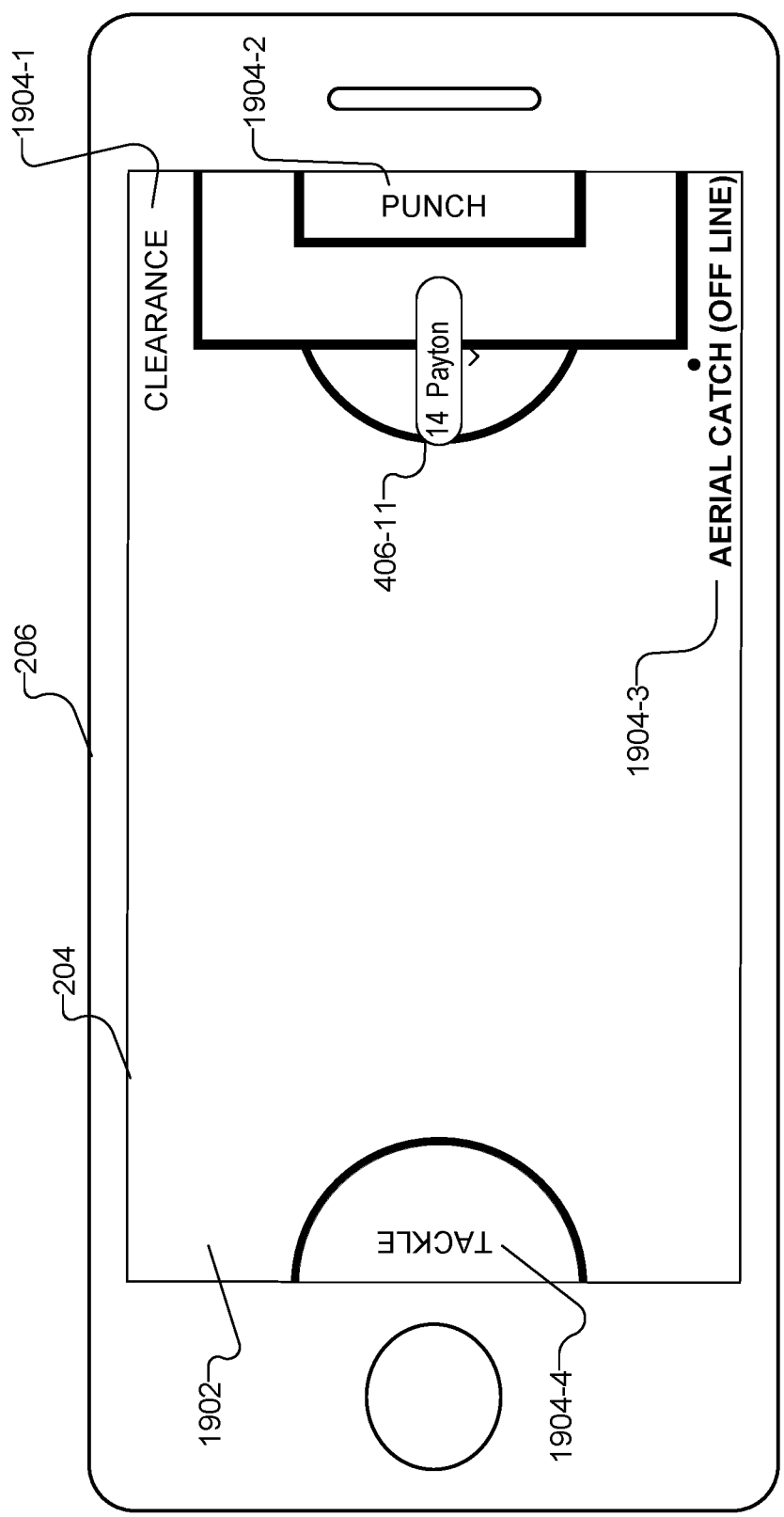

FIG. 19 illustrates a graphical user interface 1902 that may be provided for display on display screen 204 to facilitate a user indicating one of a plurality of defensive actions (e.g., actions 1904-1 through 1904-4) that may be performed by a goalkeeper. For example, the user may swipe upward from icon 406-11 toward action 1904-1 to indicate that the goalkeeper cleared the ball. Alternatively, the user may swipe downward from icon 406-11 toward action 1904-3 to indicate that the goal keeper made an aerial catch. In a similar manner, the user may select any one of the other actions 1904 shown in FIG. 19. System 100 may provide graphical user interface 1902 for display on display screen 204 in response to initiation of a swipe input on icon 406-11 shown in FIG. 13 while the goalkeeper does not have possession of the ball.

Figure 20:
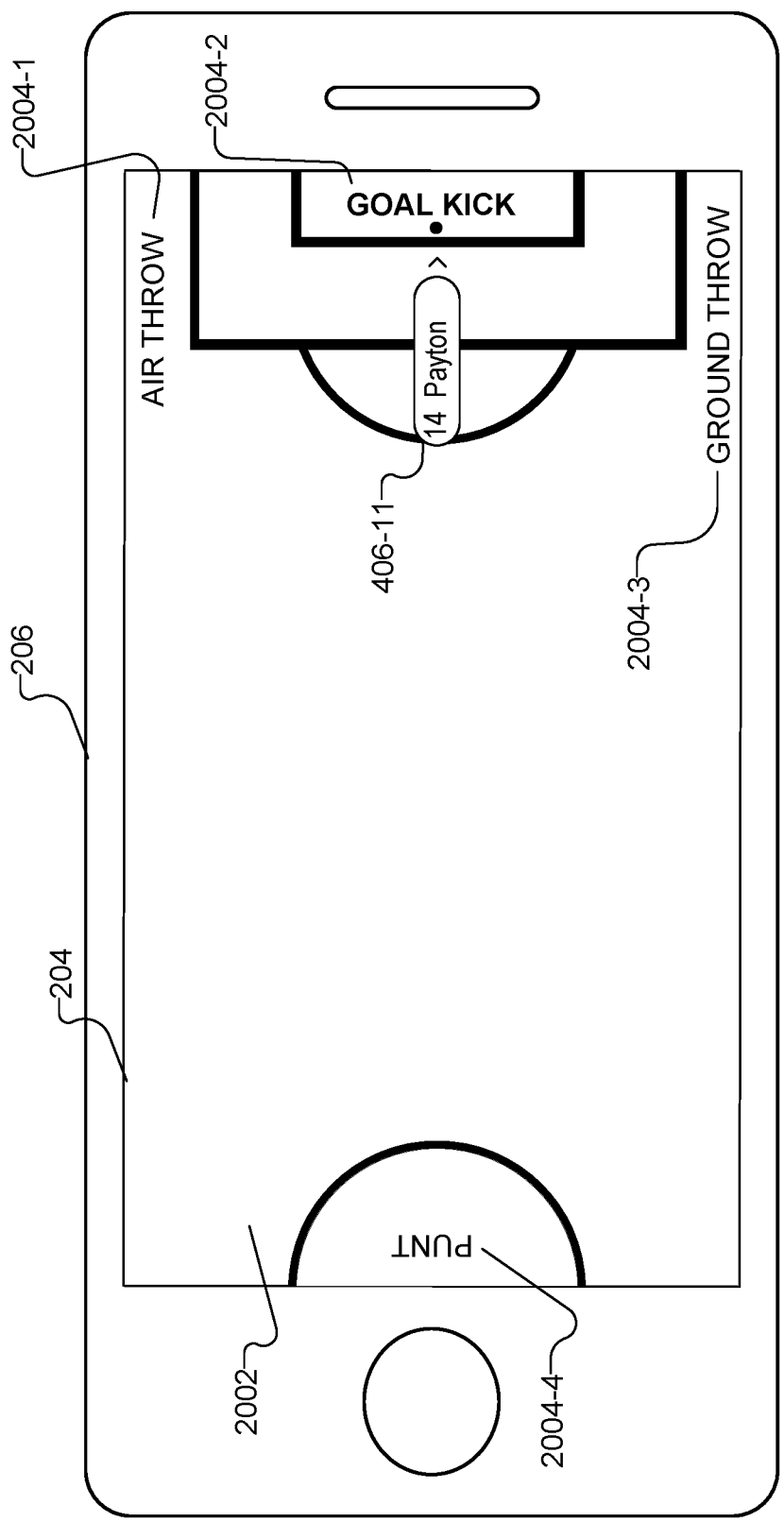

FIG. 20 illustrates a graphical user interface 2002 that may be provided for display on display screen 204 to facilitate indicating one of a plurality of offensive actions 2004 (e.g., actions 2004-1 through 2004-4) that may be performed by a goalkeeper. For example, the user may swipe upward from icon 406-11 toward action 2004-1 to indicate that the goalkeeper threw the ball in the air. In a similar manner, the user may select any one of the other actions 2004 shown in FIG. 20. System 100 may provide graphical user interface 2002 for display on display screen 204 in response to initiation of a swipe input on icon 406-11 shown in FIG. 13 while the goal keeper has possession of the ball.

Figure 21:
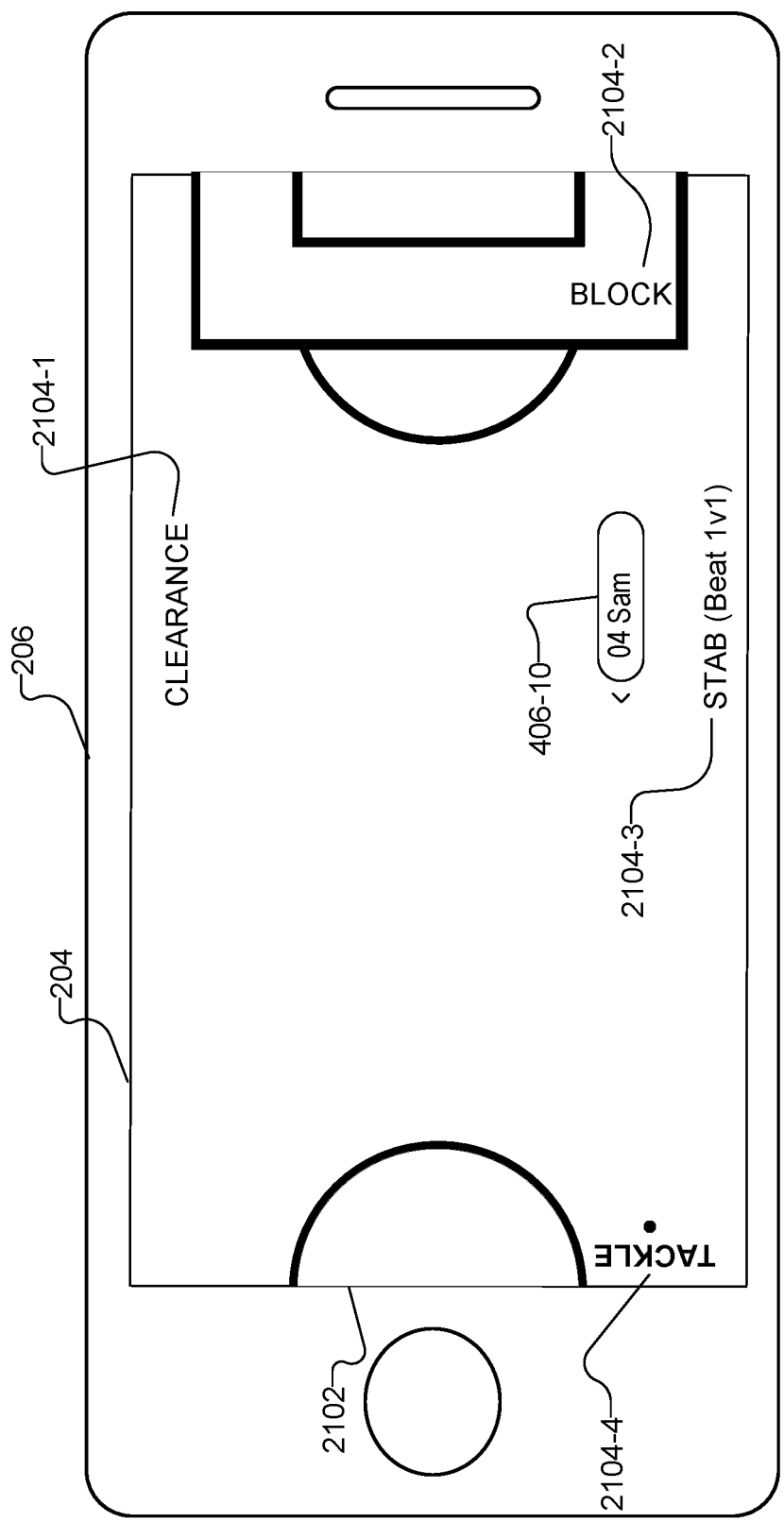

FIG. 21 illustrates a graphical user interface 2102 that may be provided for display on display screen 204 to facilitate the user indicating one of a plurality of defensive actions 2104 (e.g., actions 2104-1 through 2104-4) that may be performed by a player during the soccer match. System 100 may provide graphical user interface 2102 for display on display screen 204 when the user initiates a swipe input on an icon representing a player while the opponent has possession of the ball. For example, in graphical user interface 1302 shown in FIG. 13, the user may initiate a swipe input with respect to icon 406-10 while the opponent has possession of the ball to indicate that the player "Sam" made a defensive play. In response to the initiation of the swipe input, system 100 may provide graphical user interface 2102 for display on display screen 204. The user may then swipe in one of a plurality of directions on graphical user interface 2102 to identify the defensive play performed by Sam. For example, the user may swipe left from icon 406-10 towards action 2104-4 to indicate that the Sam made a successful tackle. Other suitable defensive actions may be defined/indicated in other implementations.

Figure 22:
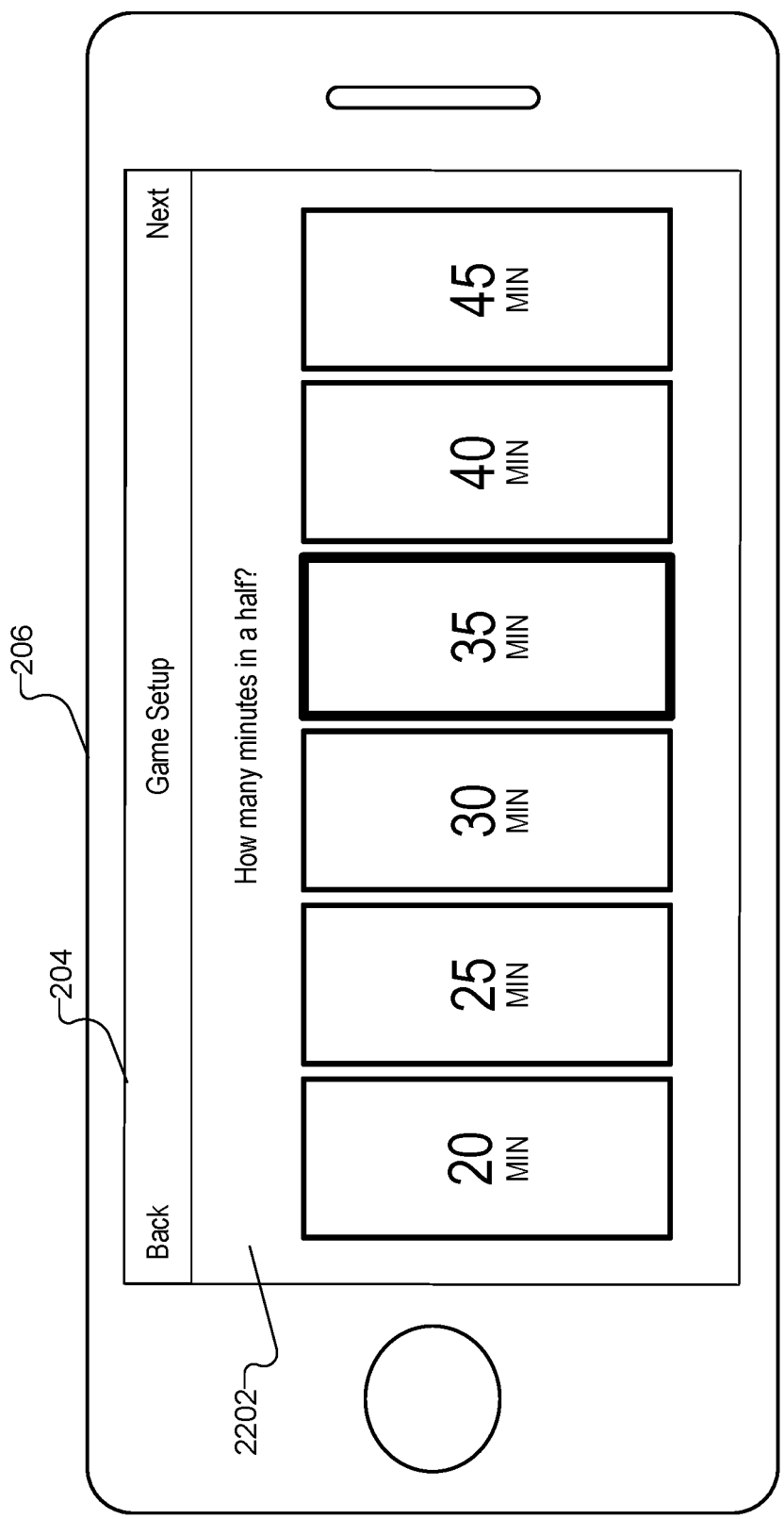

FIGS. 22-26 show exemplary additional or alternative graphical user interfaces that may be provided for display to facilitate setting up the recording of statistics associated with a sporting event. FIG. 22 shows an exemplary graphical user interface 2202 through which a user may select how many minutes are in each period (e.g., each half) of a sporting event. In the example shown in FIG. 22, the border around the option labeled "35 MIN" is relatively darker than the other options to indicate that the user selected (e.g., through a tap input) "35 MIN" as the amount of time in each half of the sporting event.

Different users may have different amounts of experience associated with entering statistics during a sporting event. According, in certain examples, system 100 may provide a graphical user interface for display that includes a plurality of difficulty options associated with statistics entry. If a user is relatively new to providing user inputs to record statistics, the user may select a relatively easy difficulty option where only a few statistics are recorded. Alternatively, if a user has more experience providing user inputs to record statistics, the user may select a relatively more difficult difficulty option where multiple different types of statistics (e.g., both individual and team statistics) are recorded. System 100 may provide such a graphical user interface for display at any suitable time. For example, system 100 may provide a graphical user interface to facilitate selecting a difficulty option during a setup procedure. Additionally or alternatively, such a graphical user interface may be provided for display at any suitable time during the sporting event if the user wants to change the difficulty level associated with entering statistics.

Figure 23:
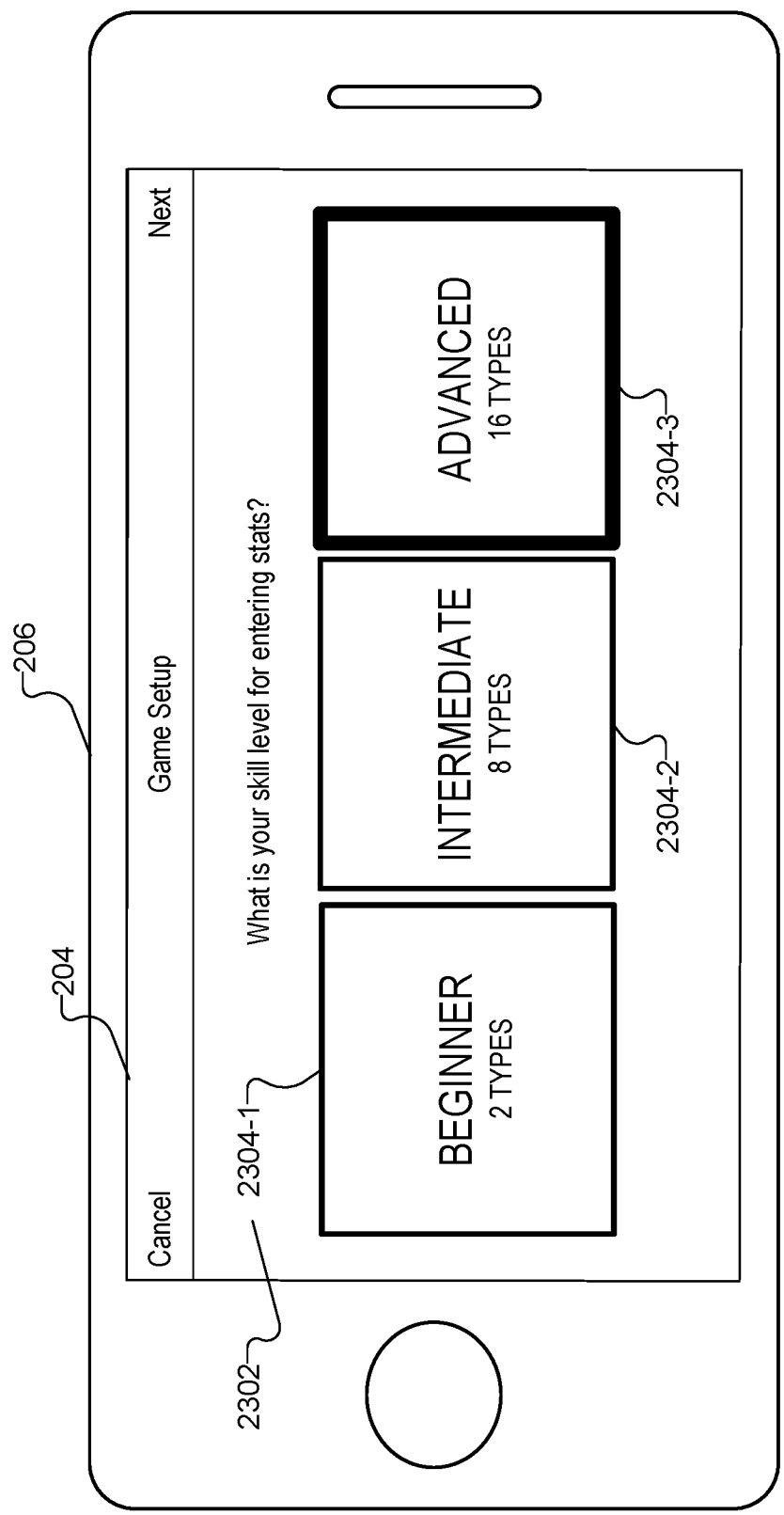

To illustrate, FIG. 23 shows an exemplary graphical user interface 2302 that may be provided for display in certain examples to facilitate a user selecting a difficulty level for statistics entry. As shown in FIG. 23, graphical user interface 2302 includes a plurality of different difficulty options 2304 (e.g., difficulty options 2304-1 through 2304-3) for entering statistics. As shown in FIG. 23, difficulty option 2304-1 is a beginner level difficulty option, difficulty option 2304-2 is an intermediate level difficulty option, and difficulty option 2304-3 is an advanced level difficulty option. The user may select any one of difficulty options 2304 to facilitate adjusting which statistics may be recorded by system 100 during the sporting event. In some examples, with beginner difficultly option 2304-1, only two types of team statistics (e.g., possession and scoring) may be recorded. In some examples, with intermediate difficulty option 2304-2, as many as eight different types of statistics may be recorded including, for example, team and individual statistics (e.g., individual passes, graphical user interface flows associated with shots, etc.). In certain examples, with advanced difficulty option 2304-3, as many as sixteen different types of statistics may be recorded including the statistics from the other difficulty levels as well as any other suitable statistics (e.g., tackle statistics, clearance statistics, goalkeeper statistics, relatively more detailed graphical user interface flows associated with shots, etc.).

In response to a selection of one of difficulty options 2304, system 100 may adjust a difficulty level associated with the user entering statistics during the sporting event. For example, in graphical user interface 2302 shown in FIG. 23, the border around difficulty option 2304-3 is relatively darker than the border of difficulty options 2304-1 and 2304-2 to indicate the user having selected difficulty option 2304-3. Such a selection may be made after the difficulty level was previously set to a beginner level (e.g., icon 2304-1 was previously selected). As such, system 100 may adjust the number and/or types of graphical user interfaces that may be provided for display from relatively more simple graphical user interfaces associated with the beginner level to relatively more complex graphical user interfaces associated with the advanced level.

Figure 24:
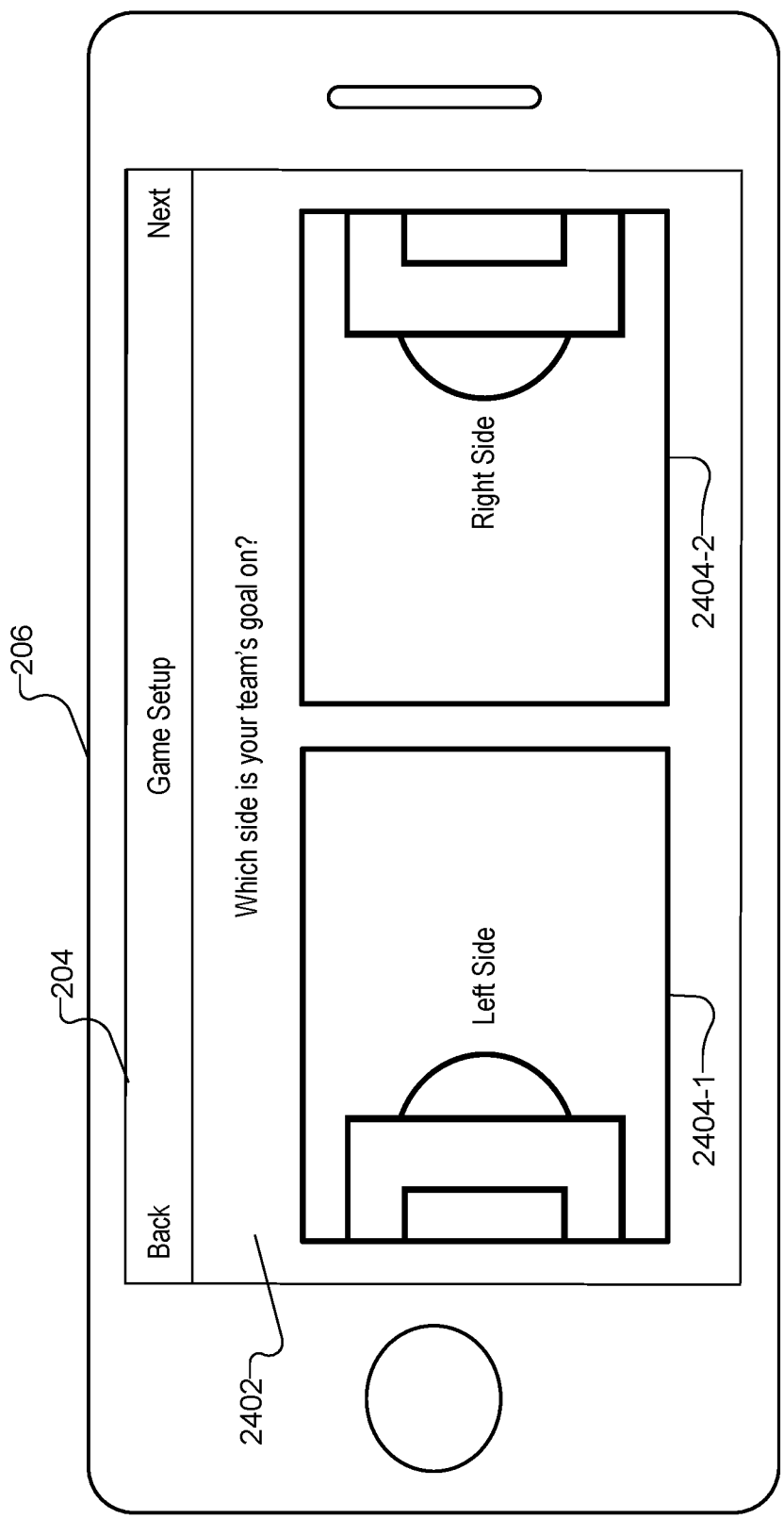
Figure 25:
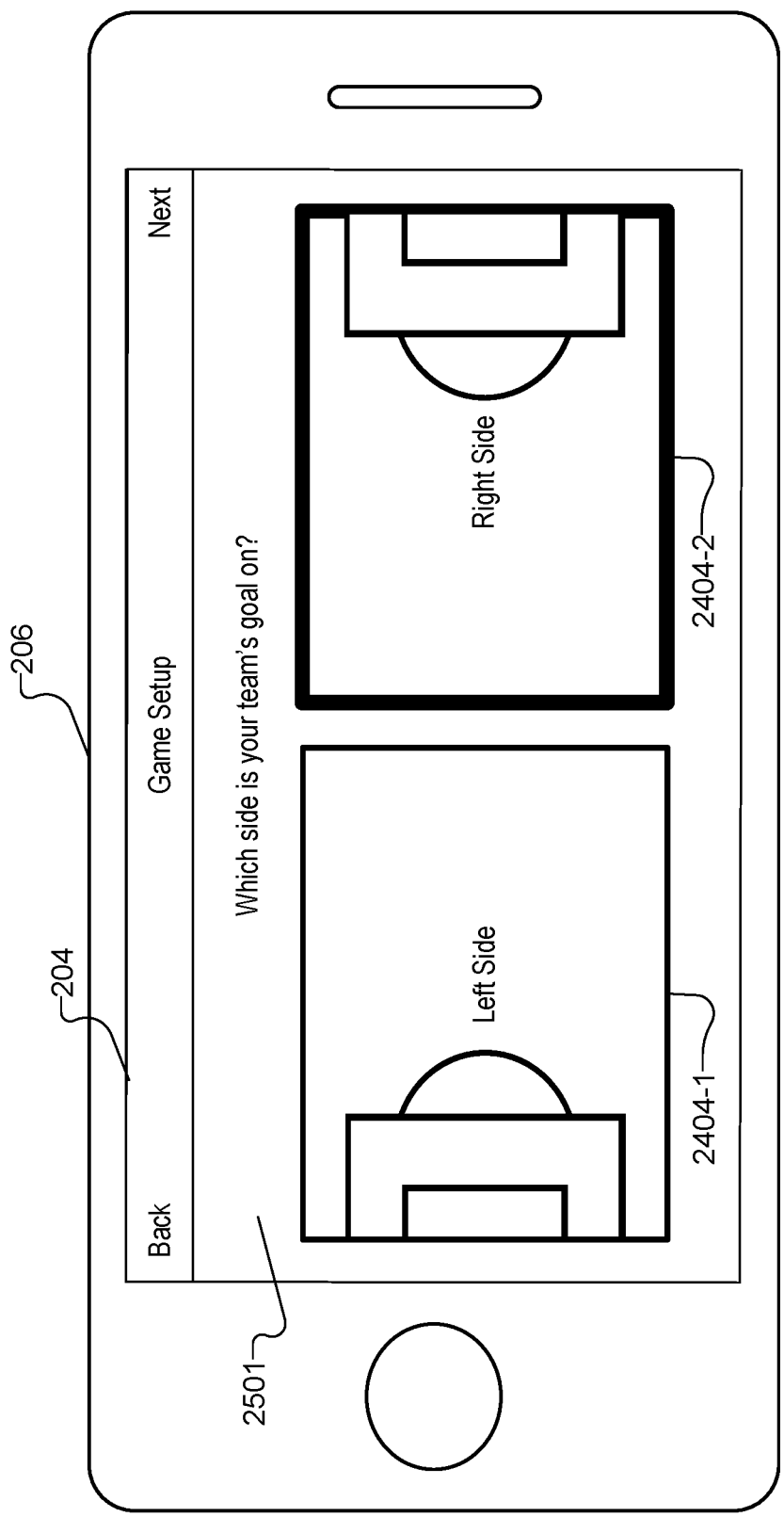

FIGS. 24 and 25 show additional graphical user interfaces that may be provided for display by system 100 during a setup procedure. FIG. 24 shows a graphical user interface 2402 in which a user is asked to select which side 2404 (e.g., side 2401-1 or 2401-2) of the field their team's goal is on. The user may tap either the left side 2404-1 or the right side 2404-2 in any suitable manner. FIG. 25 shows a graphical user interface 2502 that includes a relatively darker border around right side 2402-2 indicating that the user has selected the right side as the side that his/her team is on.

Figure 26:
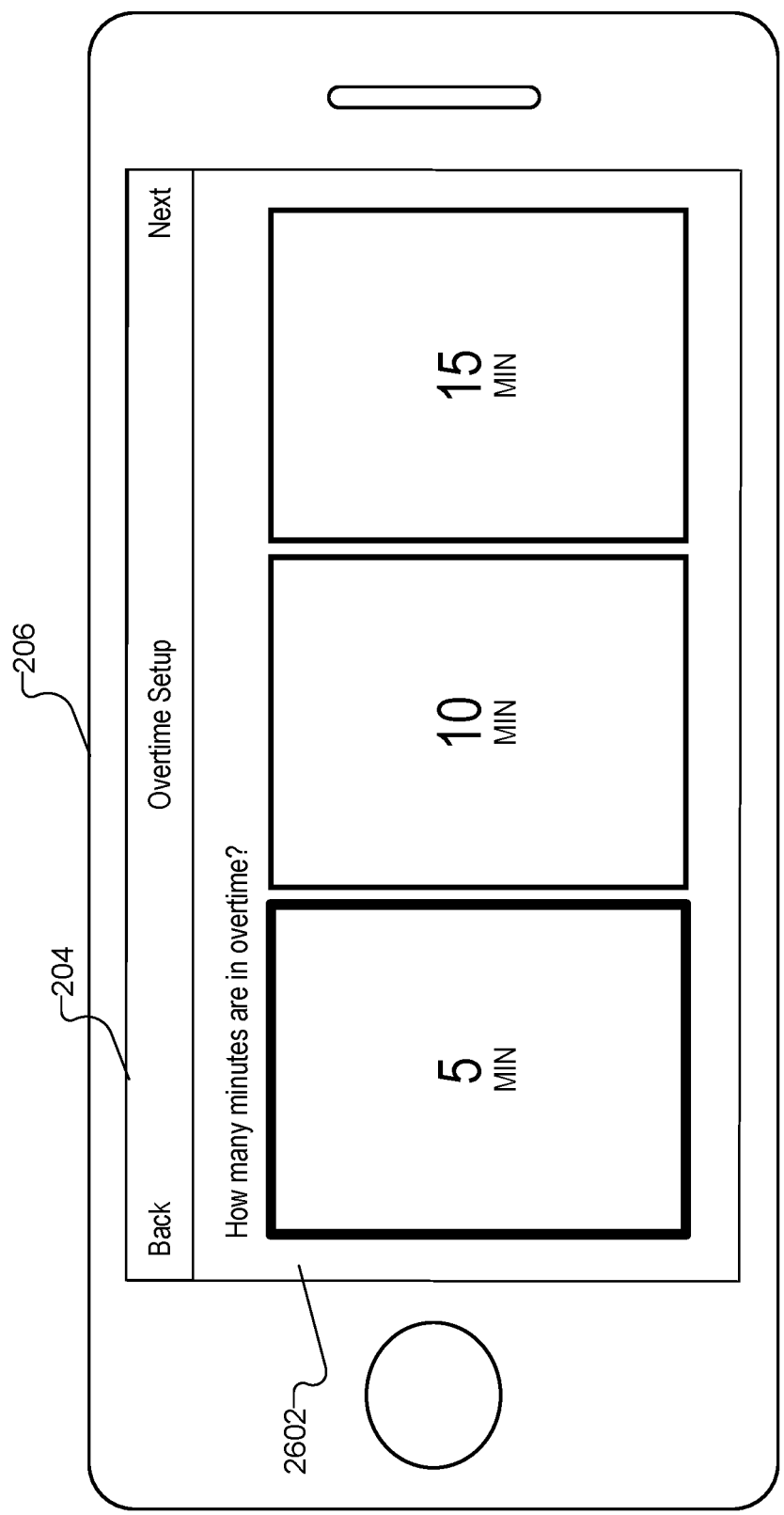

FIG. 26 shows an exemplary graphical user interface that system 100 may provide for display to facilitate setup of an overtime of a sporting event. Similar to graphical user interface 2202 shown in FIG. 22, FIG. 26 shows an exemplary graphical user interface 2602 in which a user may select how many minutes are in the overtime of a sporting event. In the example shown in FIG. 26, the border around the option labeled "5 MIN" is relatively darker than the other options to indicate the selection made by the user. In addition to graphical user interface 2602, system 100 may provide graphical user interfaces similar to graphical user interfaces 2402 and 2502 shown in FIGS. 24 and 25 so that the user can indicate which side of the field their team is on in overtime.

Figure 27:
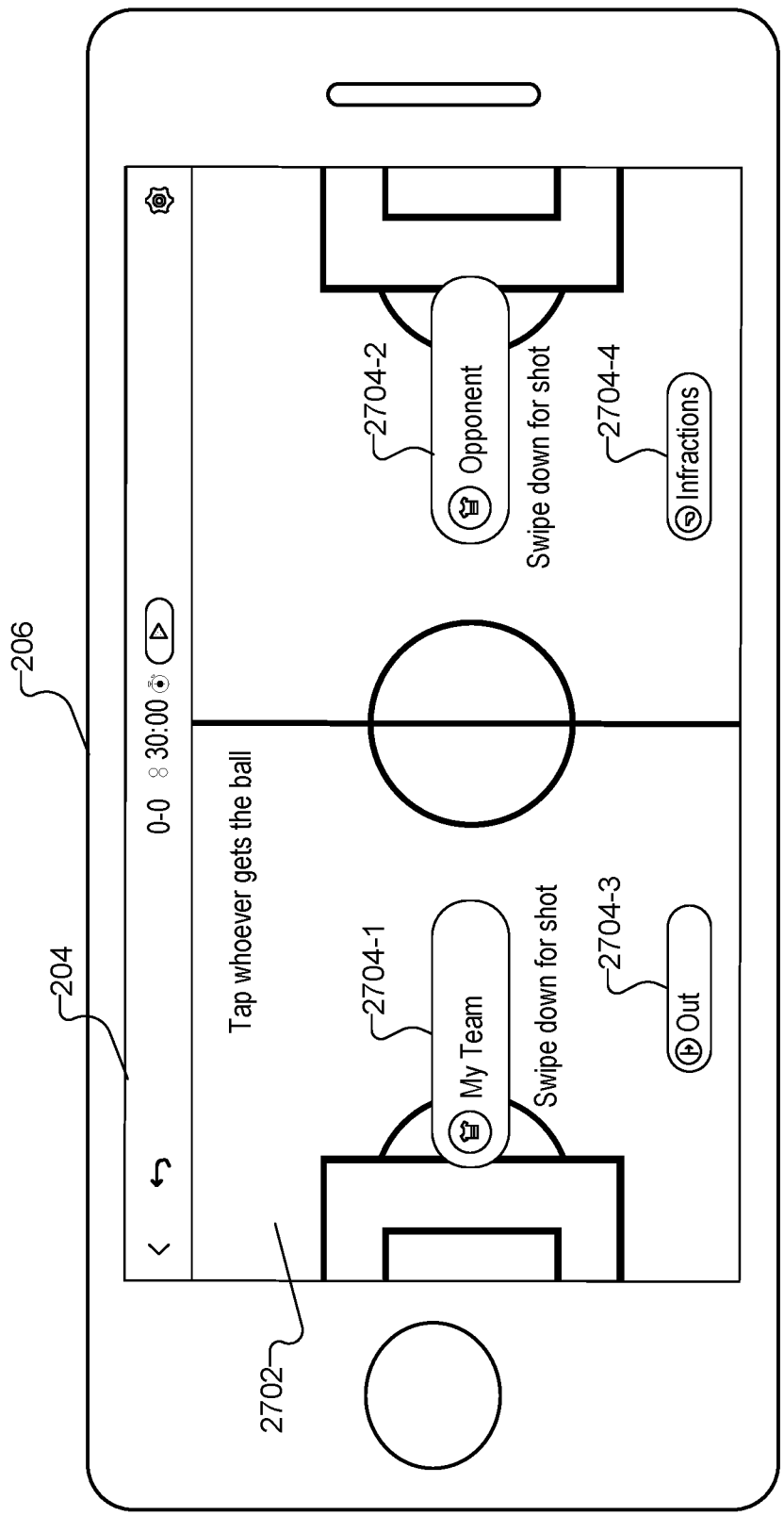

FIG. 27 shows an exemplary graphical user interface 2702 that may be provided for display based on a user selection of beginner difficulty option 2304-1 shown in FIG. 23. As shown in FIG. 27, graphical user interface 2702 is a simplified graphical user interface through which only team statistics may be recorded. Graphical user interface 2702 includes a plurality of icons 2704 (e.g., icons 2704-1 through 2704-4) that may be used to record the team statistics. For example, if the user's team has possession, the user may tap on icon 2704-1 labeled "My Team" to record passes among players on the user's team. If the opposing team has possession, the user may tap on icon 2704-2 labeled "Opponent" to record passes among players on the opposing team. Icon 2704-3 labeled "Out" may be used to record statistics associated with an out of bounds play. When the user taps icon 2704-3, one or more additional graphical user interfaces may be provided for display so that the user can enter information associated with the out of bounds play. Icon 2704-4 labeled "Infractions" may be used to record statistics associated with fouls, penalties, etc. When the user taps icon 2704-4, one or more additional graphical user interfaces may be provided for display so that the user can enter information associated with the infraction. Exemplary graphical user interfaces that may be provided for display upon selection of ether icon 2704-3 or icon 2704-4 are described herein.

As indicated in FIG. 27, when either the opponent or the user's team has possession, the user may swipe downward to indicate that a shot has been made toward a goal. For example, when the user's team has possession of the ball, the user may swipe downward from icon 2704-1 to indicate that a player on the user's team has made a shot toward the opponent's goal. System 100 may detect the downward swipe from icon 2704-1 in any suitable manner and provide one or more graphical user interfaces to facilitate the user entering information associated with the shot.

Figure 28:
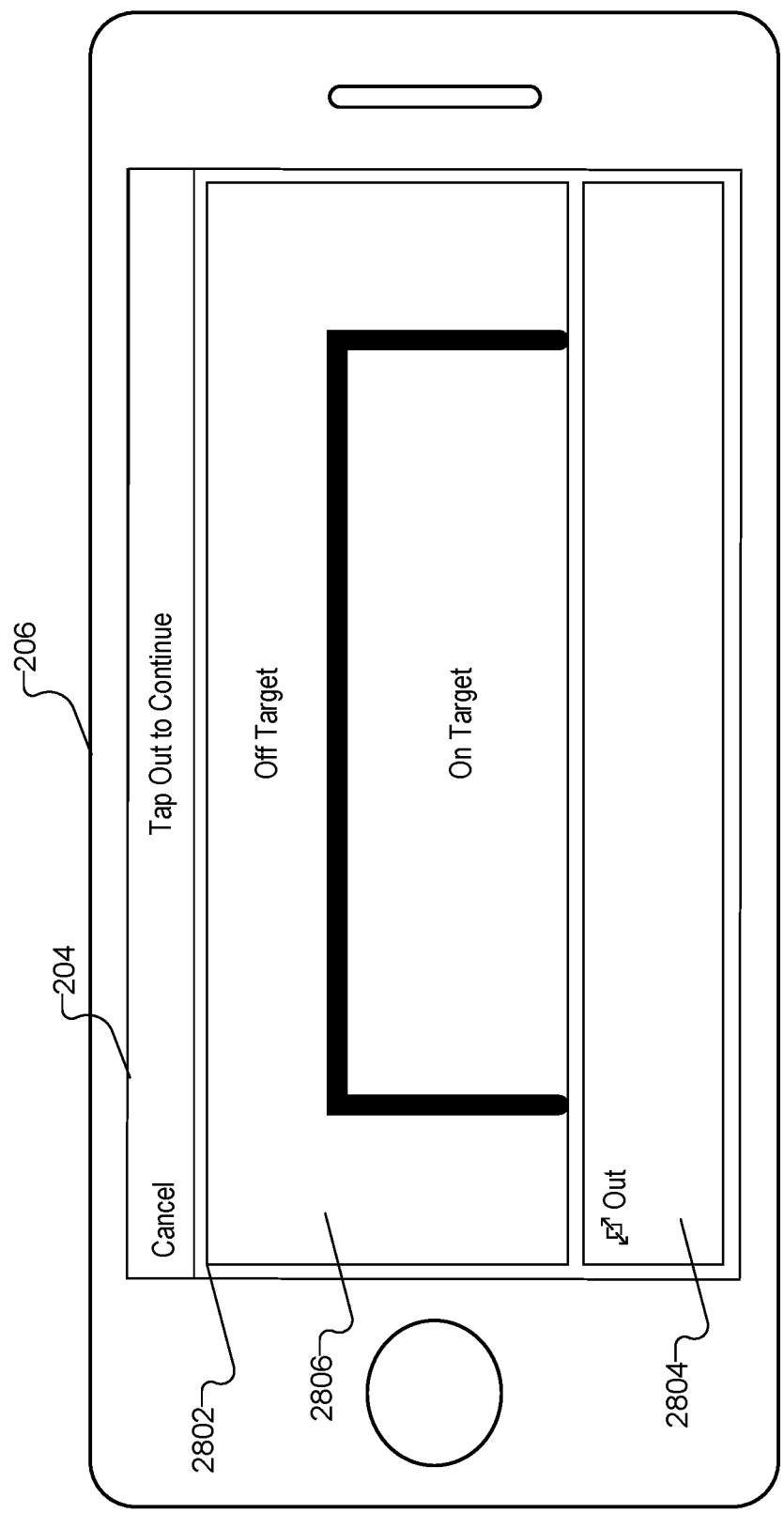
Figure 29:
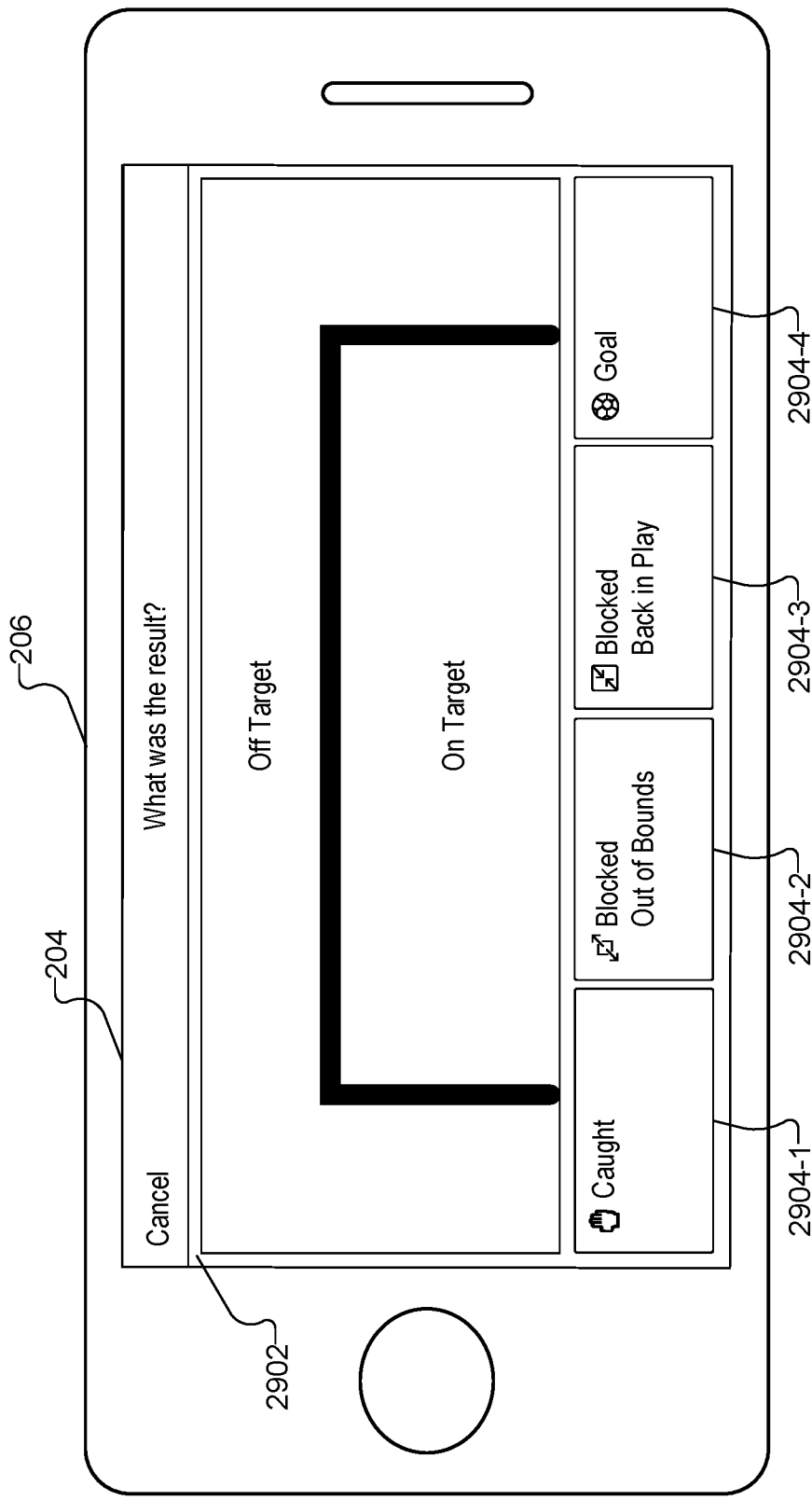
Figure 30:
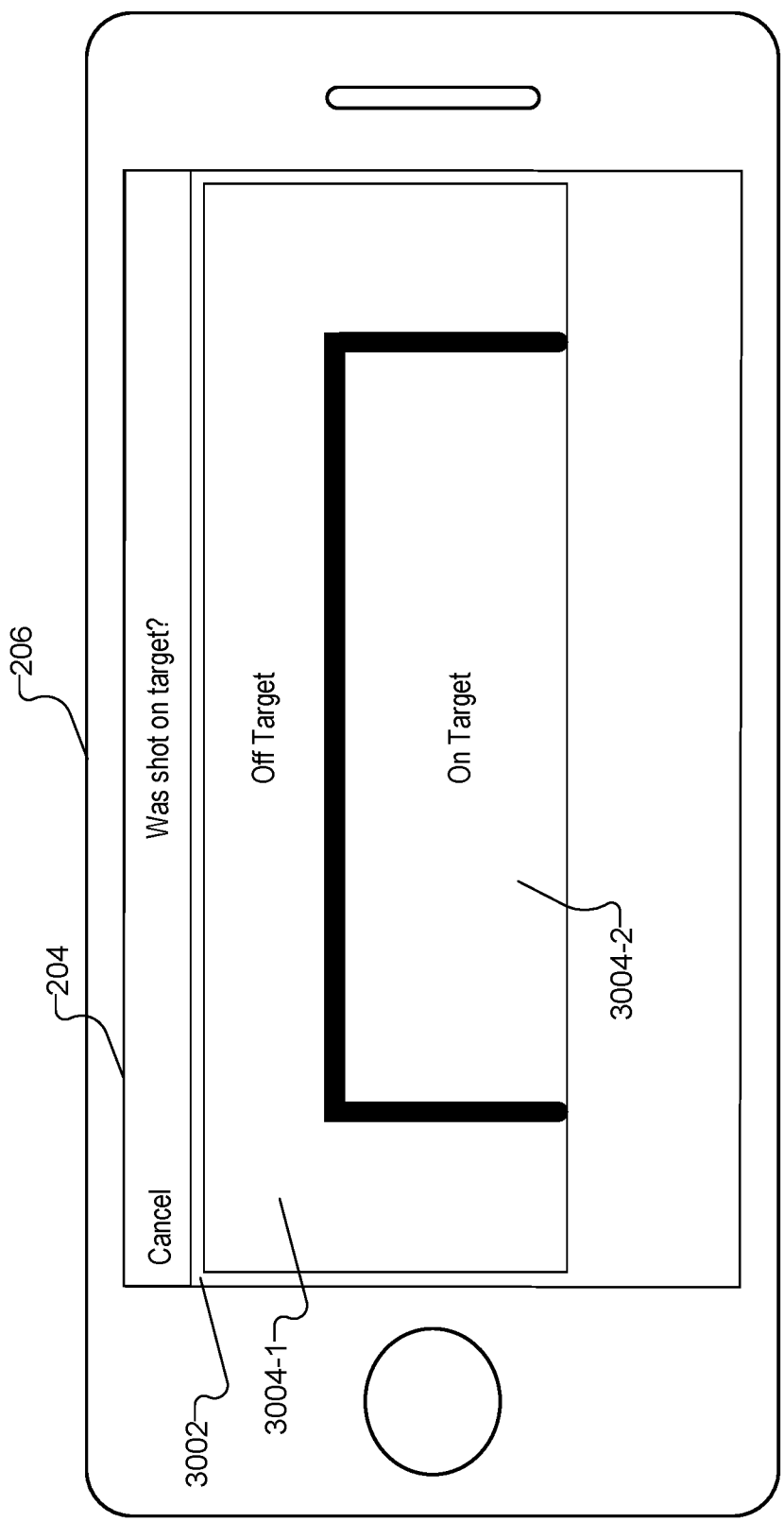

To illustrate, FIGS. 28-30 depict an exemplary graphical user interface flow that may be provided for display by system 100 in response to a swipe downward from icon 2704-1 in FIG. 27 to indicate a shot. FIG. 28 includes a graphical user interface 2802 having a section 2804 labeled "Out" and a section 2806 that includes the frame of the goal. In FIG. 28, the user may tap section 2804 to indicate that the shot went out of play. In response to such a selection, system 100 may provide graphical user interface 2702 for display again on display screen 204 with the opponent having possession. Alternatively, the user may tap section 2806 in FIG. 28 when other circumstances apply to the shot.

In response to a selection of section 2806, system 100 may provide a series of additional graphical user interfaces to facilitate providing further information regarding the shot. To illustrate, FIG. 29 shows a graphical user interface 2902 that includes a plurality of icons 2904 (e.g., icons 2904-1 through 2904-4) associated with the shot. For example, the user may select icon 2904-1 if the goalkeeper caught the ball. Alternatively, the user can select one of the other icons 2904 to provide further information about the shot.

After the user selects one of icons 2904, system 100 may automatically provide a graphical user interface for display that allows the user to select whether the shot was on goal or not on goal. To illustrate, FIG. 30 shows an exemplary graphical user interface 3002 that includes user selectable areas 3004 (e.g., 3004-1 and 3004-2) associated with the frame of the goal. As shown in FIG. 30, user selectable area 3004-1 defines a region outside of the frame of the goal whereas user selectable area 3004-2 defines a region inside the frame of the goal. The user may tap user selectable area 3004-1 if the shot was off target or tap user selectable area 3004-2 if the shot was on target. After the user selects one of user selectable areas 3004, system 100 may provide graphical user interface 2602 for display again on display screen 204.

Figure 31:
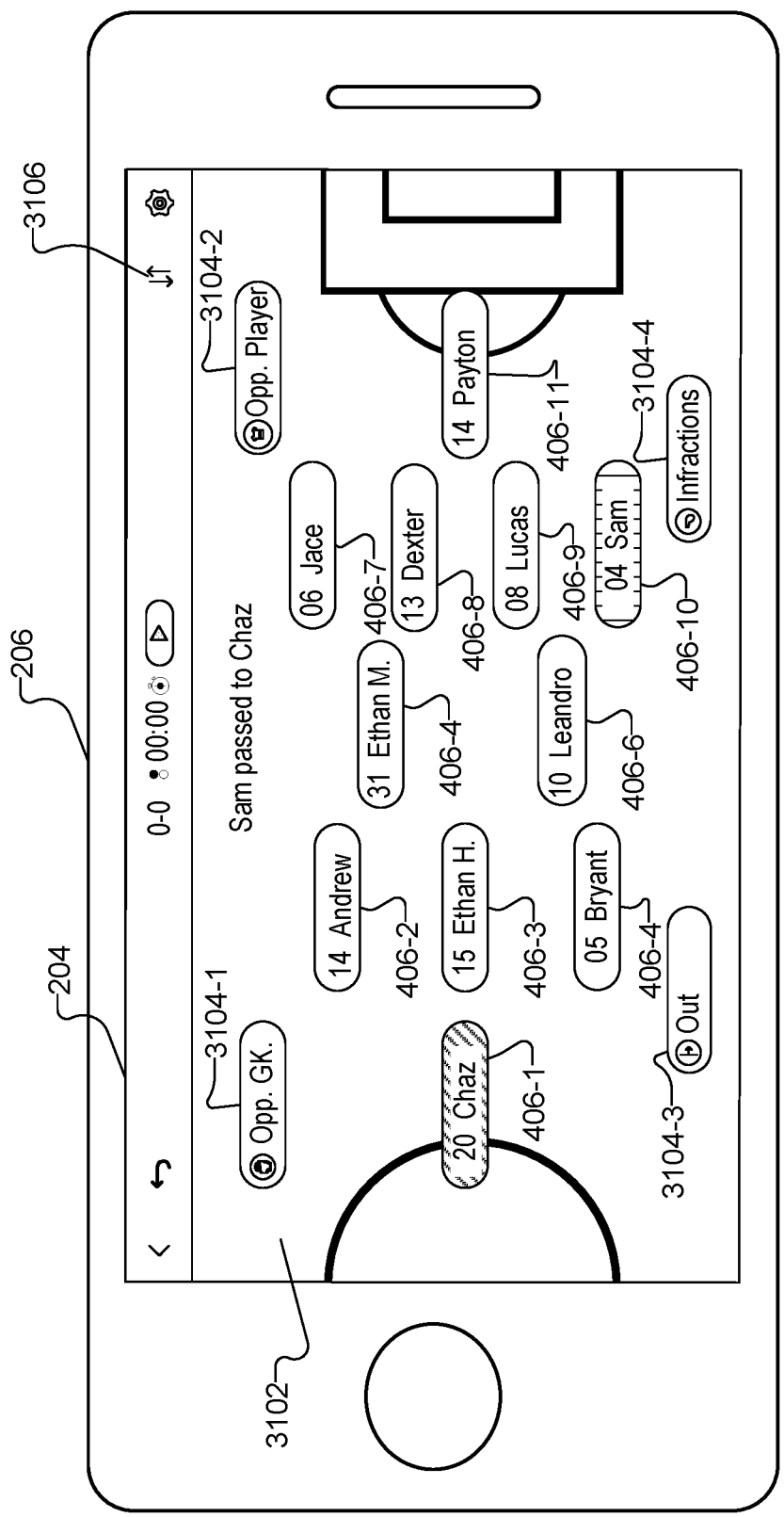

FIG. 31 illustrates an exemplary graphical user interface 3102 that may be provided for display by system 100 based on a user selection of either intermediate difficulty option 2304-2 or advanced difficulty option 2304-3 shown in FIG. 23. As shown in FIG. 31, graphical use interface 3102 includes a plurality of icons 406 representative of participants in the sporting event and a plurality of icons 3104 (e.g., icons 3104-1 through 3101-4) to facilitate entering additional statistics. Unlike graphical user interface 2602 shown in FIG. 26, graphical user interface 3102 is configured to facilitate entry of individual player statistics as well as team statistics. For example, the user may provide any suitable input, such as those described herein, on icon 406-1 to facilitate entering statistics based on actions performed by Chaz during the sporting event. Similarly, the user may provide any suitable input on icon 3104-1 to facilitate entering statistics based on actions performed by the opposing goalkeeper during the sporting event.

Figure 32:
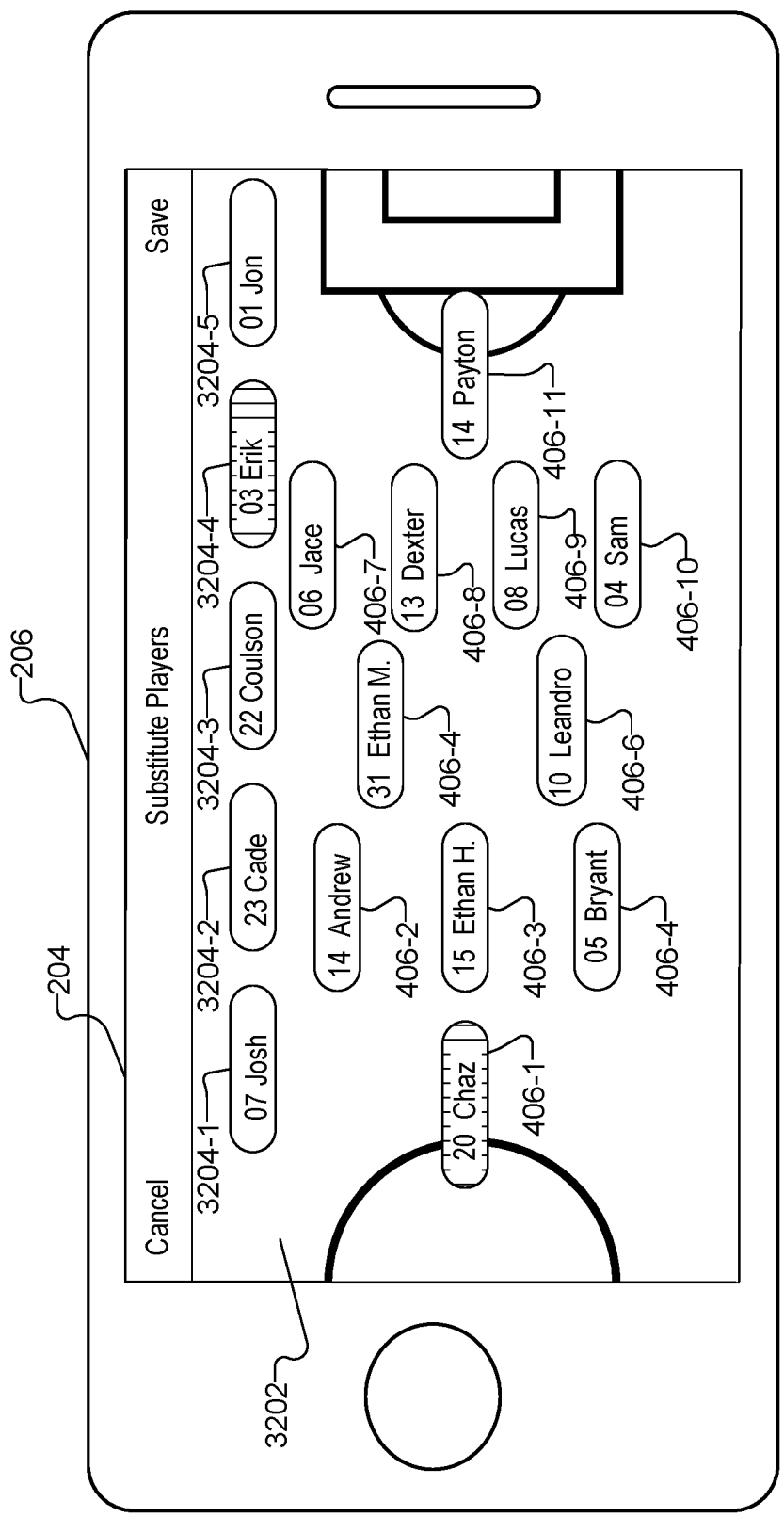

FIG. 31 also includes a substitution icon 3106 that may be selected by a user to facilitate substituting participants in a sporting event. To that end, upon selection of substitution icon 3106, system 100 may provide one or more graphical user interfaces to facilitate substituting players during the sporting event. For example, an exemplary graphical user interface that facilitates substitution may include a first plurality of icons representative of participants currently in play within in the sporting event and a second plurality of icons representative of participants that are not currently in play within the sporting event (e.g., that are on the bench). To illustrate, FIG. 32 shows an exemplary graphical user interface 3202 that may be provided for display in response to the user selecting substitution icon 3106 in FIG. 31. As shown in FIG. 32, graphical user interface 3202 concurrently depicts the plurality of icons 406 representing participants currently in play in the sporting event and a plurality of icons 3204 (e.g., icons 3204-1 through 3204-5) representing participants that are not currently in play within the sporting event. While graphical user interface 3202 is displayed, a user may tap one of icons 3204 and one of icons 406 to substitute participants. In the example shown in FIG. 32, icons 3204-4 and 406-1 are crosshatched indicating that the user would like to substitute Erik for Chaz within the sporting event. In response to such a selection, system 100 may move icon 406-1 to be included with icons 3204 and move icon 3204-4 to be included with icons 406 and provided at the position where icon 406-1 used to be. Because icons 406 and icons 3204 are concurrently displayed on display screen 204, it is possible to easily and quickly indicate which substitutions are to be made.

Although FIG. 32 shows five participants that are not currently in play within the sporting event, it is understood that less than five or more than five participants may not currently be in play within the sporting event at a given time. In examples where there are more than five participants that are not currently in play, it may not be possible to show all of the icons representative of the participants not currently in play on display screen 204 at the same time. Accordingly, in certain examples, the row of icons 3204 shown in FIG. 32 may scroll horizontally in response to any suitable user input (e.g., a horizontal swipe) to bring into view additional icons representative of additional participants that are not currently in play within the sporting event.

Figure 33:
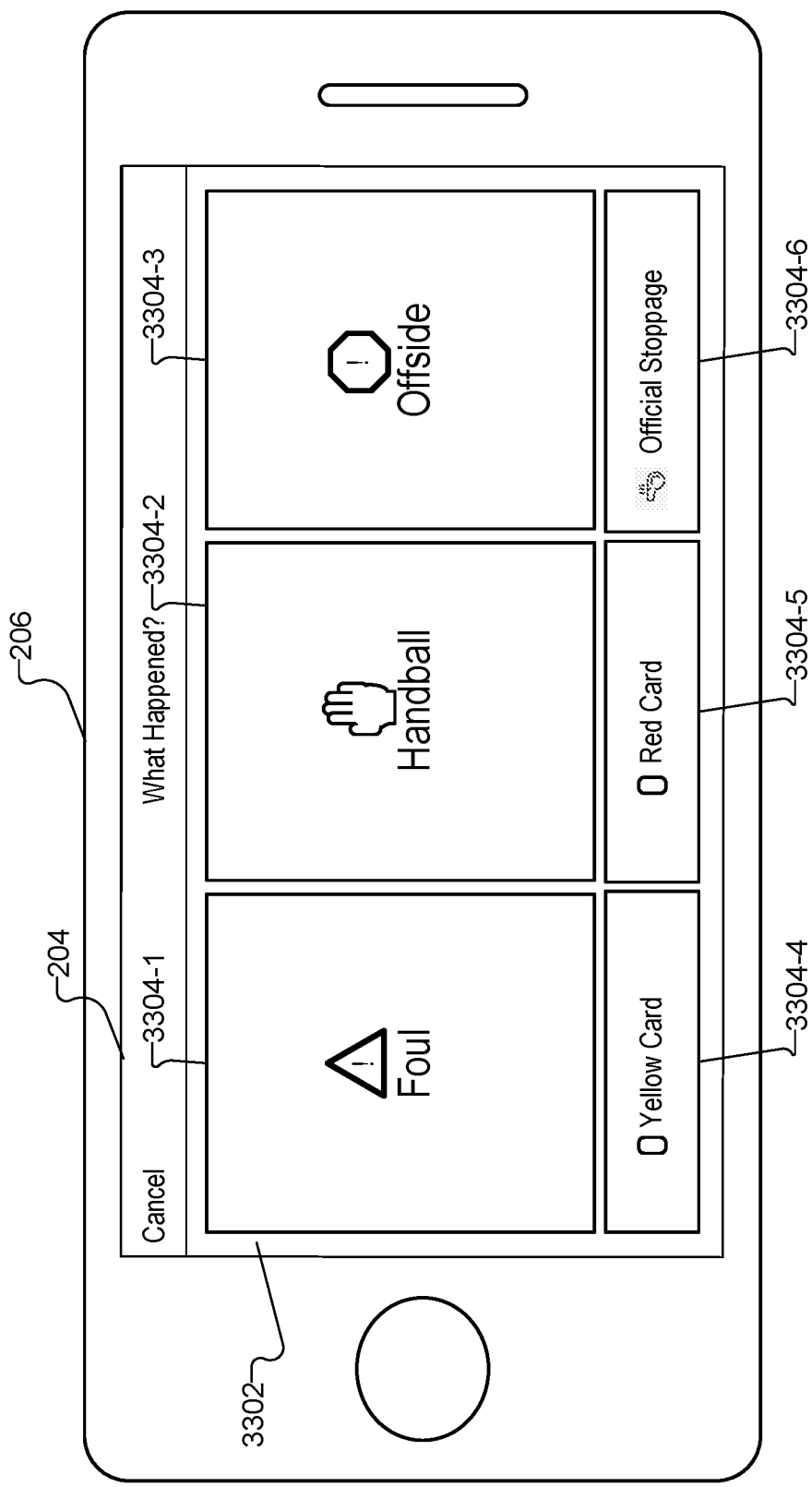

FIGS. 33-38 represent an exemplary graphical user interface flow that may be provided for display when an infraction is committed during the sporting event (e.g., an infraction sporting event context). System 100 may provide the graphical user interface flow shown in FIGS. 33-38 for display based on a user input associated with, for example, icon 3104-4 shown in FIG. 31. FIG. 33 shows a graphical user interface 3302 that includes a plurality of icons 3304 (e.g., icons 3304-1 through 3304-6) that are selectable by the user to indicate what caused the infraction. For example, the user may select icon 3304-1 if a foul was committed. Alternatively, the user can select one of the other icons 3304 to provide further information about the infraction.

Figure 34:
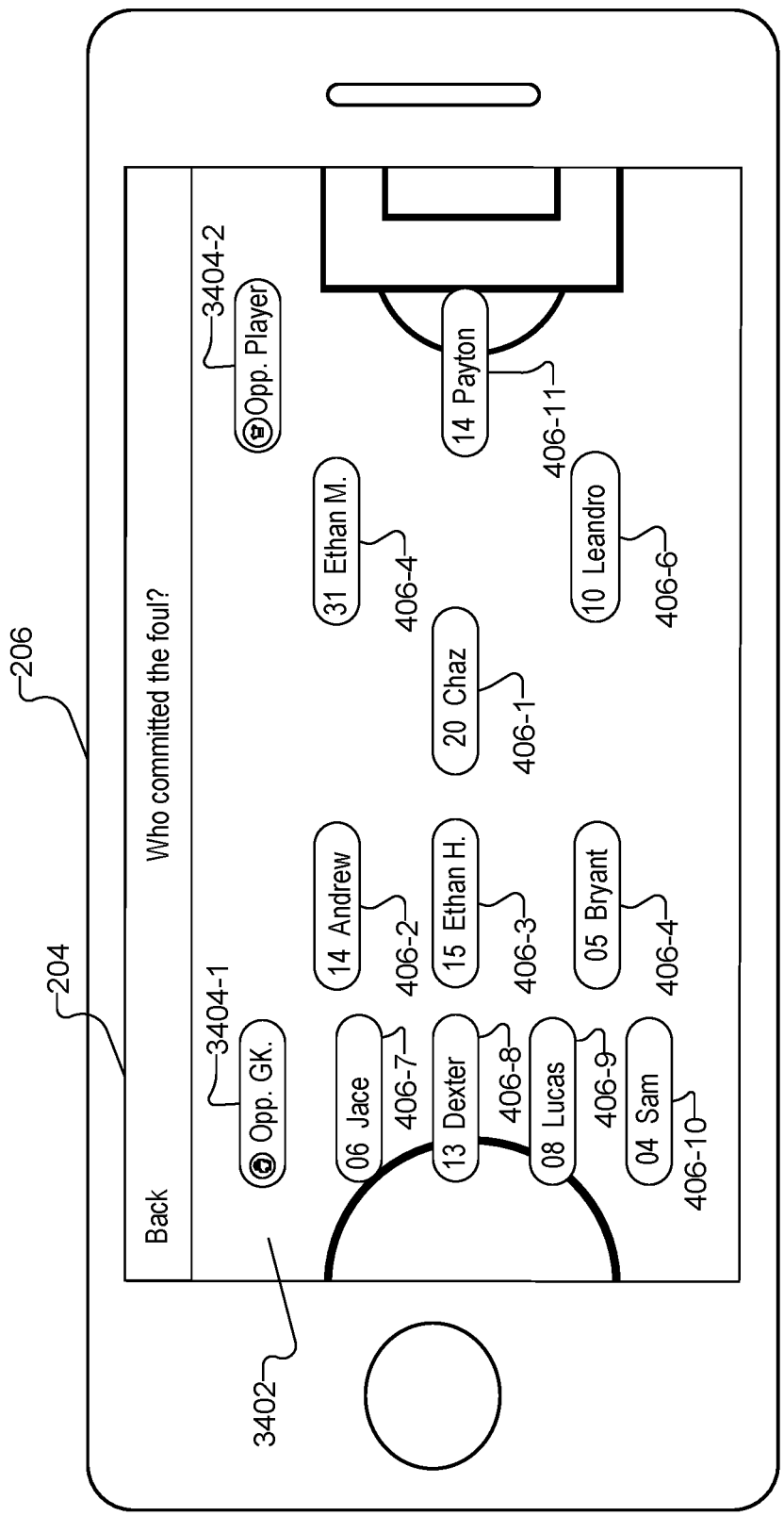

Upon selection of one of icons 3304, system 100 may provide a graphical user interface for display to facilitate the user indicating who committed the infraction. For example, FIG. 34 shows an exemplary graphical user interface 3402 that includes a plurality of icons 406 representative of participants in the sporting event as well as icons 3404-1 and 3404-2 representative of the opposing goalkeeper and the opposing team, respectively. The user may select one of icons 406 or 3404 to indicate who committed the infraction.

Figure 35:
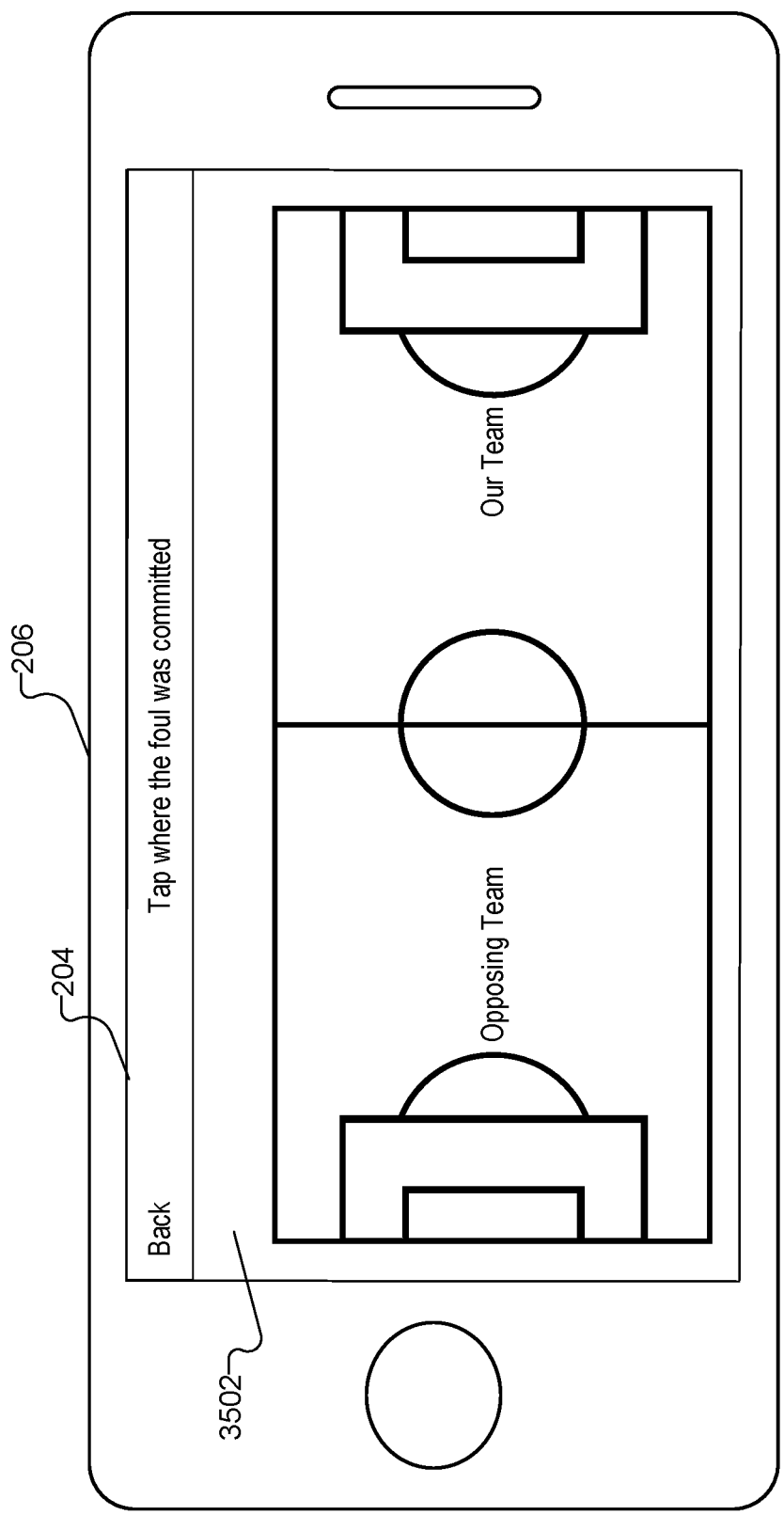

After the user indicates who committed the infraction, system 100 may provide one or more graphical user interfaces for display to facilitate indicating where the infraction was committed within the field of play. For example, FIG. 35 shows an exemplary graphical user interface 3502 that includes a graphical depiction of an overhead view of the field of play. The user may provide, for example, a tap input on the field of play to indicate where the infraction was committed.

Figure 36:
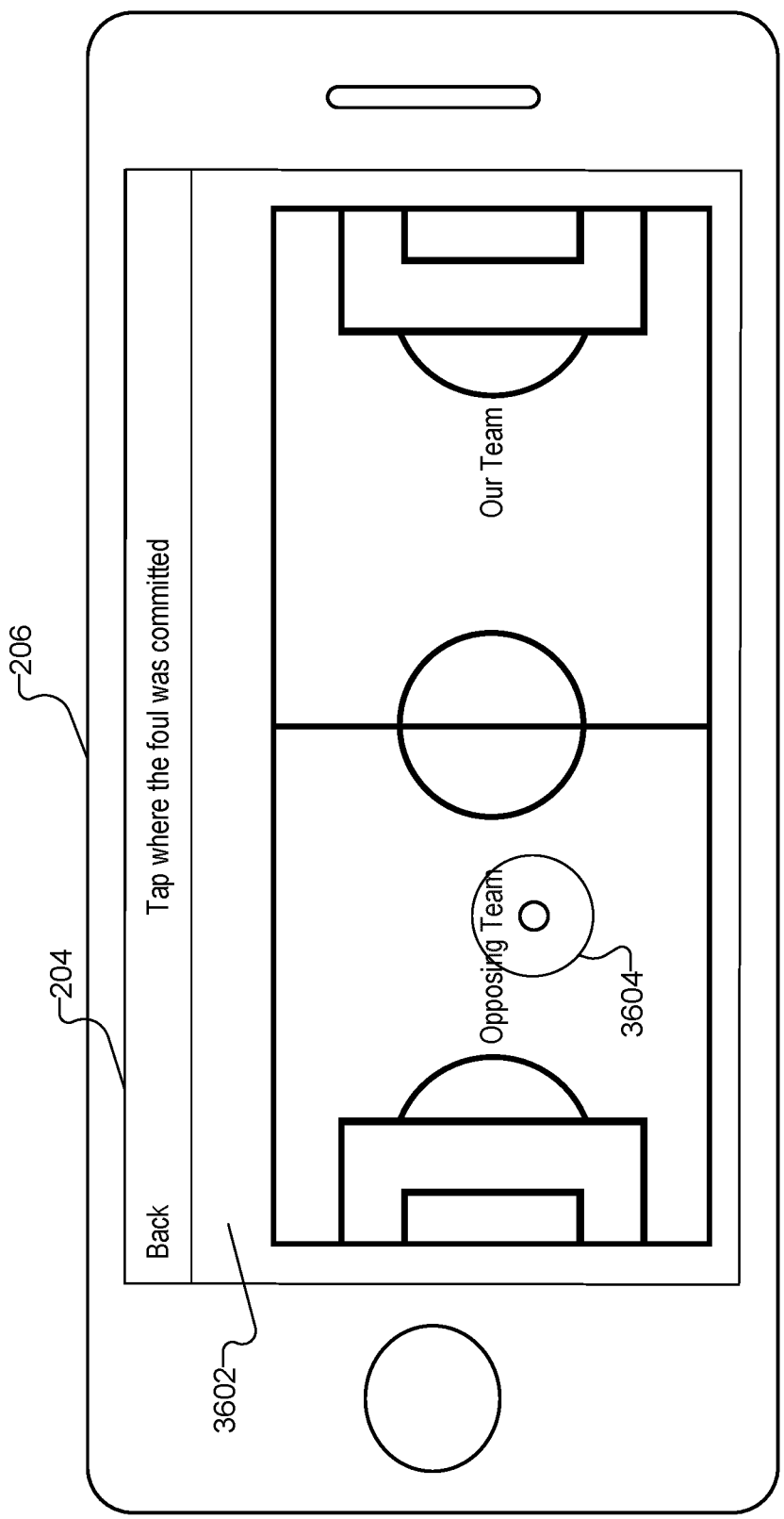

In certain examples, system 100 may provide an icon together with the overhead view of the field of play to indicate the location of the infraction selected by the user. For example, FIG. 36 shows an exemplary graphical user interface 3602 that includes an icon 3604 that indicates where the user indicated that the infraction occurred.

Figure 37:
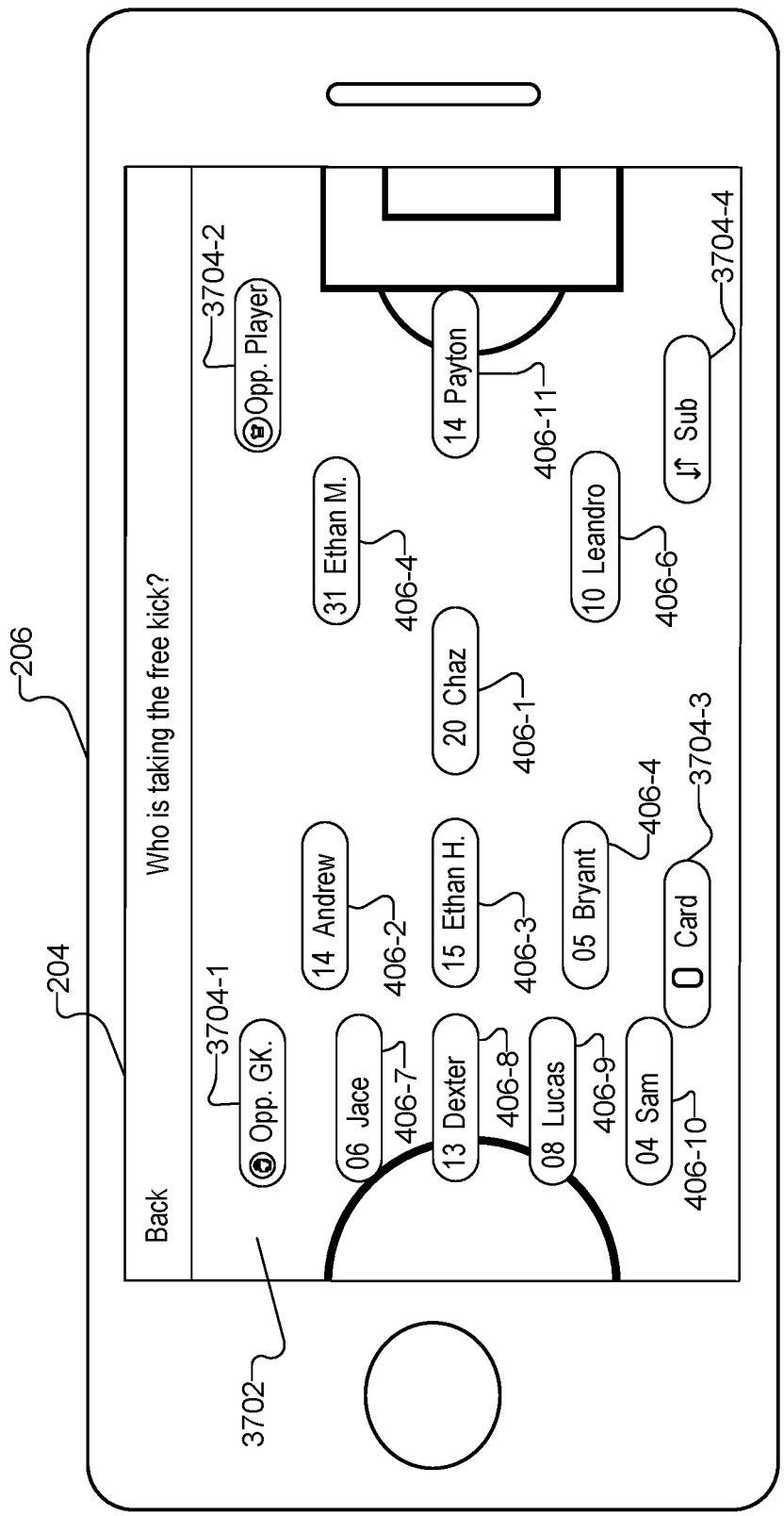

After the user indicates where the infraction occurred, system 100 may provide a graphical user interface for display to facilitate a user indicating who is taking a free kick associated with the infraction. For example, FIG. 37 shows a graphical user interface 3702 that includes icons 406 and a plurality of icons 3704 (e.g., icons 3704-1 through 3704-4). The user may select, for example, icon 406-1 to indicate that Chaz will take the free kick. Additionally or alternatively, the user may select icon 3704-3 to indicate whether there was a yellow card or a red card associated with the infraction. Icon 3704-4 is provided to facilitate substituting a player into the sporting event to, for example, take the free kick. If the user selects icon 3704-4, system 100 may provide graphical user interface 3202 for display again on display screen 204.

Figure 38:
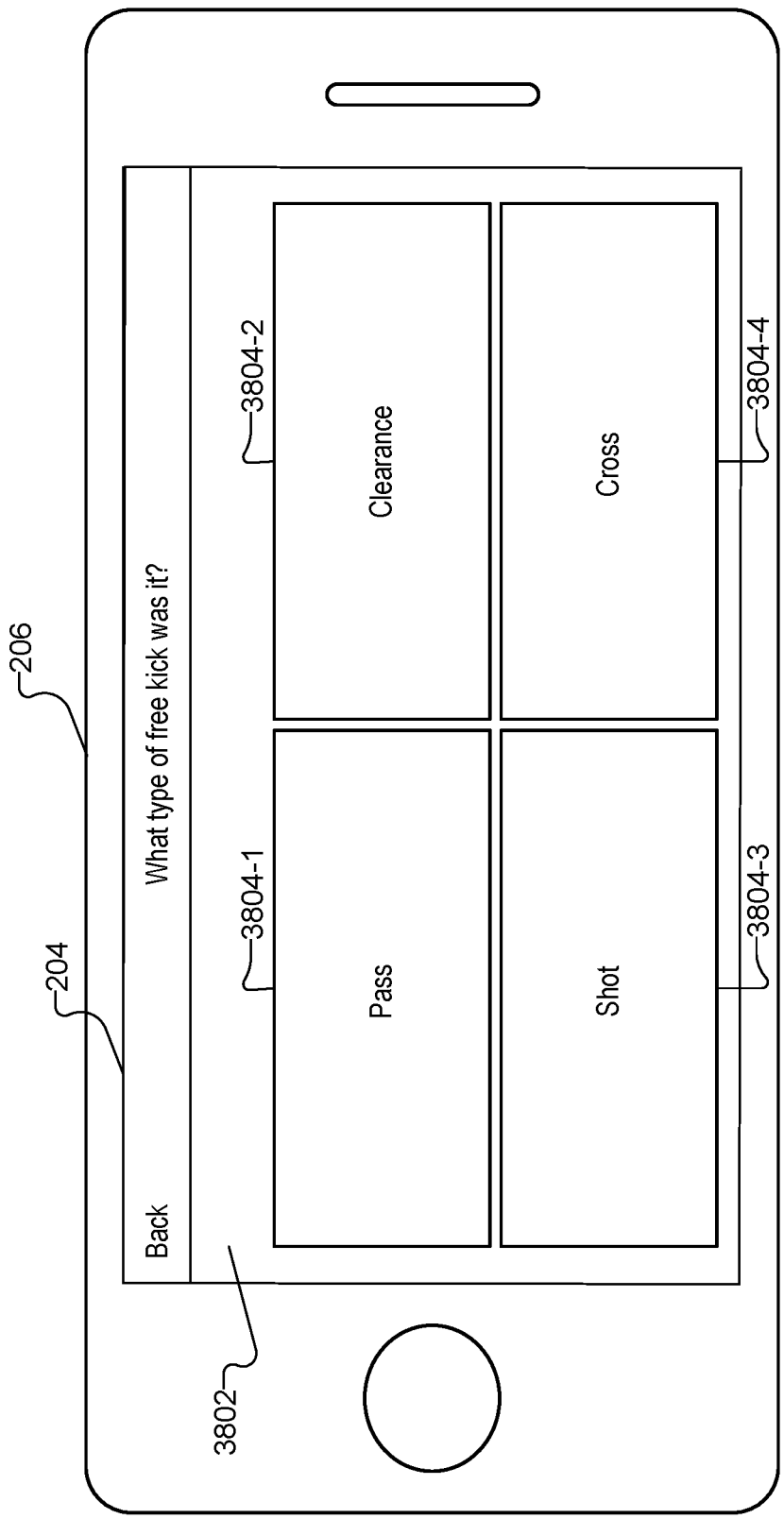

FIG. 38 shows a graphical user interface 3802 that includes a plurality of icons 3804 (e.g., icons 3804-1 through 3804-4) that may be selected by the user to indicate what type of free kick was taken. For example, the user may select icon 3804-1 to indicate that the free kick was a pass, the user may select icon 3804-4 to indicate that the free kick was a cross, etc. System 100 may then record one or more statistics associated with the selections made by the user with regard to the graphical user interface flow shown in FIGS. 33-38.

Figure 39:
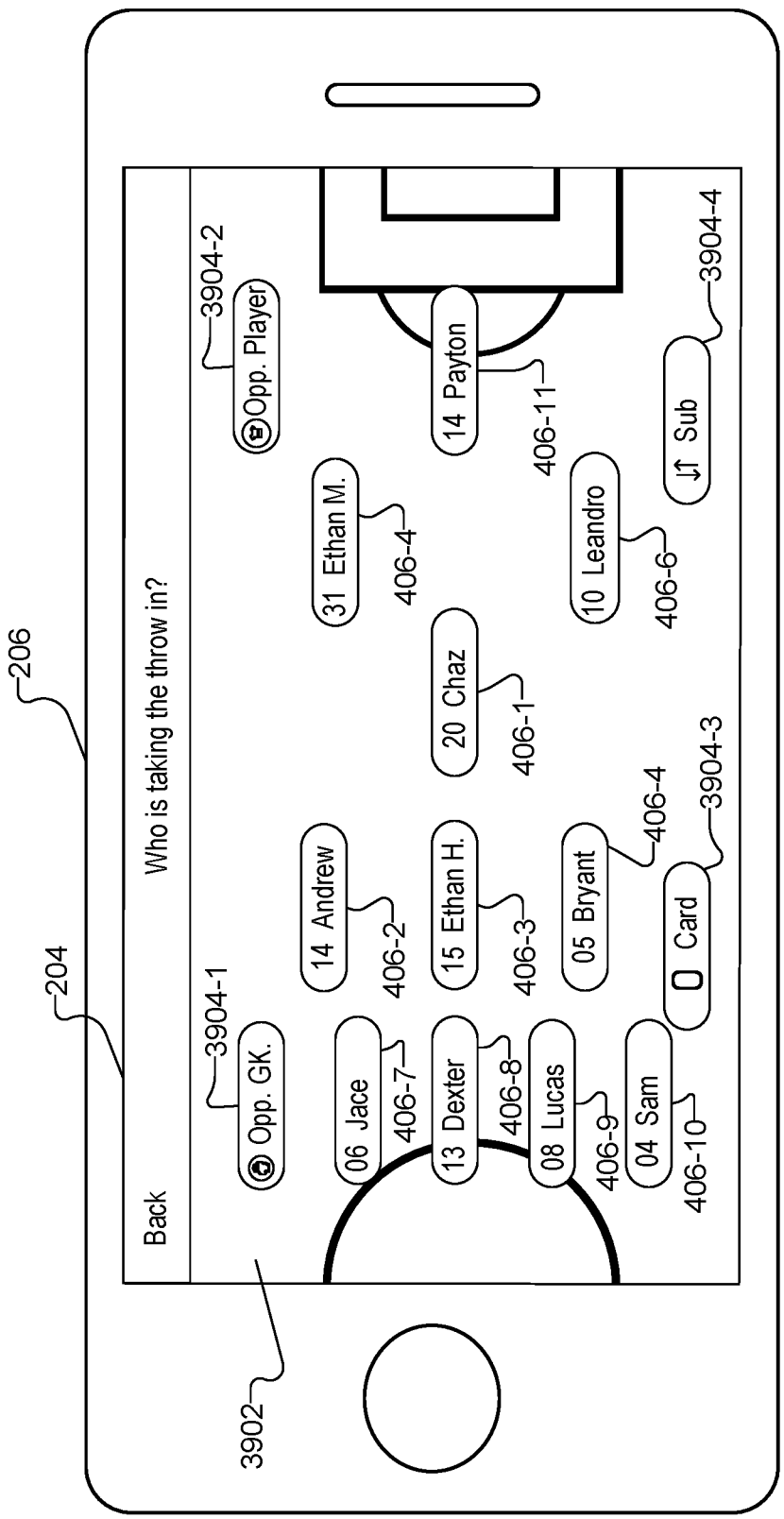
Figure 40:
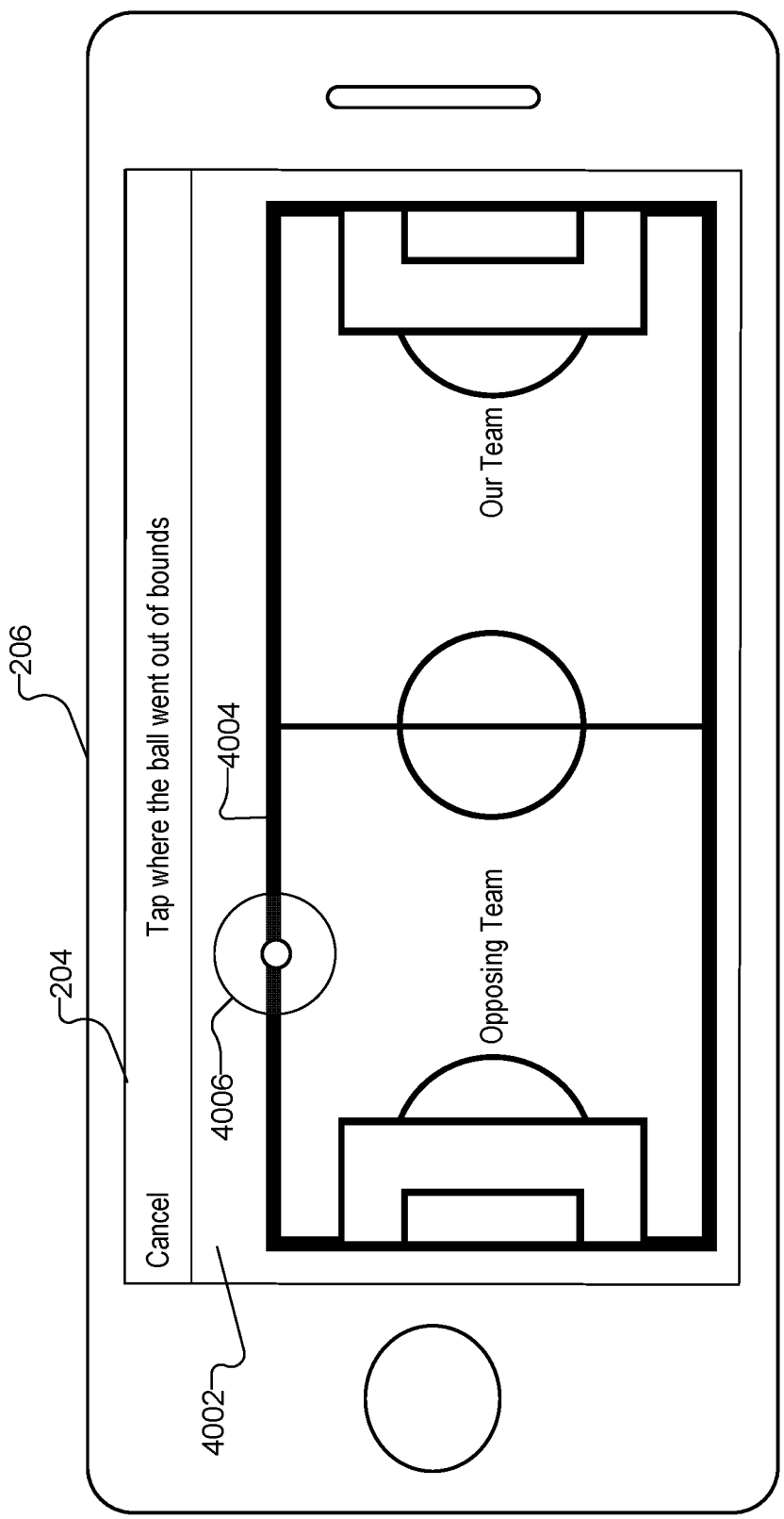
Figure 41:
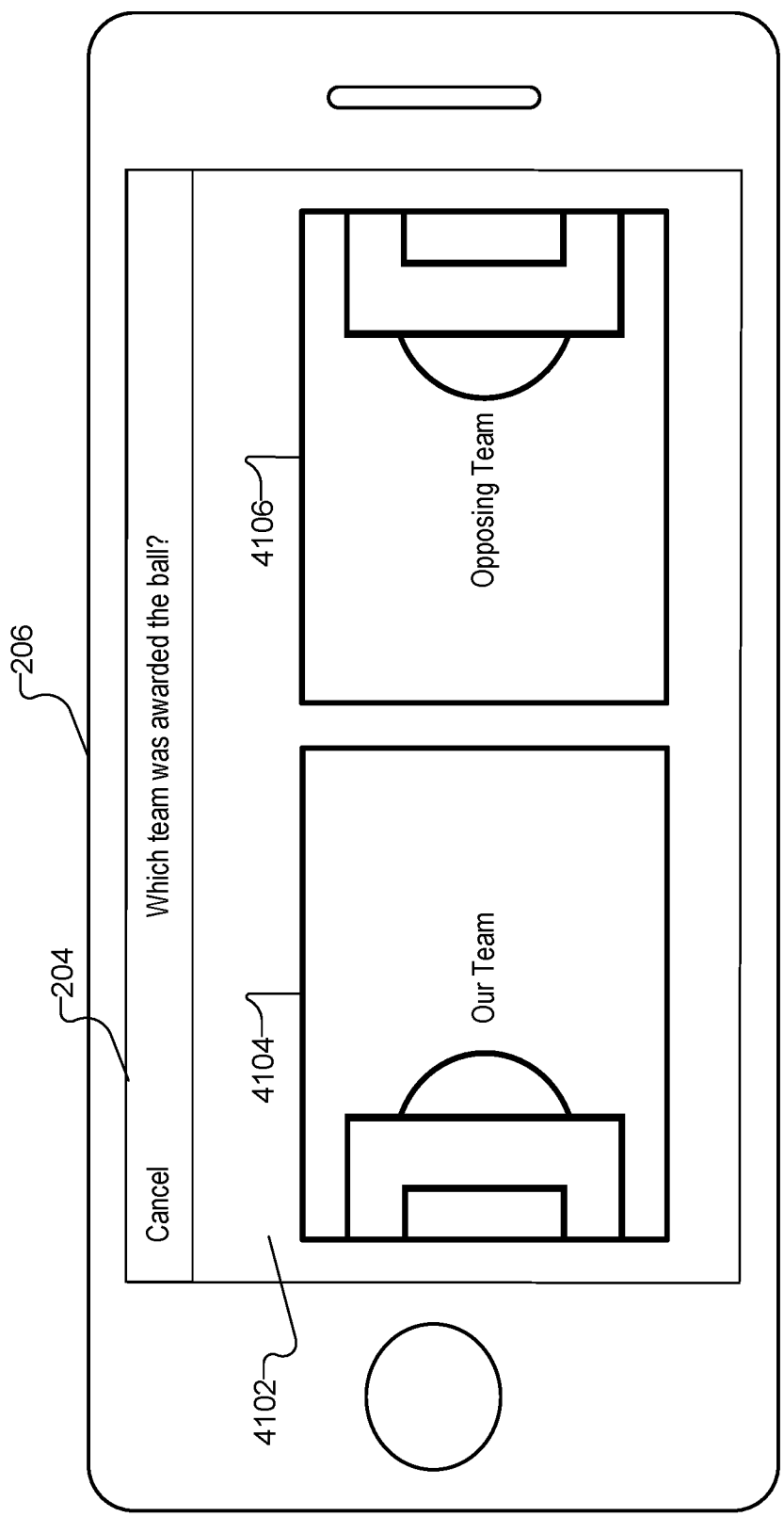

FIGS. 39-41 depict an exemplary graphical user interface flow that system 100 may provide for display as a result of a side line out of bounds play (e.g., a side line out of bounds sporting event context). System 100 may provide such a graphical user interface flow in response to a selection of icon 2704-3 in FIG. 27 or icon 3104-3 in FIG. 31. FIG. 39 shows a graphical user interface 3902 that includes icons 406 and a plurality of icons 3904 (e.g., icons 3904-1 through 3904-4) that are selectable by the user to indicate who is taking the throw in, to facilitate making one or more substitutions, and/or to provide further information regarding the out of bounds play.

FIG. 40 shows an exemplary graphical user interface 4002 that may be provided for display by system 100 after the user makes a selection in graphical user interface 3902 shown in FIG. 39. As shown in FIG. 40, graphical user interface 4002 includes a graphical depiction 4004 of the playing field. The user may provide any suitable input on a boundary of graphical depiction 4004 to indicate where the ball went out of play. In the example shown in FIG. 40, an icon 4006 indicates the location indicated by the user where the ball went out of play.

FIG. 41 shows an exemplary graphical user interface 4102 that system 100 may provide for display after the user indicates where the ball went out of play in graphical user interface 4002. As shown in FIG. 41, the user may select a box 4104 labeled "Our Team" to indicate that the team associated with the user was awarded the ball as a result of the out of bounds play. Alternatively, the user may select box 4106 labeled "Opposing Team" to indicate that the opposing team was awarded the ball as a result of the out of bounds play. System 100 may then record one or more statistics associated with the selections made by the user with regard to the graphical user interface flow shown in FIGS. 39-41.

Figure 42:
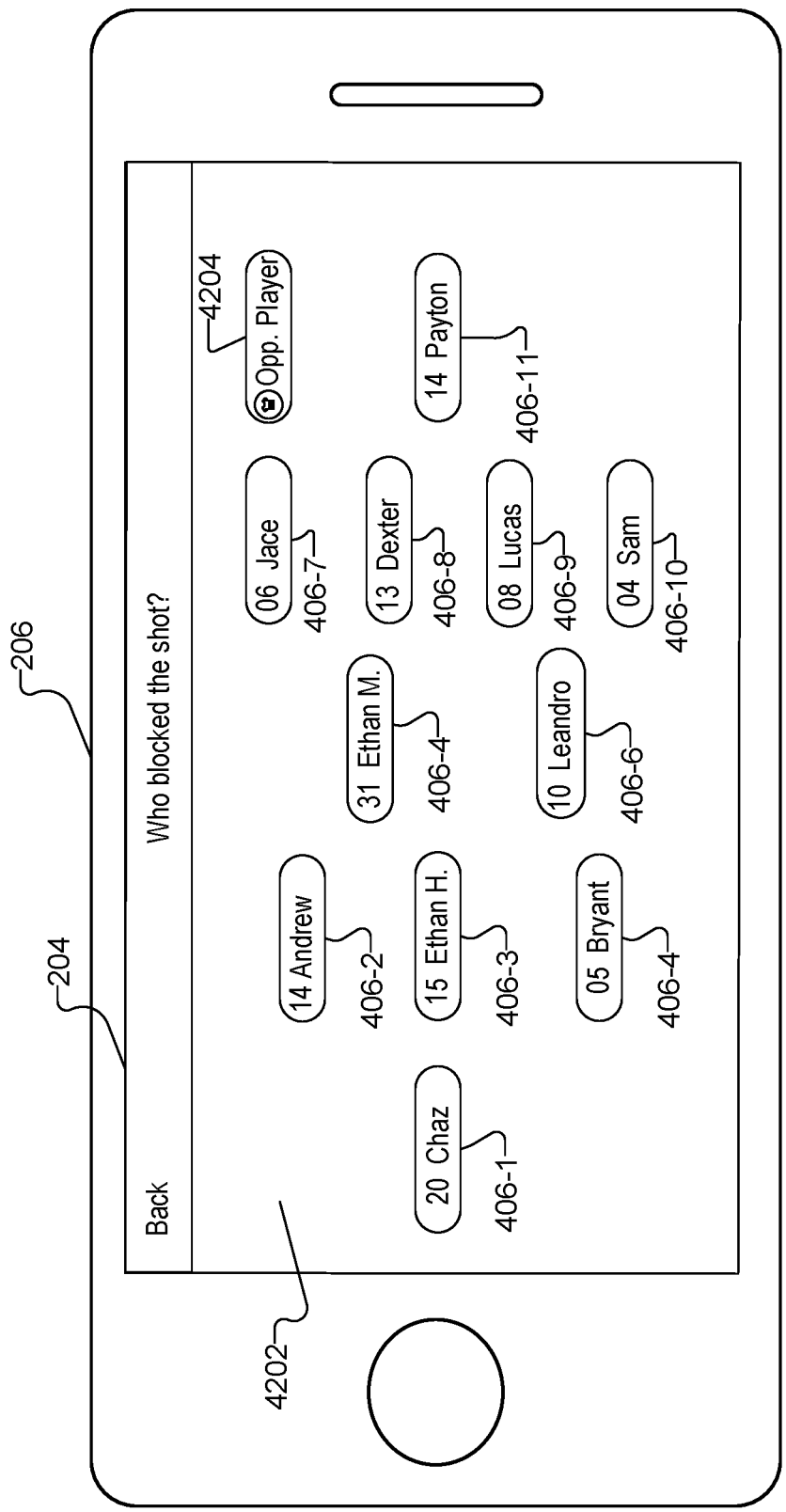

FIGS. 42-47 illustrate an exemplary graphical user interface flow that system 100 may provide for display when a shot towards a goal is blocked (e.g., a blocked goal sporting event context). The blocked shot graphical user interface flow may be provided, for example, based on a swipe left from icon 406-1 in FIG. 31 indicating that Chaz took a shot and a subsequent indication that the shot was blocked. FIG. 42 includes a graphical user interface 4202 in which the user is asked "Who blocked the shot?" The user can then provide any suitable user input to identify which participant blocked the shot. For example, the user may select icon 4204 if an opposing player blocked the shot. Alternatively, if the opposing team made a shot toward the goal, the user may select one of icons 406 to indicate which specific player blocked the shot.

Figure 43:
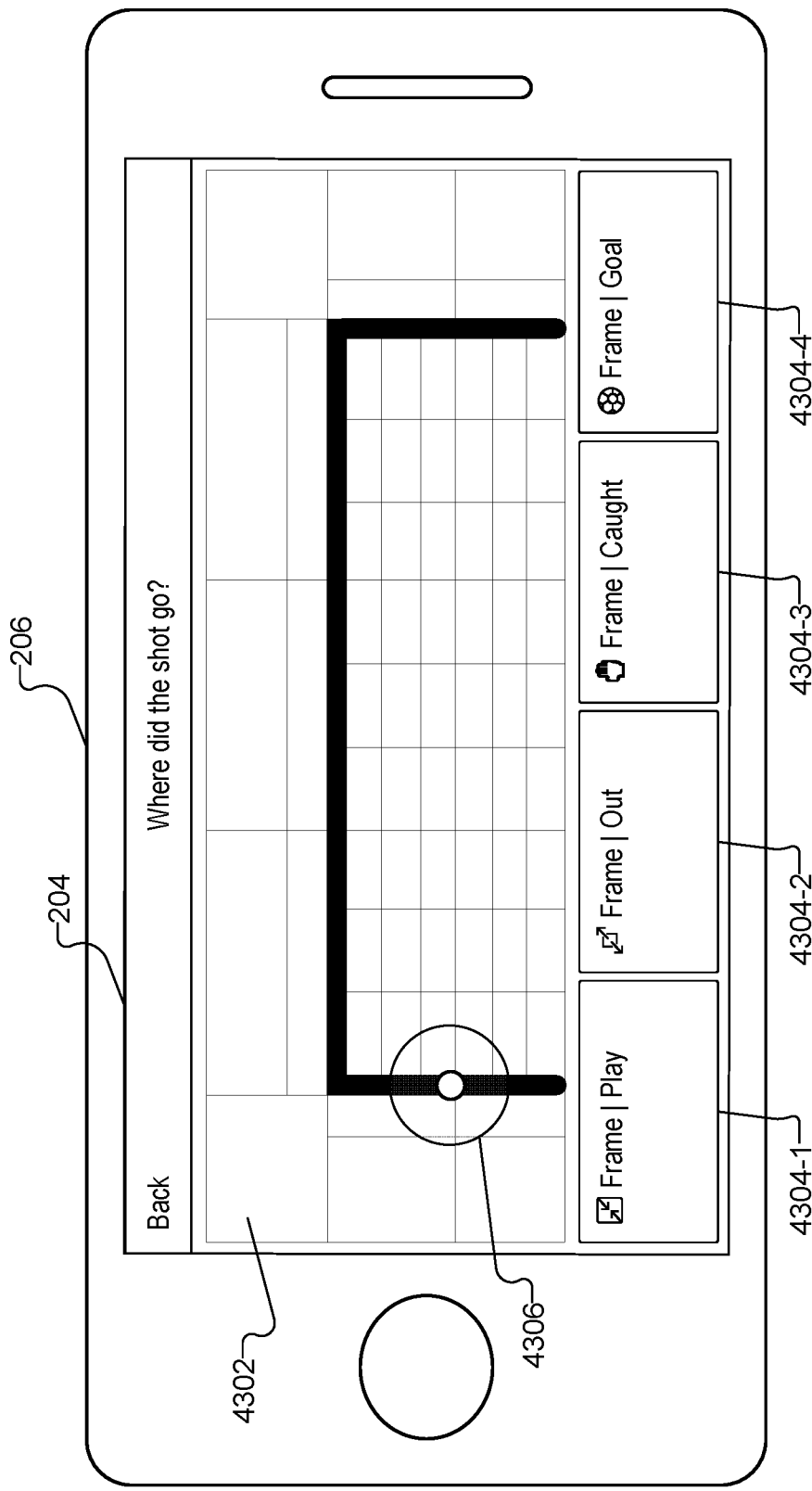

FIG. 43 includes a graphical user interface 4302 through which the user may provide additional information associated with the blocked shot. For example, graphical user interface 4302 includes a plurality of icons 4304 (e.g., icons 4304-1 through 4304-4) through which the user may specify whether the shot hit the frame and went back into play, whether the shot hit the frame and went out of play, whether the shot hit the frame and was caught by the goalkeeper, or whether the shot hit the frame and scored a goal. In addition, the user may indicate in graphical user interface 4302 where the shot went in relation to the frame. In the example shown in FIG. 43, an indicator 4306 is provided to show that the user indicated that the shot hit the left goalpost.

Figure 44:
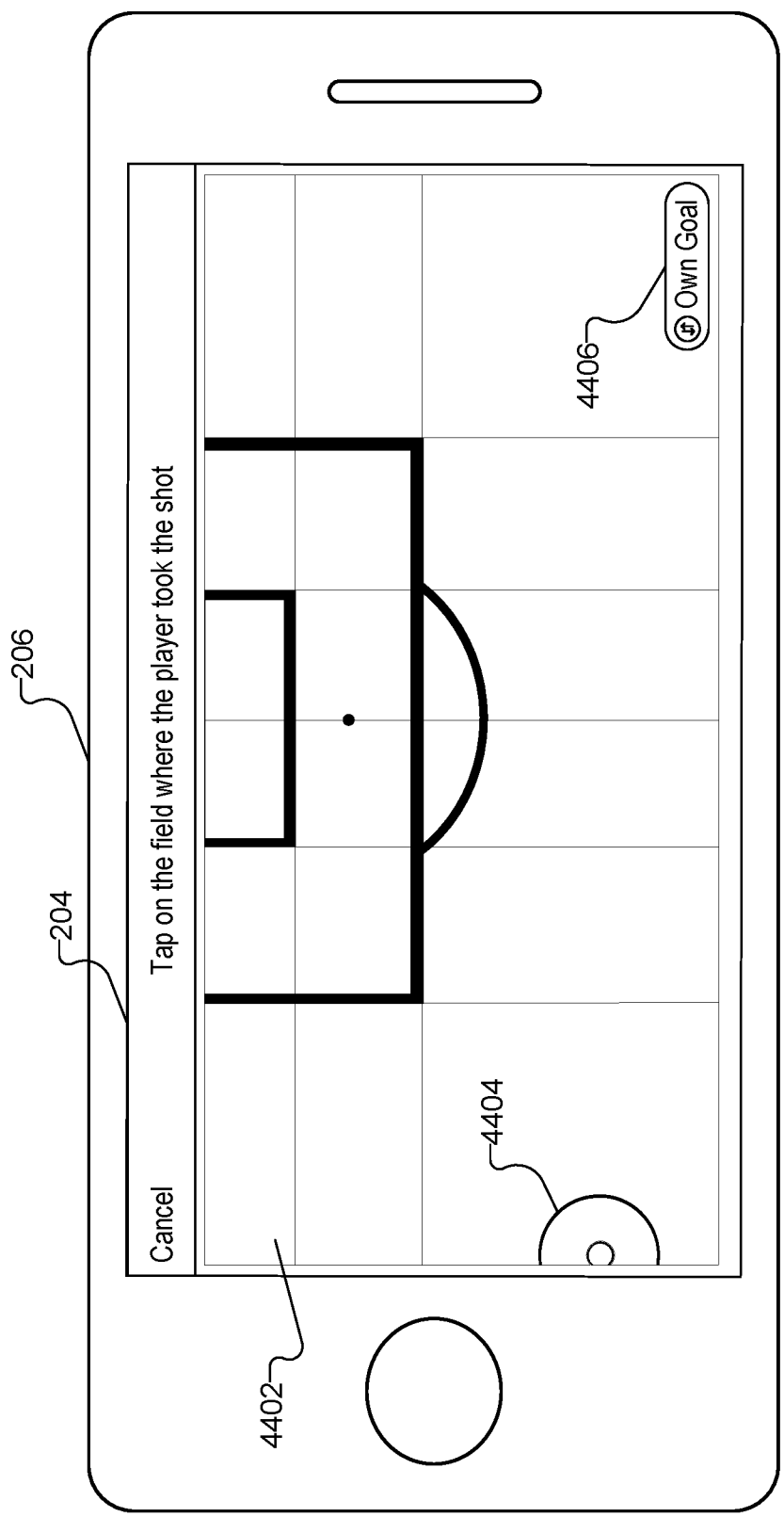

FIG. 44 includes a graphical user interface 4402 that depicts an overhead view of the field of play. Through graphical user interface 4402 the user can indicate where on the field of play the shot was taken. In the example shown in FIG. 44, an indicator 4404 is provided to show the location selected by the user as where the shot was taken from. FIG. 44 also includes an icon 4406 that may be selected by a user if an own goal was scored.

Figure 45:
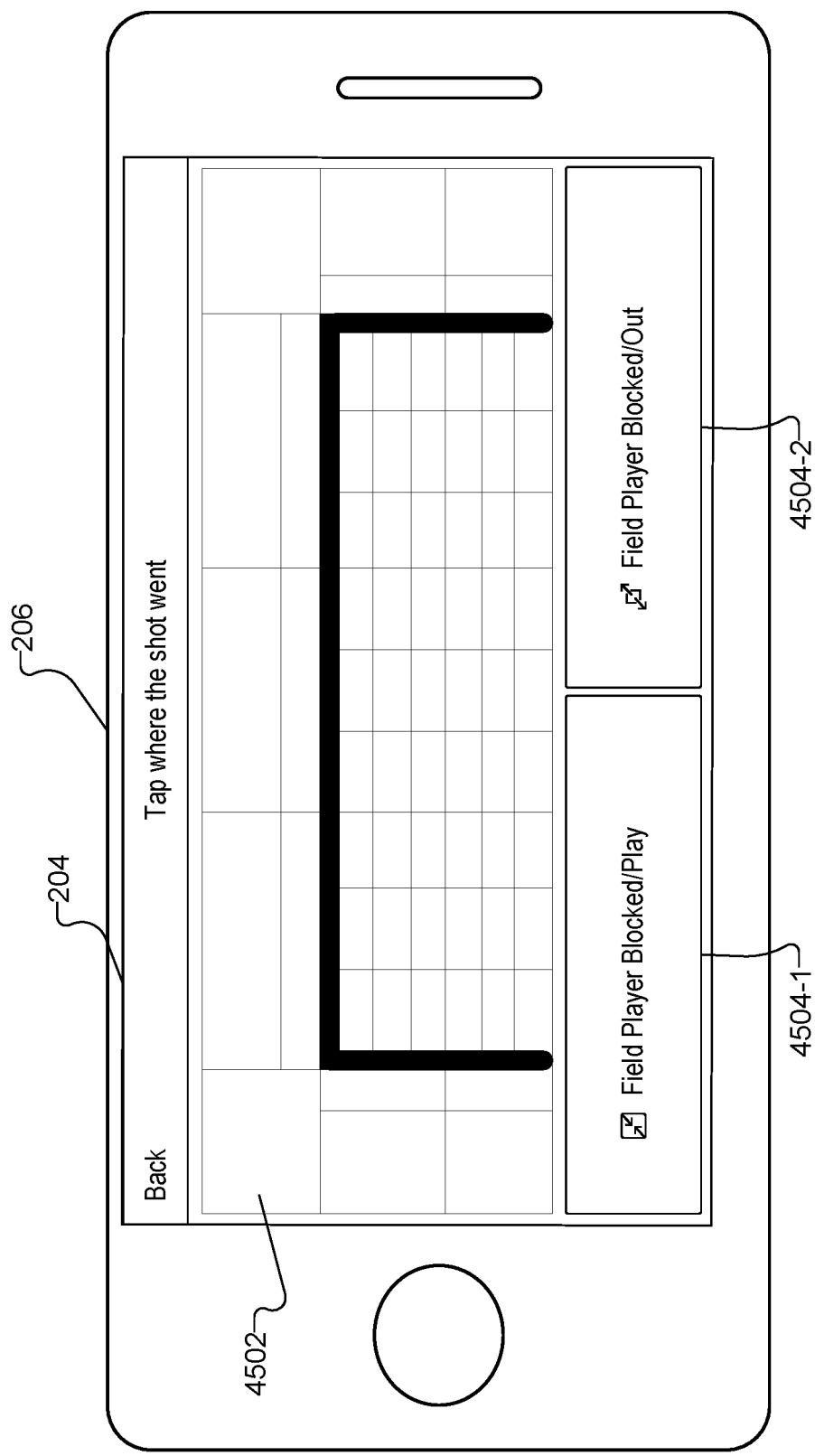

FIG. 45 includes an exemplary graphical user interface 4502 that may additionally or alternatively be provided when a field player blocks a shot. As shown in FIG. 45, graphical user interface 4502 includes icons 4504-1 and 4504-2 that a user may alternatively select depending on whether the field player blocked the shot back into play or out of play.

Figure 46:
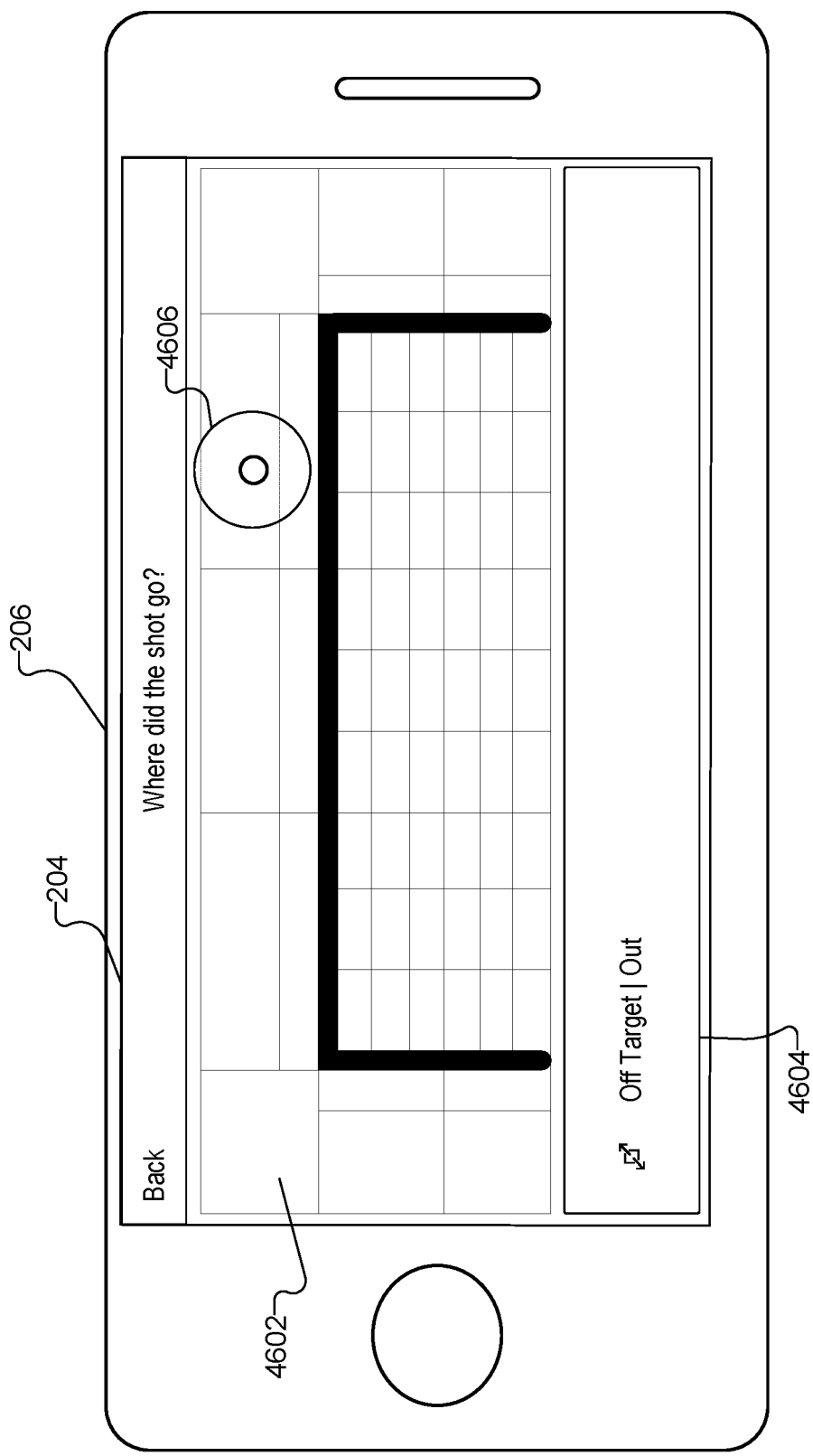

FIG. 46 includes an exemplary graphical user interface 4602 that may additionally or alternatively be provided when the shot is off target and is out of play. The user may select section 4604 if the shot is off target and out of play. Additionally or alternatively, the user may indicate where in relation to the frame of the goal the shot went. In response to such a selection, system 100 may provide icon 4606 for display.

Figure 47:
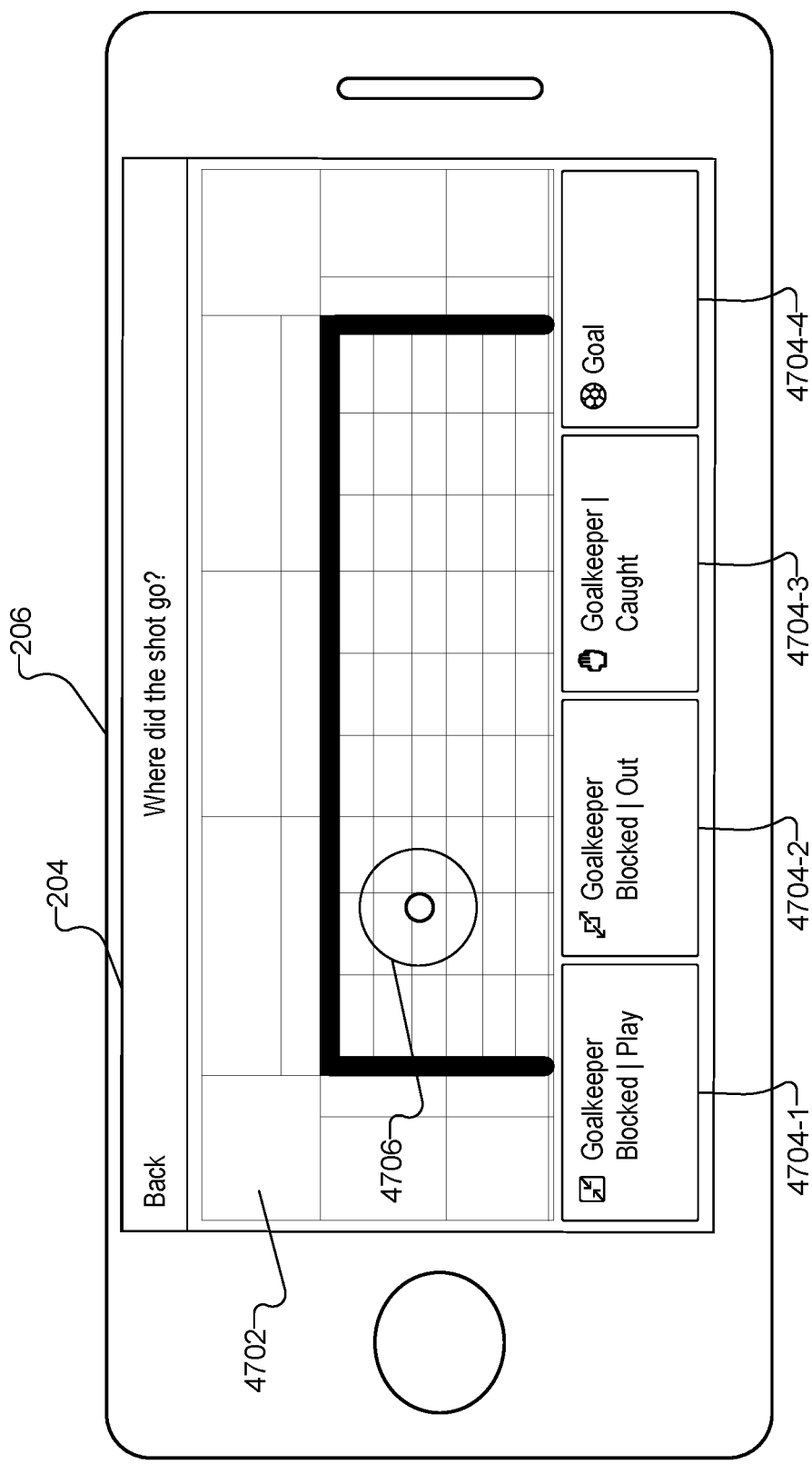

FIG. 47 includes an exemplary graphical user interface 4702 that may additionally or alternatively be provided when the goalkeeper performs some action with respect to a shot. As shown in FIG. 47, graphical user interface 4702 includes a plurality of icons 4704 (e.g., icons 4704-1 through 4704-4) representative of actions performed by a goalkeeper. For example, the user may select icon 4704-2 if the goalkeeper blocked the shot out of play. Alternatively, the user can select one of the other icons 4704 to provide further information about the blocked shot. System 100 may then record one or more statistics associated with the selections made by the user with regard to the graphical user interface flow shown in FIGS. 42-47.

System 100 may provide one or more recorded statistics for presentation to the user at any suitable time and in any suitable manner. For example, system 100 may provide one or more graphical user interfaces including recorded statistics for display during a sporting event (e.g., during a timeout, during half time, etc.). Additionally or alternatively, system 100 may provide one or more graphical user interfaces including recorded statistics for display after conclusion of the sporting event.

Figure 48:
Figure 49:
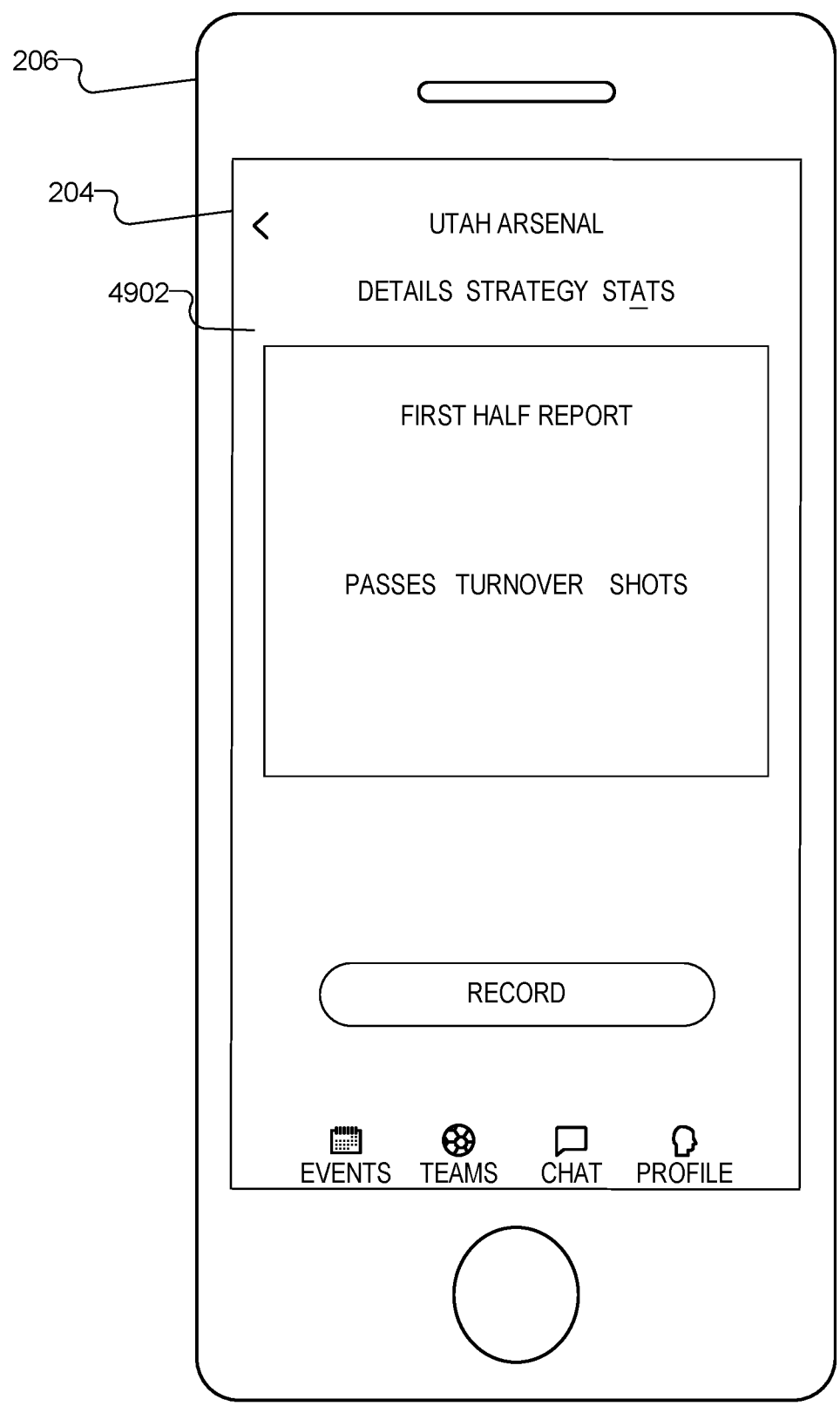

FIGS. 48 and 49 include exemplary graphical user interfaces that present statistics recorded by system 100 based on the user inputs provided by the user during a soccer match. In particular, FIG. 48 shows an exemplary graphical user interface 4802 in which team statistics may be represented. One or more additional or alternative graphical user interfaces may be provided for display to present passing statistics for each of a plurality of individual players on a team, offensive statistics for each of a plurality of individual players on a team, defensive statistics for each of a plurality of individual players on a team, work rate statistics for each of a plurality of individual players on a team, and/or any other suitable statistics or combination of statistics.

Additionally or alternatively, one or more graphical user interfaces may be provided for display to show individual passing, offense, defense, and work rate statistics for a player. In certain examples, such statistics may be provided in the same view for a single player.

In certain examples, system 100 may provide one or more graphical user interfaces that include simplified summaries with a few key recorded statistics. Such simplified summaries may be provided for display at any suitable time. To illustrate, FIG. 49 shows an exemplary graphical user interface 4902 that may be provided for display by system 100 prior to beginning the soccer match. In response to a user selection of the "Record" icon shown in FIG. 49, system 100 may provide graphical user interface 402 shown in FIG. 4 for display on display screen 204. As shown in FIG. 49, graphical user interface 4902 may include a number of key statistics (e.g., passes, turnovers, and shots) that may be beneficial to review during and/or after the sporting event. In the example shown in FIG. 49, areas for four key statistics are provided (e.g., a score area, a passes area, etc.). Fewer or more statistics may be provided for display in a simplified summary in certain implementations.

In certain examples, system 100 may provide a recording feature configured to allow a user to record audio and/or video during the sporting event by way of mobile computing device 206. Such a recording feature may be implemented in any suitable manner and may be used to describe any possible action that may occur during the sporting event. For example, in any one or all of the exemplary graphical user interfaces described herein, system 100 may provide a dedicated recording icon that the user may select, in any suitable manner, to initiate a recording. To illustrate, graphical user interface 1702 shown in FIG. 17 may include a dedicated recording icon (not shown) that allows the user to make an audio recording that describes further details about a shot made toward the goal. The user could select the dedicated recording icon and then say, for example, "Chaz headed the ball into the upper left corner of the goal." In other examples, the user could select the dedicated recording icon and say one or more of "Jace pass to Sam," "Sam pass to Dexter," "Dexter was tackled," "Opponent pass," etc. System 100 may be configured to analyze the audio recording using any suitable speech recognition technology and record one or more statistics associated with the information included in the audio recording.

Figure 50:
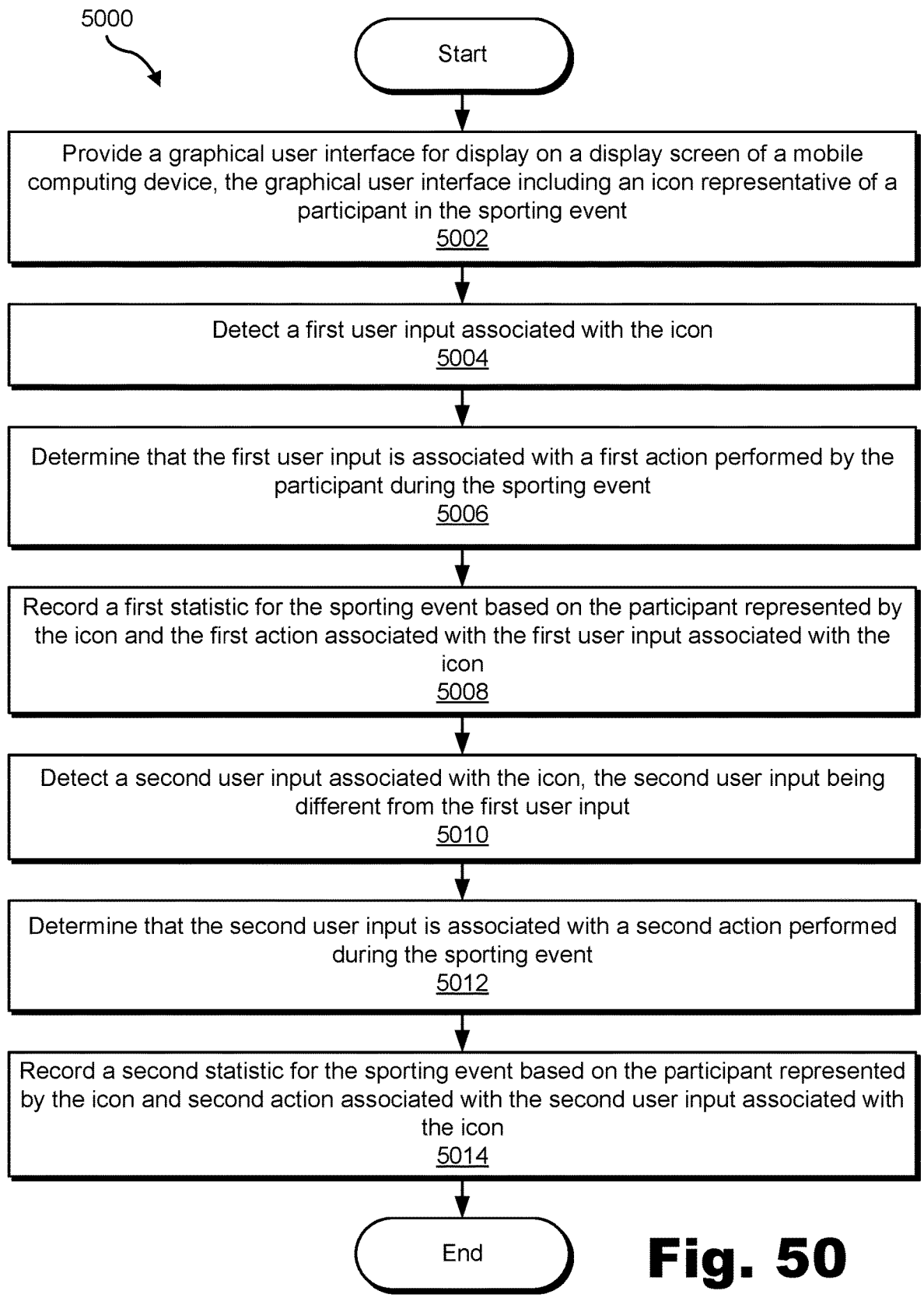
FIGS. 50 and 51 illustrate exemplary methods for recording statistics associated with a sporting event according to principles described herein.

FIG. 50 illustrates an exemplary method 5000 for recording statistics associated with a sporting event. While FIG. 50 illustrates exemplary operations according to some embodiments, other embodiments may omit, add to, reorder, and/or modify any of the operations shown in FIG. 50. One or more of the operations shown in FIG. 50 may be performed by system 100 and/or any implementation thereof.

In operation 5002, a sporting event statistics recording system (e.g., system 100) may provide a graphical user interface for display on a display screen of a mobile computing device. The graphical user interface may include an icon representative of a participant in the sporting event. Operation 5002 may be performed in any of the ways described herein.

In operation 5004, the sporting event statistics recording system may detect a first user input associated with the icon. Operation 5004 may be performed in any of the ways described herein.

In operation 5006, the sporting event statistics recording system may determine that the first user input is associated with a first action performed by the participant during the sporting event. Operation 5006 may be performed in any of the ways described herein.

In operation 5008, the sporting event statistics recording system may record a first statistic for the sporting event based on the participant represented by the icon and the first action associated with the first user input associated with the icon. Operation 5008 may be performed in any of the ways described herein.

In operation 5010, the sporting event statistics recording system may detect a second user input associated with the icon, the second user input being a different type of input from the first user input. Operation 5010 may be performed in any of the ways described herein.

In operation 5012, the sporting event statistics recording system may determine that the second user input is associated with a second action performed during the sporting event. Operation 5012 may be performed in any of the ways described herein.

In operation 5014, the sporting event statistics recording system may record a second statistic for the sporting event based on the participant represented by the icon and the second action associated with the second user input associated with the icon. Operation 5014 may be performed in any of the ways described herein.

Figure 51:
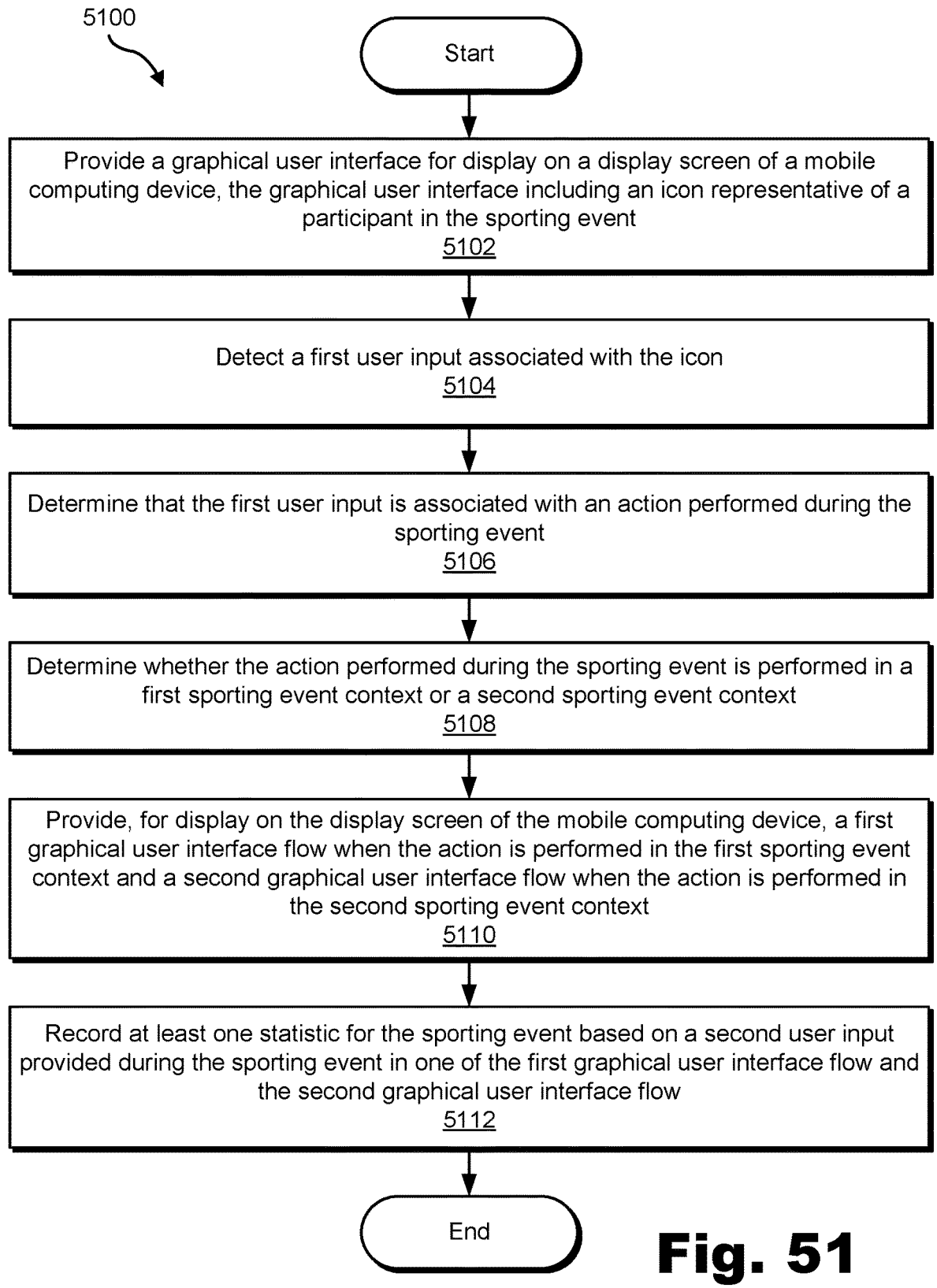

FIG. 51 illustrates another exemplary method 5100 for recording statistics associated with a sporting event. While FIG. 51 illustrates exemplary operations according to some embodiments, other embodiments may omit, add to, reorder, and/or modify any of the operations shown in FIG. 51. One or more of the operations shown in FIG. 51 may be performed by system 100 and/or any implementation thereof.

In operation 5102, a sporting event statistics recording system (e.g., system 100) may provide a graphical user interface for display on a display screen of a mobile computing device. The graphical user interface may include an icon representative of a participant in the sporting event. Operation 5102 may be performed in any of the ways described herein.

In operation 5104, the sporting event statistics recording system may detect a first user input associated with the icon. Operation 5104 may be performed in any of the ways described herein.

In operation 5106, the sporting event statistics recording system may determine that the first user input is associated with an action performed during the sporting event. Operation 5106 may be performed in any of the ways described herein.

In operation 5108, the sporting event statistics recording system may determine whether the action performed during the sporting event is performed in a first sporting event context or a second sporting event context. Operation 5108 may be performed in any of the ways described herein.

In operation 5110, the sporting event statistics recording system may provide for display a first graphical user interface flow when the action is performed in the first sporting event context and a second graphical user interface flow when the action is performed in the second sporting event context. Operation 5110 may be performed in any of the ways described herein.

In operation 5112, the sporting event statistics recording system may record at least one statistic for the sporting event based on a second user input provided during the sporting event in one of the first graphical user interface flow and the second graphical user interface flow. Operation 5112 may be performed in any of the ways described herein.

In certain examples, one or more of the following concepts may be implemented in conjunction with or as part of the methods and systems described herein.

In certain examples, system 100 may use statistics recorded during a sporting event to provide recognition to participants of the sporting event and/or to drive interaction between the participants and/or nonparticipants (e.g., parents, coaches, spectators, etc.). To that end, system 100 may analyze (e.g., after completion of the sporting event) statistics recorded during the sporting event. Based on the statistics recorded during the sporting event, system 100 may select a set of participants from a plurality of participants in the sporting event as being candidates to receive recognition regarding actions performed during the sporting event. For example, a first participant may have had more shots on goal than other participants, a second participant may have made an important defensive play during the sporting event, a third participant may have scored a decisive goal, etc.

System 100 may send information associated with the set of participants in any suitable manner to a plurality of additional mobile computing devices (e.g., smart phones associated with parents, spectators, coaches, etc.). The information provided to the plurality of additional mobile computing devices may include a request to vote for one or more participants included in the set of participants. In addition, the information may include any other suitable information associated with the one or more participants and/or their actions performed during the sporting event. For example, the information may indicate that the first participant made the most shots on goal during the sporting event, that the second participant made an important defensive play, and that the third participant scored a decisive goal. The users of the additional mobile computing devices may then vote either for the first participant, the second participant, or the third participant as being, for example, the player of the match. In certain examples, the users of the additional mobile computing devices may be given a predefined time frame in which to provide their vote. For example, after completion of the sporting event, the participants and/or nonparticipants may be given 30 minutes to provide their votes.

System 100 may receive, from the plurality of additional mobile computing devices, vote information indicating which of the one or more participants included in the set of participants have received votes to receive the recognition regarding the actions performed during the sporting event. System 100 may then send the vote information in any suitable manner to the participants and/or any other party (e.g., news outlet, social media platform, etc.) such that at least some of the participants receive recognition for their performance during the sporting event.

In certain examples, it may be desirable to generate regional rankings of teams to make statistics such as those described herein more relevant and meaningful. This is helpful because raw statistics analyzed in isolation without knowing the general level of play at which they were generated may not be as helpful or meaningful as they could be. Accordingly, in certain examples, the systems and methods described herein may include generating regional team rankings based on surveys that may be provided to coaches to evaluate the level of play in a particular region. Such surveys may include asking coaches to name a top number (e.g., five) of teams in their market, asking the coaches to de-dupe team names that have been previously entered by other coaches, and informing the coaches that, for their "vote" towards a team to be counted, some specified number of other coaches must independently agree with their assessment by entering in the same name in the top number of teams. The top teams in a given region may be determined by combining the total valid votes and relative team ratings provided by the coaches in any suitable manner. In certain examples, a time frame given to coaches to participate in the survey may be short (e.g., one or two days) to possibly prevent coaches colluding together and ranking their teams higher than they should be.

In certain examples, statistics such as those described herein may be used for more than just personal development of players. For example, statistics such as those described herein may be used for professional scouting purposes and/or any other purpose other than personal development. This may provide an incentive for players, coaches, and/or parents to utilize methods and systems such as those described herein to generate statistics that do not accurately reflect what actually occurred during the sporting event. For example, a parent may intentionally provide incorrect user inputs during a sporting event to make it seem like their child had more shots on goal. To prevent this, in certain examples, the systems and methods described herein may include providing two or more users at each sporting event that separately and independently utilize methods and systems such as those described herein to record statistics during a sporting event. In certain examples, a test environment may be used to determine a typical range of inter-user reliability and time stamp skew between users. In so doing, the statistics for a given sporting event may be considered as being more reliable and/or verified.

In certain examples, the methods and systems described herein may include developing a player metric that may be used to rank players from all position types. This may be accomplished by using the formula for the known Shapley value as a starting point. The player metric may include slicing playing data into equal sized chunks of time (with each chunk of time containing a "coalition" of players and a "goals per minute" value), computing the Shapley value, and continuing to randomly draw and compute the Shapely value using a known "bootstrap with replacement" algorithm. The algorithm will converge upon a Shapely value with a confidence interval for each player.

In certain examples, embodiments may include automated input of statistics via video analysis. This may be accomplished in any suitable manner. For example, a drone may be used to record video of a sporting event such as a soccer game. The recorded video may be automatically uploaded to the cloud using any suitable communications technology. The uploaded video may then be analyzed with machine learning to produce robust statistics associated with the sporting event. Additional videos at different viewpoints may be taken to provide additional data usable to record statistics. For example, videos of goal posts may be taken to provide additional data that may be used for generating highlight clips from key moments as determined by machine learning.

In certain embodiments, a timestamp-based reconstruction of a sporting event may be performed based on different sets of data generated based on different users entering inputs during a sporting event. For example, a first user may utilize an application implementing the methods described herein to track the players and their actions. A second user may separately utilize an application implementing the methods described herein to track the location of actions performed during the sporting event. In a post-game analysis, the two data sets may be sync'd together in any suitable manner (e.g., through machine learning) to create a unified reconstruction of events that occurred during the sporting event.

Additionally or alternatively, a ball or other object used during the sporting event may include a GPS transmitter that may be used to track the position of the ball or other object during the sporting event. Using machine learning, it may be possible to sync the location of the ball or other object with the recorded statistics. For example, a sudden ball velocity and trajectory may be used to infer the precise time and location of events occurring during the sporting event instead of relying on the timing that the user enters a user input, which may lag behind the timing of the action by some amount of time (e.g., several seconds).

In certain embodiments, one or more of the statistic recording operations, features, and/or graphical user interfaces may be implemented as a component of a software program, such as a mobile application. In some examples, such a software program may provide additional operations, features, and/or graphical user interfaces including, but not limited to, elements that may be used by a user of the software program to sign up as a user with a particular role (e.g., an administrator, a coach, a parent, etc.), to authenticate to the software program (e.g., to use credentials to sign in), to set up and manage one or more teams, to set up and manage one or more events (e.g., games, practices, etc.), to manage a calendar of events (e.g., a calendar of team events), to set up and manage user roles or permissions for a team, to prepare for a sporting event (e.g., selecting a formation and starting players for a soccer match), to communicate with interested parties (e.g., by sending notifications to players and parents), to chat with other users of the software program (e.g., with members of a team), and to set up and manage a profile for the user.

In certain embodiments, one or more of the systems, components, and/or processes described herein may be implemented and/or performed by one or more appropriately configured physical computing devices (e.g., a mobile computing device, a server device, a combination of server and client computing devices, etc.). To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions (e.g., a mobile application) embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 52:
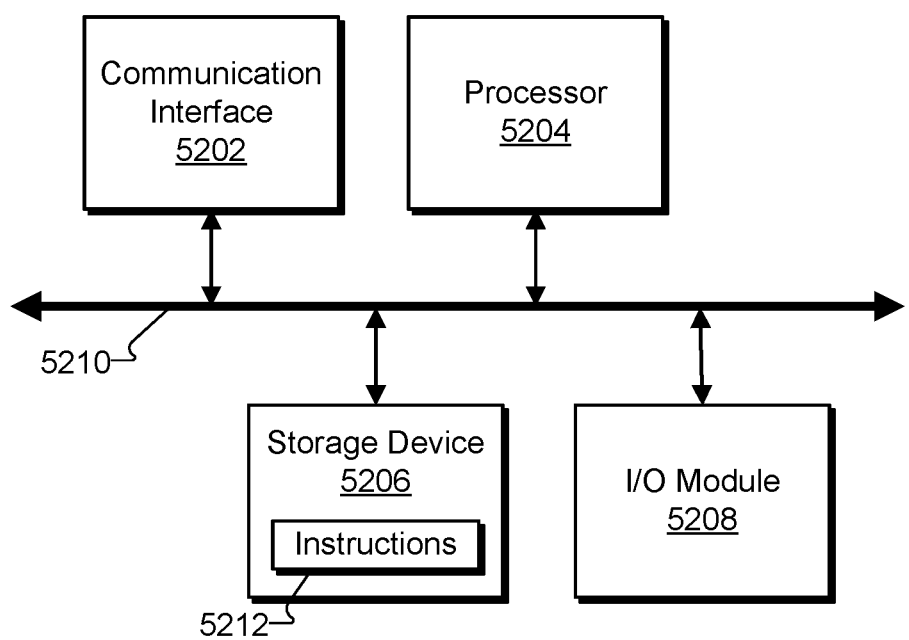
FIG. 52 illustrates an exemplary computing device according to principles described herein.

FIG. 52 illustrates an exemplary computing device 5200 that may be specifically configured to perform one or more of the processes described herein. As shown in FIG. 52, computing device 5200 may include a communication interface 5202, a processor 5204, a storage device 5206, and an input/output ("I/O") module 5208 communicatively connected via a communication infrastructure 5210. While an exemplary computing device 5200 is shown in FIG. 52, the components illustrated in FIG. 52 are not intended to be limiting. Additional or alternative components may be used in other embodiments. Components of computing device 5200 shown in FIG. 52 will now be described in additional detail.

Communication interface 5202 may be configured to communicate with one or more computing devices. Examples of communication interface 5202 include, without limitation, a wired network interface (such as a network interface card), a wireless network interface (such as a wireless network interface card), a modem, an audio/video connection, and any other suitable interface.

Processor 5204 generally represents any type or form of processing unit (e.g., a central processing unit) capable of processing data or interpreting, executing, and/or directing execution of one or more of the instructions, processes, and/or operations described herein. Processor 5204 may perform operations by executing computer-executable instructions 5212 (e.g., an application, software, code, and/or other executable data instance) stored in storage device 5206.

Storage device 5206 may include one or more data storage media, devices, or configurations and may employ any type, form, and combination of data storage media and/or device. For example, storage device 5206 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 5206. For example, data representative of one or more executable applications 5212 configured to direct processor 5204 to perform any of the operations described herein may be stored within storage device 5206. In some examples, data may be arranged in one or more databases residing within storage device 5206. The storage facility may further include any other data as may be used by computing device 5200 and/or system 100 to perform one of more of the operations described herein.

I/O module 5208 may include one or more I/O modules configured to receive user input and provide user output. One or more I/O modules may be used to receive input for a single virtual reality experience. I/O module 5208 may include any hardware, firmware, software, or combination thereof supportive of input and output capabilities. For example, I/O module 5208 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 5208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 5208 is configured to provide graphical data to a display for presentation to a user. The graphical data may be representative of one or more graphical user interfaces, such as any of the graphical user interface views described herein, and/or any other graphical content as may serve a particular implementation. I/O module 5208 may be omitted from certain implementations.

In some examples, any of the facilities described herein may be implemented by or within one or more components of computing device 5200. For example, one or more applications 5212 residing within storage device 5206 may be configured to direct processor 5204 to perform one or more processes or functions associated with mobile computing device 202 and/or facilities thereof.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A mobile computing device comprising:
a touch screen display;
a memory storing instructions; and
a processor communicatively connected to the memory and configured to execute the instructions to:
present a graphical user interface view on the touch screen display, the graphical user interface view including a plurality of icons representative of a team of participants in a sporting event, the plurality of icons arranged in a formation representing a formation of the team of participants in the sporting event, the plurality of icons including an icon representative of a participant in the sporting event; and
detect a first type of user input or a second type of user input provided on the icon included in the graphical user interface view presented on the touch screen display,
wherein:
the first type of user input is a touchscreen tap input in which a user of the mobile computing device taps the icon representative of the participant during the sporting event;
the second type of user input is a touchscreen swipe input in which a user of the mobile computing device swipes, from the icon representative of the participant during the sporting event, at least a predefined threshold distance in one of a plurality of predefined directions on the display screen of the mobile computing device, each direction of the plurality of predefined directions corresponding to a different action possibly performed by the participant during the sporting event;
when the first type of user input is detected on the icon included in the graphical user interface view presented on the touch screen display, the processor is configured to execute the instructions to record a first statistic based on the participant represented by the icon and a first action in the sporting event that is predefined to be associated with the first type of user input; and
when the second type of user input is detected on the icon included in the graphical user interface view presented on the touch screen display, the processor is configured to execute the instructions to record a second statistic based on the participant represented by the icon and a second action, different from the first action, in the sporting event that is predefined to be associated with the second type of user input.

2. The mobile computing device of claim 1, wherein the processor is further configured to execute the instructions to:
detect, during the sporting event, a third type of user input on the icon included in the graphical user interface view presented on the touch screen display, the third type of user input being a touchscreen swipe input in which a user of the mobile computing device swipes, from the icon representative of the participant during the sporting event, a distance that is less than the predefined threshold distance; and
provide, in response to the detecting of the third type of user input on the icon included in the graphical user interface view presented on the touch screen display, for display on the touch screen display, an indication of the plurality of different actions corresponding to the plurality of predefined directions.

3. The mobile computing device of claim 1, wherein:
the graphical user interface view further includes a single opponent icon representing an opposing team of participants in the sporting event, the single opponent icon presented on the touch screen display together with the plurality of icons representative of the team of participants in the sporting event; and the processor is configured to execute the instructions to detect the first type of user input or the second type of user input on the opponent icon included in the graphical user interface view presented on the touch screen display;

when the first type of user input is detected on the opponent icon included in the graphical user interface view presented on the touch screen display, the processor is configured to execute the instructions to record a first opponent team statistic based on the first action in the sporting event that is predefined to be associated with the first type of user input; and when the second type of user input is detected on the opponent icon included in the graphical user interface view presented on the touch screen display, the processor is configured to execute the instructions to record a second opponent team statistic based on the second action, different from the first action, in the sporting event that is predefined to be associated with the second type of user input.

4. The mobile computing device of claim 1, wherein the processor is further configured to execute the instructions to:

detect, during the sporting event, a third type of user input on the icon included in the graphical user interface view presented on the touch screen display, the third type of user input being a different type of user input from the first type of user input and the second type of user input; and provide, in response to the detecting of the third type of user input on the icon included in the graphical user interface view presented on the touch screen display, an additional graphical user interface view for display on the touch screen display, the additional graphical user interface view including an additional plurality of icons, each icon included in the additional plurality of icons representative of a further action possibly associated with the participant during the sporting event.

5. The mobile computing device of claim 4, wherein the processor is further configured to execute the instructions to:

detect, during the sporting event, a fourth type of user input in which a user of the mobile computing device selects one of the additional plurality of icons represented in the additional graphical user interface view;

record a third statistic associated with the selected one of the additional plurality of icons; and provide, in response to the selection of the one of the additional plurality of icons, the graphical user interface view for display again on the touch screen display.

6. The mobile computing device of claim 4, wherein the third type of user input is a touchscreen touch-and-hold user input in which the user of the mobile computing device touches and holds the icon representative of the participant for a predetermined amount of time.

7. The mobile computing device of claim 1, wherein the processor is further configured to execute the instructions to:

determine whether the first action in the sporting event is performed in a first sporting event context or a second sporting event context; and provide, during the sporting event and for display on the touch screen display, a first graphical user interface flow when the first action is performed in the first sporting event context and a second graphical user interface flow when the first action is performed in the second sporting event context.

8. The mobile computing device of claim 7, wherein:

the first graphical user interface flow includes a first series of graphical user interface views;

graphical user interface views included in the first series of graphical user interface views are provided for display in sequence on the touch screen display when the first action is performed in the first sporting event context;

the second graphical user interface flow includes a second series of graphical user interface views; and graphical user interface views included in the second series of graphical user interface views are provided for display in sequence on the touch screen display when the first action is performed in the second sporting event context.

9. The mobile computing device of claim 8, wherein:

each graphical user interface view included in the first series of graphical user interface views is configured to facilitate the user of the mobile computing device entering information associated with a different statistic associated with the first action when the first action is performed in the first sporting event context; and each graphical user interface view included in the second series of graphical user interface views is configured to facilitate the user of the mobile computing device entering information associated with a different statistic associated with the first action when the first action is performed in the second sporting event context.

10. The mobile computing device of claim 1, wherein:

the first action performed during the sporting event represents a change in possession from an additional participant included in the plurality of participants to the participant;

the icon included in the plurality of icons that is representative of the participant is provided with a first indicator and an additional icon included in the plurality of icons that is representative of the additional participant is provided with a second indicator;

the second indicator is visually different from the first indicator; and the first indicator and the second indicator indicate a path of possession from the additional participant to the participant.

11. The mobile computing device of claim 1, wherein:

the graphical user interface view further includes a single out-of-bounds icon presented on the touch screen display together with the plurality of icons representative of the team of participants in the sporting event;

the processor is configured to execute the instructions to detect the first type of user input on the out-of-bounds icon included in the graphical user interface view presented on the touch screen display; and when the first type of user input is detected on the out-of-bounds icon included in the graphical user interface view presented on the touch screen display, the processor is configured to execute the instructions to record a statistic associated with a ball going out of bounds.

12. A method comprising:

providing, by a sporting event statistics recording system during a sporting event, a graphical user interface view for display on a display screen of a mobile computing device, the graphical user interface view including a plurality of icons representative of a team of participants in a sporting event, the plurality of icons arranged in a formation representing a formation of the team of participants in the sporting event, the plurality of icons including an icon representative of a participant in the sporting event;

detecting, by the sporting event statistics recording system during the sporting event, a first user input on the icon in the graphical user interface view;

determining, by the sporting event statistics recording system during the sporting event, that the first user input on the icon is associated with a first action performed by the participant during the sporting event;

recording, by the sporting event statistics recording system during the sporting event, a first statistic for the sporting event based on the participant represented by the icon and the first action associated with the first user input on the icon;

detecting, by the sporting event statistics recording system during the sporting event, a second user input on the icon in the graphical user interface view, the second user input being a different type of input from the first user input;

determining, by the sporting event statistics recording system during the sporting event, that the second user input on the icon is associated with a second action performed by the participant during the sporting event; and recording, by the sporting event statistics recording system during the sporting event, a second statistic for the sporting event based on the participant represented by the icon and the second action associated with the second user input on the icon.

13. The method of claim 12, further comprising:

detecting, by the sporting event statistics recording system during the sporting event, a third user input on the icon in the graphical user interface view, the third user input being a different type of user input from the first user input and the second user input; and providing, by the sporting event statistics recording system in response to the detecting of the third user input on the icon, an additional graphical user interface view for display on the display screen of the mobile computing device, the additional graphical user interface view including an additional plurality of icons, each icon included in the additional plurality of icons representative of a further action possibly associated with the participant during the sporting event.

14. The method of claim 12, further comprising:

providing, by the sporting event statistics recording system, an additional graphical user interface view for display on the display screen of the mobile computing device, the additional graphical user interface view including a plurality of difficulty options associated with statistics entry;

determining, by the sporting event statistics recording system, that a user of the mobile computing device selects one of the plurality of difficulty options represented in the additional graphical user interface view; and adjusting, by the sporting event statistics recording system based on the selected one of the plurality of difficulty options, a difficulty level associated with the user entering statistics during the sporting event.

15. The method of claim 12, further comprising:

providing, by the sporting event statistics recording system, an additional graphical user interface view for display on the display screen of the mobile computing device, wherein the additional graphical user interface view concurrently includes
  a first plurality of icons representative of participants currently in play within in the sporting event and
  a second plurality of icons representative of participants that are not currently in play within the sporting event;

detecting, by the sporting event statistics recording system, a third user input on an icon included in the first plurality of icons and a fourth user input on an icon included in the second plurality of icons; and moving, by the sporting event statistics recording system, the first icon to the second plurality of icons and the second icon to the first plurality of icons to indicate that a participant associated with the second icon has been substituted for a participant associated with the first icon.

16. The method of claim 12, further comprising:

analyzing, by the sporting event statistics recording system after completion of the sporting event, statistics recorded during the sporting event;

selecting, by the sporting event statistics recording system based on the statistics recorded during the sporting event, a set of participants from the plurality of participants in the sporting event as being candidates to receive recognition regarding actions performed during the sporting event;

sending, by the sporting event statistics recording system, information associated with the set of participants to a plurality of additional mobile computing devices, the information including a request to vote for one or more participants included in the set of participants; and receiving, by the sporting event statistics recording system from the plurality of additional mobile computing devices, vote information indicating which of the one or more participants included in the set of participants have received votes to receive the recognition regarding the actions performed during the sporting event.

17. A method comprising:

providing, by a sporting event statistics recording system during a sporting event, a graphical user interface view for display on a display screen of a mobile computing device, the graphical user interface view including an icon representative of a participant in the sporting event;

detecting, by the sporting event statistics recording system during the sporting event, that a touchscreen user input starts on the icon in the graphical user interface view;

determining, by the sporting event statistics recording system during the sporting event, whether a distance of the touchscreen user input satisfies a predefined threshold distance;

providing, by the sporting event statistics recording system during the sporting event and when the distance of the touchscreen user input is determined to be less than the predefined threshold distance, for display on the display screen of the mobile computing device, an indication of a plurality of different actions corresponding to a plurality of predefined directions from the icon in the graphical user interface view; and recording, by the sporting event statistics recording system during the sporting event and when the distance of the touchscreen user input is determined to be at least the predefined threshold distance and in one of the plurality of predefined directions from the icon in the graphical user interface view, a statistic based on the participant represented by the icon and one of the plurality of different actions corresponding to the one of the plurality of predefined directions from the icon in the graphical user interface view.

18. The method of claim 17, further comprising:
providing, by the sporting event statistics recording system, an additional graphical user interface view for display on the display screen of the mobile computing device,
wherein the additional graphical user interface view concurrently includes
 a first plurality of icons representative of participants currently in play within in the sporting event and
 a second plurality of icons representative of participants that are not currently in play within the sporting event;
detecting, by the sporting event statistics recording system, a first additional touchscreen user input on a first icon included in the first plurality of icons and a second additional touchscreen user input associated with a second icon included in the second plurality of icons; and
moving, by the sporting event statistics recording system, the first icon to the second plurality of icons and the second icon to the first plurality of icons to indicate that a participant associated with the second icon has been substituted for a participant associated with the first icon.

19. The method of claim 17, further comprising:
analyzing, by the sporting event statistics recording system after completion of the sporting event, statistics recorded during the sporting event;
selecting, by the sporting event statistics recording system based on the statistics recorded during the sporting event, a set of participants from a plurality of participants in the sporting event as being candidates to receive recognition regarding actions performed during the sporting event;
sending, by the sporting event statistics recording system, information associated with the set of participants to a plurality of additional mobile computing devices, the information including a request to vote for one or more participants included in the set of participants; and
receiving, by the sporting event statistics recording system from the plurality of additional mobile computing devices, vote information indicating which of the one or more participants included in the set of participants have received votes to receive the recognition regarding the actions performed during the sporting event.

20. The method of claim 17, wherein:
the touchscreen user input comprises a touchscreen swipe input in which a user of the mobile computing device swipes, in the graphical user interface view, from the icon representative of the participant in the sporting event.

* * * * *